(12) United States Patent
Zaloom

(10) Patent No.: US 8,571,922 B2
(45) Date of Patent: *Oct. 29, 2013

(54) METHOD, TECHNOLOGY, AND SYSTEM FOR DISPLAYING, MEASURING, ASSESSING, AND IMPROVING THE OPERATING AND FINANCIAL PERFORMANCE OF METERED ENERGY AND WATER CONSUMING SYSTEMS

(75) Inventor: Joseph Zaloom, Falls Church, VA (US)

(73) Assignee: Efficiency3 Corp., Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,819

(22) Filed: Apr. 20, 2012

(65) Prior Publication Data

US 2012/0271670 A1 Oct. 25, 2012

Related U.S. Application Data

(60) Provisional application No. 61/477,956, filed on Apr. 21, 2011.

(51) Int. Cl.
*G06Q 10/00* (2012.01)
*G06Q 30/00* (2012.01)

(52) U.S. Cl.
USPC ....... 705/7.39; 705/7.11; 705/7.12; 705/7.22; 705/7.24; 705/7.29; 705/7.36; 705/7.38; 705/7.41

(58) Field of Classification Search
USPC ..................................................... 705/7.11
See application file for complete search history.

(56) References Cited

U.S. PATENT DOCUMENTS

| 4,021,615 | A | 5/1977 | James et al. |
| 5,061,916 | A | 10/1991 | French et al. |
| 5,216,623 | A | 6/1993 | Barrett et al. |
| 5,404,136 | A | 4/1995 | Marsden |

(Continued)

FOREIGN PATENT DOCUMENTS

WO 99/28843 A2 6/1999

OTHER PUBLICATIONS

Abraxas Energy Consulting—Energy Management Services web page, http://www.abraxasenergy.com/services.php, May 11, 2011.

(Continued)

*Primary Examiner* — Leland Marcus
(74) *Attorney, Agent, or Firm* — Nixon & Vanderhye P.C.

(57) ABSTRACT

Certain examples relate to computer implemented methods and systems including at least three modules whose combined functionality provides for interpretation and optimization of usual and unusual patterns in energy consumption; the identification, quantification, and monetization of hidden operating and financial waste and the accurate measurement of the results of implemented energy management solutions. The first, "Expert Module", provides information that assists with the accurate interpretation of the information provided in the Operations module. The second, "Costs Module", allows users to modify consumption and price components and derive the resulting operating costs based on the facility's applied or available rate structures. The third, "Operations Module", charts and evaluates the current operating performance of a facility down to 15-minute intervals in comparison to the operating performance of a pre-selected "base year". Comparisons are synchronized over intervals in a manner that allows users to compare and comment on individual graphs interactively.

11 Claims, 52 Drawing Sheets

(56) References Cited

U.S. PATENT DOCUMENTS

| | | | |
|---|---|---|---|
| 5,432,710 | A | 7/1995 | Ishimaru et al. |
| 5,479,358 | A | 12/1995 | Shimoda et al. |
| 5,566,084 | A | 10/1996 | Cmar |
| 5,730,356 | A | 3/1998 | Mongan |
| 5,924,486 | A | 7/1999 | Ehlers et al. |
| 6,078,785 | A | 6/2000 | Bush |
| 6,216,956 | B1 | 4/2001 | Ehlers et al. |
| 6,366,889 | B1 * | 4/2002 | Zaloom .................. 705/7.37 |
| 2003/0009401 | A1 * | 1/2003 | Ellis ........................... 705/35 |
| 2011/0029341 | A1 * | 2/2011 | Muse et al. ................... 705/7 |

OTHER PUBLICATIONS

Adapt Engineering—Energy Services web page, http://www.adaptengr.com/services/energy-services/, May 11, 2011.
Ameresco AXIS Utility Bill Auditing, Energy Data and Rate Analysis web page, http://www.ameresco.com/solution/energy-data-analysis, May 11, 2011.
Architect of the Capitol RFP 11P110075 Solicitation for Utilities Management Services (Full Version), Aug. 3, 2011.
Comfort Systems USA Energy Services—Solutions web page, http://www.csusaenergyservices.com/solutions/index.php, May 11, 2011.
DEI Consulting—Energy Management Services web page, http://www.dei-consulting.com/services/engery-management, May 11, 2011.
Dynamic Energy Concepts—DEC Services web page, http://www.dynamicenergyconcepts.com/services.htm, May 11, 2011.
Efficiency3 Operations Analysis Report for Oct. 2006 through Sep. 2009—kW Demand Profile Graphs, 2008.
Efficiency3 Operations Analysis Report for Oct. 2007 through Sep. 2010—kW Demand Profile Graphs, 2008.
Efficiency3 Operations Analysis Report for Oct. 2006 through Sep. 2009—Usage History, 2008.
Efficiency3 Operations Analysis Report for Oct. 2007 through Sep. 2010—Usage History, 2008.
Efficiency3 Technical Proposal to the Architect of the Capitol RFP 11P110075 Solicitation for Utilities Management Services, Aug. 31, 2011.
Efficiency3 Synchronized Weekly Operations Profiles comparing Apr. 4, 2011-Apr. 10, 2011 vs. Apr. 5, 2010-Apr. 11, 2010, 2012.
Email exchange between Joseph Zaloom and Brian Klein, Performance Engineer, US Capitol Power Plant (Mar. 31, 2010-Apr. 2, 2010; Apr. 22, 2010; May 3, 2010).
Energy Accounting Audit for Commercial Office Building—Apollo Office Building 1999 Versus 1998—Nov. 9, 2000.
Energy-Accounting.com—Utility Bill Tracking Software and Energy Tracking Software for Energy Accounting web page, http://www.energy-accounting.com/?gclid=CKTopM2o3qgCFQ175Qodok0p5w, May 10, 2011.
EnergyCAP—EnergyCAP Express Energy Account web page, http://www.energycap.com/products/energycap-express/energycap-express-energy-accountting/, May 10, 2011.
EnergyCAP—EnergyCAP Enterprise—10 Ways to Measure, Manage, Save web page , http://www.energycap.com/products/energycap-enterprise-learn-more/10-ways-to-measure-manage-save, May 11, 2011.
EnerNOC—EffciencySMART Energy Efficiency Solutions web page, http://www.enernoc.com/solutions/energy-efficiency.php, May 11, 2011.
Enhanced Concept Implementation of Comparitive Weekly Operations Analysis spreadsheet, Apr. 2010.
Honeywell—Energy Management Services web page, https://buildingsolutions.honeywell.com/Cultures/en-US/ServicesSolutions/MaintenanceUpgradesRenovations/EnergyManagementServices/, May 10, 2011.
Initial Concept Implementation of Comparitive Weekly Operations Analysis spreadsheet, Apr. 2010.
LPB Energy—Energy Audit Software, Energy Management, Audit & Reporting Software web page, http://www.lpbenergy.com/utility-manager.htm, May 10, 2011.
Pace Global Energy Services—Energy and Carbon Consulting and Management web page, http://www3.paceglobal.com/company.html, May 10, 2011.
Pure Energy Management—Our Approach web page, http://www.pureenergymgmt.com/approach, May 10, 2011.
Utility Management Services home page, http://www.utilityaccounting.com, May 10, 2011.
"Industrial: Planergy Wins Sematech Contract," Energy Conservation News, Dec. 1, 1996, vol. 19, No. 5.
"Unicorn Launches eQuator(SM)," PR Newswire, Aug. 9, 1999, p. 8396.

* cited by examiner

GENERAL OVERVIEW

GENERAL OVERVIEW

| STANDARD "WHAT IF" TEMPLATE ||
|---|---|
| AVERAGE DSITRIBUTION COST ||
| ENERGY USE | X |
| ENERGY PRICE | Y |
| ENERGY COST | Z = X * Y |
| AVERAGE COMMDOTY COST ||
| ENREGY USE | U |
| ENERGY PRICE | V |
| ENERGY COST | W = U * V |
| AVERAGE DEMAND COST ||
| PEAK DEMAND | R |
| kW DEMAND PRICE | S |
| kW DEMAND COST | T = R * S |
| AVERAGE ADDITIONAL SURCHAGES ||
| CHARGE 1 | P |
| CHARGE 1 | Q |
| TAXES ||
| LOCAL SALES TAX | N |
| OVERALL SALES TAX | O |
| AVG TOTAL COST | M = Z + W + T + P + Q + N + O |

FIG. 27

| WEEKDAY SYNCHRONIZATION TABLE FOR SYNCHRONIZATION WITH A PRIOR CALENDAR YEAR ||||||||||
| Column A | | B = A - 364 | | C = B - 364 | | D = C - 364 | | E = D - 364 | |
| Calendar Day | Weekday | Calendar Day | Weekday | Calendar Day | Weekday | Calendar Day | Weekday | Calendar Day | Weekday |
|---|---|---|---|---|---|---|---|---|---|
| 1/2/2004 | 5 | 1/3/2003 | 5 | 1/4/2002 | 5 | 1/5/2001 | 5 | 1/7/2000 | 5 |
| 1/1/2005 | 6 | 1/3/2004 | 6 | 1/4/2003 | 6 | 1/5/2002 | 6 | 1/6/2001 | 6 |
| 1/1/2006 | 7 | 1/2/2005 | 7 | 1/4/2004 | 7 | 1/5/2003 | 7 | 1/6/2002 | 7 |
| 1/1/2007 | 1 | 1/2/2006 | 1 | 1/3/2005 | 1 | 1/5/2004 | 1 | 1/6/2003 | 1 |
| 1/1/2008 | 2 | 1/2/2007 | 2 | 1/3/2006 | 2 | 1/4/2005 | 2 | 1/6/2004 | 2 |
| 12/31/2008 | 3 | 1/2/2008 | 3 | 1/3/2007 | 3 | 1/4/2006 | 3 | 1/5/2005 | 3 |
| 12/31/2009 | 4 | 1/1/2009 | 4 | 1/3/2008 | 4 | 1/4/2007 | 4 | 1/5/2006 | 4 |
| 12/31/2010 | 5 | 1/1/2010 | 5 | 1/2/2009 | 5 | 1/4/2008 | 5 | 1/5/2007 | 5 |
| 12/31/2011 | 6 | 1/1/2011 | 6 | 1/2/2010 | 6 | 1/3/2009 | 6 | 1/5/2008 | 6 |
| 12/30/2012 | 7 | 1/1/2012 | 7 | 1/2/2011 | 7 | 1/3/2010 | 7 | 1/4/2009 | 7 |
| 12/30/2013 | 1 | 12/31/2012 | 1 | 1/2/2012 | 1 | 1/3/2011 | 1 | 1/4/2010 | 1 |
| 12/30/2014 | 2 | 12/31/2013 | 2 | 1/1/2013 | 2 | 1/3/2012 | 2 | 1/4/2011 | 2 |
| 12/30/2015 | 3 | 12/31/2014 | 3 | 1/1/2014 | 3 | 1/2/2013 | 3 | 1/4/2012 | 3 |
| 12/29/2016 | 4 | 12/31/2015 | 4 | 1/1/2015 | 4 | 1/2/2014 | 4 | 1/3/2013 | 4 |

Weekdays: 1 = Monday, 2 = Tuesday, 3 = Wednesday, 4 = Thursday, 5 = Friday, 6 = Saturday, 7 = Sunday.

METHOD, TECHNOLOGY, AND SYSTEM FOR DISPLAYING, MEASURING, ASSESSING, AND IMPROVING THE OPERATING AND FINANCIAL PERFORMANCE OF METERED ENERGY AND WATER CONSUMING SYSTEMS

CROSS-REFERENCES TO RELATED APPLICATIONS

This application claims priority from U.S. Provisional Application No. 61/477,956, filed Apr. 21, 2011, the entire contents of which are hereby incorporated by reference. This application is related to U.S. Pat. No. 6,366,889 B1 to Joseph A. Zaloom, which issued on Apr. 2, 2002, the contents of which are incorporated herein by reference.

FIELD

The technology relates to automated computer-implemented algorithmic methods and systems for conserving energy and/or other resources through the ongoing analysis, assessment and enhancement of the operating and financial performance of energy and water consuming systems at large facilities and particularly the consumption of electricity at commercial, governmental, industrial, home, and other facilities.

BACKGROUND AND SUMMARY

Today's contemporary energy environment is characterized by high energy prices, government mandates to enhance energy efficiency, and a strong drive to transition to renewable energy resources. Combined, these factors are putting strong pressure on building owners and managers to make lowering energy consumption and cutting energy costs a major priority. This pressure is further compounded by the ever increasing number of energy efficiency regulations and standards such as Congress' Energy Independence and Security Act of 2007 and the federal government's Energy Star rating program.

While a lot of emphasis has been placed on the use of high efficiency energy products and the purchase of clean and renewable energy resources, what is often missing from this strategy is waste elimination; waste that is embedded in the daily operations of most commercial, governmental, and industrial facilities; waste that is so prevalent and so widespread—but to which most Americans are oblivious. It begins at the doorstep of our office buildings and apartments; in our parking lots and garages; and it is prevalent inside our homes, malls, and offices—a waste which is conservatively estimated at 20% to 30% of our daily use of energy. Non-limiting examples are: Hallway and stairway lights which stay on at full capacity 100% of the time even when people are not present; parking lots in apartment and office buildings which stay lit like Christmas trees 100% of the time even when traffic is minimal in the wee hours of the morning; office lights, task lights, monitors, and computers which stay on 24 hours a day despite the fact that no one is there to use them after working hours; escalators and moving walkways which run continuously regardless of whether people are riding them or not; restroom lights at restaurants and retail outlets which stay on 24-hour a day, when long stretches of time go by without anyone using them. These are but a few of the most glaring examples of wasteful energy use practices currently prevalent in the United States. Most of this waste can be quickly eliminated with the installation of cheap motion sensors and simple "On/Off" switches.

In fact, eliminating operating waste is the quickest, most economical, and most environmentally friendly way to save energy and cut costs.

In certain examples, it may be desirable to provide waste reduction strategies at organizations, large and small, that provide tools to identify, quantify (measure), and monetize operating waste and savings opportunities; that can explain usual and unusual patterns in energy consumption; that can help develop and evaluate highly efficient and effective energy management solutions; and that can accurately measure and report performance results—on a continuous basis. In certain instances, without the availability of such tools, there may be less incentive to take action.

In certain instances, an impediment for the implementation of waste reduction strategies is lack of time, knowledge, and resources. Most large office buildings are owned by investment trusts or relatively small organizations that do not have an energy management team on staff; these buildings are typically run by building managers who are too busy tackling their day-to-day responsibilities of keeping their tenants happy to take the time or even to have the knowledge to use commercially available software to analyze, investigate, diagnose, and document the daily energy operations of their facilities. In fact, when it comes to energy, the most important issue for most building managers is energy budgeting; insuring that enough funds are available to pay their building's utility bills in a timely manner. In some instances, systems and/or methods providing more than simply energy budgeting may be desirable.

Moreover, much commercially available energy management software today is geared towards large enterprises that manage a large number of facilities. This kind of software, whether web-based or desktop based, is in some cases a "cookie-cutter/one-size-fits-all" approach to energy management; it organizes billing and energy consumption data into eye-catching charts and graphs. In certain examples, it may be desirable to also provide context, particularly taking into consideration the different types of facilities, such as whether the facility in question is a major office building, a warehouse, a hospital, a townhouse, or a major data processing center, and in some instances tailoring the analytical and/or reporting approach to at least the type of facility. While most enterprise software can flag the possibility of billing, operational, and mechanical problems, they typically leave it to the "energy manager" to analyze, investigate, diagnose, monetize, and document the possibility of such problems. Furthermore, despite the fact that several commercial packages also provide for the charting of energy interval pulse data from sophisticated metering devices—some, in real-time, in addition to identifying the possibility that an operating, mechanical, or metering problem has occurred, it may be desirable to quantify, monetize, or to explain the usual and unusual patterns that are identified.

A variety of systems and services currently on the market provide sophisticated energy tracking and monitoring of energy data. However, it may be desirable to provide quick identification, quantification, and monetization of operating waste and savings opportunities. In some instances, it may be desirable to explain the usual and unusual patterns in energy consumption identified by certain systems; as well as quickly identify effective and/or efficient energy management solutions, and it also may be desirable to provide accurate measurements of implemented solutions.

In order to better understand the major shortcomings of existing systems and methods in optimizing energy operations and eliminating operating waste at large facilities one can compare them to trying to help an overweight person reduce his weight; the best that existing systems and methods have to offer involves providing facility operations engineers with systems that can measure and plot energy consumption at their facilities in real-time—down to a 15-minute or 30-minute interval level—and not much else. Such systems are not known to include a knowledge base or an "Expert System" that can inform facility operators of their tenants' operations, the nature of the equipment they use and the list, power rating, and structure of their facility's mechanical and electronic systems. They also generally do not include any reference to the facility's applied utility rates structures nor provide any indication of the value—e.g., the cost of the energy—being saved at the facility.

Comparing that method to trying to help an overweight person lose weight is like providing that person with a device that can count his or her caloric intake and not much else! The age of that person, his or her physical health; profession (whether the person is a baggage handler or a switchboard operator) do not get taken into consideration. Progress is measured at the end of each month when the weight of the person is measured against his weight at the end of the prior month. There is no measurement of the value of losing weight such as lower cholesterol level, lower blood pressure, increased stamina, and lower food costs.

Understandably one cannot expect meaningful results from a mere measurement of real-time energy consumption without context just as one cannot expect a person to undergo a major weight loss from the mere counting of caloric intake.

Elements missing from the above approach, in certain instances, may include:

(1) Lack of a Frame of Reference: Just providing a measurement of anything is meaningless without a frame of reference. For example just stating that someone is 200 lbs. is meaningless in the context of weight loss. If the person's prior weight was 240 lbs. then that person has reduced his/her weight. On the other hand, if that person's weight was 180 lbs. then that person has gained weight. Therefore, the mere providing of real-time energy consumption without a comparison to a prior benchmark is of little use.

(2) Content without Context: Only stating that someone is 200 lbs. in itself is practically meaningless. It does even not tell if a person is heavy or slim. 200 lbs. on a 5'4" frame would make a person very heavy. On the other hand, 200 lbs. on a large-framed 6'4" person is likely to project an image of fitness and health, and a linebacker who weighed only 200 lbs. would be considered underweight. Therefore, merely providing real-time energy consumption without a context to what type of facility is being tracked (hospital, theater, or office building), the type of tenants it has, and the type of equipment it contains, is practically meaningless.

(3) Missing Valuation: The underlying principle of modern economic society is money. Money is representative of value. People work for money, they start businesses to make money, and they sacrifice to save money. Therefore, only providing a tool that helps reduce the use of a particular commodity (i.e. energy) without knowing the quantity that was reduced and being able to measure the value of the reduced quantity is practically meaningless.

Below is an analysis of certain offerings of major energy management companies in the United States. None of these companies provide a comprehensive system or method that is capable of quickly interpreting usual and unusual patterns in energy consumption; identifying, quantifying, and monetizing hidden operating and financial waste; and accurately measuring performance results.

For example, Energy Lens (www.energylens.com) created an Excel add-in that makes it easy to analyze detailed interval energy data. It allows users to study patterns in energy usage, and look for changes in energy performance. While useful for its intended purposes, Energy Lens' system merely flags the possibility that a problem may exist in the daily operations of a given facility. In certain instances, Energy Lens may be a basic analytical tool that identifies possible operating and mechanical errors. It may be desirable for a system to allow for the correlation of that data with the weather and/or provide for the synchronization of the operations data from one year to the next to quantify, and also measure differences in operations from one year to the next. It may also be desirable to provide an Expert system that could shed light into the nature of the facility's operations, or on the possible nature of any displayed irregular consumption data. And finally, it may be desirable to provide a cost modeling feature that could monetize the effect of the discovered irregular operations on operating costs.

LPB Energy Management (http://um-online.lpbenergy.com/umo_mansfield/Login.aspx) is an energy management company that is currently being acquired by Ecova. LPB provides a web-based program that generates reports and graphs displaying usage and cost statistics, and identifies potential billing errors and usage anomalies, and compares facilities in order to target those with the greatest savings potential. This system provides more capabilities than Energy Lens' system. This system would be a good match for managing multiple small facilities that operate in a similar fashion such as 7-Eleven, Macy's, and Best Buy stores, or organizations with a multitude of small facilities. However, it would be desirable, given the natural variation in energy bills, to provide operations benchmarking and year over year comparison, and to explain any variation in use, price, and cost; in order to help facility owners, and managers achieve greater energy efficiency. In summary, it would be desirable to provide utilities tracking software with the capability to identify, quantify, or monetize operating waste and savings opportunities.

Ecova (www.ecova.com) lists "Facility Optimization and Efficiency" as one of its solution areas. While Ecova's system does leverage the use of smart meters and building automation systems to generate real-time information streams that help identify "poor performers and outliers," and automatically alert users to conditions outside of pre-defined ranges, its system's mainly identifies possible operating and mechanical errors in real-time mode. It may be desirable to incorporate an Expert system that provides information that helps with the accurate interpretation of the energy information, cost modeling capabilities, and capabilities for the quick identification, quantification, and monetization of operating waste and savings opportunities.

First Fuel (http://firstfuel.com) has a Rapid Building Assessment platform which uses building consumption data from the utility company in order to "see" into buildings and understand how energy is being used through end-use benchmarking and then provide actionable recommendations. However, in some instances, it may be desirable to provide for synchronized comparative visual analysis with a designated baseline in order to measure or quantify performance, and/or to allow users the ability to comment on the provided information interactively in order to share and exchange ideas on the nature of discovered problems and opportunities. It may also be desirable to take into account financial information that may enable useful "recommendations" to be made. It may also be desirable to provide methods or systems that include an "Expert" system to enable users to quickly interpret the visual information unless they are intimately knowledgeable with the facility's operations.

Tangible Software Inc. (www.tangiblesoftware.com) provides an energy software system that addresses six areas of an enterprise's energy infrastructure: invoice management; acquisition and contract management; building consumption and control; meter data management; demand management; and carbon footprint management. While Tangible Software Inc.'s system does provide real-time interval data capture, it may be desirable to provide systems or methods that provide the ability to generate synchronized comparative visual analyses of the information with a designated baseline, an Expert system for the interpretation of the information, and/or a cost modeling capability to monetize possible problems and opportunities.

iEnergyIQ (http://ienergyiq.com) is an Enterprise Energy Management company that provides software as a service and energy analytics for enterprises. These services include the ability to generate customized reports and graphs, as well as identify potential billing errors and usage anomalies. It is also capable of analyzing pulse data from meters and sub-meters. However, while iEnergyIQ is capable of comparing one meter's stream of pulse data with another account's steam of pulse data, it may be desirable to provide systems and/or methods providing synchronized comparative visual analyses of the information with a designated baseline, an Expert system for the interpretation of the information, and/or financial modeling capabilities.

eSightEnergy (www.esightenergy.com) is primarily an energy management system for enterprises. It offers a robust suite of web-based online modules with various levels of functionality as well as a desktop centric version. Basically, this system allows users to track and integrate energy consumption from meters located in disparate locations and generate consolidated reports. It is similar to the iEnergyIQ model described above. It may be desirable to provide systems and/or methods, however, that provide interpretive analyses, quantification and monetization of identified usage anomalies.

EPS (www.epsway.com) bills itself as a leader in energy management solutions for industrial manufacturers. Its approach includes performing an energy audit on the subject facility, making recommendation on replacing inefficient assets and shifting to alternate sources of energy. This company's energy efficiency solutions are based on using its xChange Point solution. This company's offering is more of an approach than a system—and it geared towards industrial facilities with limited application in the commercial office building market. The approach includes installing meters to monitor energy usage of systems and processes at an industrial facility, installing web-based software to enable access to the systems "near real-time" data, and have the company's team of energy experts make monthly recommendations on how to improve energy efficiency. However, it may be desirable to further include an "Expert" module and/or a financial modeling part with systems such as this.

Other web-based energy and utility management systems are known such as EnergyCap (www.energycap.com), Abraxas Energy Consulting (www.abraxasenergy.com), Adapt Engineering (www.adaptengr.com), Amersco, (www.ameresco.com), Dynamic Energy Concepts (www.dynamicenergyconcepts.com), Energy-Accounting.com (www.energy-accounting.com), Enernoc (www.enernoc.com), Honeywell (www.honeywell.com), Pace Global (www.paceglobal.com), Pure Energy Management (www.pureenergymgmt.com), Utility Management Services (www.utilmanagement.com), EnergyWatchDog (www.energywatchdog.com).

All of the companies listed above can provide systems that can track and monitor billing and operations data and identify possible billing and operating anomalies at various levels. However, it may be desirable to provide systems and methods for an integrated solution that may enable users to quickly interpret and explain unusual patterns in energy consumption, that can quickly identify, quantify and monetize operating waste and savings opportunities; or that can quickly and accurately measure performance results—on a continuous basis, in certain example embodiments. Therefore, a need exists for methods and systems that are capable of quickly interpreting usual and unusual patterns in energy consumption; identifying, quantifying, and monetizing hidden operating and financial waste; and accurately measuring performance results—in a reduced amount of time, with reduced cost and effort.

To meet such challenges, for example, certain example embodiments herein provide an Expert system to identify, understand and explain usual and unusual operating profiles and/or the ability to measure and quantify energy consumption changes (increases/decreases) from the prior year by synchronizing back exactly (in preferred example implementations) 364 days (or multiples of that number, i.e., 728, 1092, 1456 for going back to a base year up to 4 years in arrears). Synchronizing with 363 or 365 days will result in Mondays being synchronized with Sundays and/or Fridays being synchronized with Saturdays. Also, synchronizing one month, three months, or six months in arrears will be less meaningful, as it could straddle seasons where operations are drastically different. This leave the 364 days (exactly 52 weeks) as an example meaningful synchronization method, in certain example embodiments. In other examples, 350, 357, 371, and/or 378 days may also be close enough so as to result in meaningful synchronization. Correlation can be displayed at the level of one day, one week, one month, or one year, and anything in between, according to different example embodiments.

Furthermore, by adding a financial "What If" module, one can monetize the quantity of energy that is varying from one year to the next.

Certain example systems and methods disclosed herein may be implemented in different ways. For example, in certain instances, a system may be applied/method implemented may include performing synchronization "retroactively" once the data has been made available by the utility company. As another example, in other instances, a "Real-Time" system may be applied/method may be implemented wherein the comparison were made between a prior baseline and the current data in real-time. This second approach may be as effective as the first approach in certain examples, and may trigger automatic action based on pre-determined criteria in some instances.

Furthermore, since both consumption and weather data will be collected concurrently by the system in certain example embodiments, the system may be able to perform regression analysis to determine the correlation and sensitivity of the changes in energy data to the changes in weather data. The change of correlation or sensitivity to the weather from one year to the next can be a useful indicator or a trigger for automated action in "Real-Time" systems.

Additional non-limiting example features and advantages include:

The synchronization of current or recent operating patterns with the corresponding operating patterns of the prior year—or any other pre-selected based year.

A synchronization that is based on a 364 days difference from one year to prior year as well as any multiple of that number (364) for each additional year in excess of one year.

The synchronization can start by any day of the week—not necessarily by Monday. For example, the weekly synchronization can start on a Sunday, or a Friday, or any other day.

A synchronization that can range from a comparison of hour to another, one day to another, up to one year and another—and anything in between.

A synchronization that allows for the identification of usual and unusual energy consumption patterns.

A synchronization than allows for the accurate measurement and quantification of the difference in energy consumption resulting from the difference in the displayed operating patterns.

The addition of an interactive commenting and discussion log that can reference, document, and explain the usual and unusual operating patterns displayed in the Operations Module.

The addition of tabular consumption, temperature, and cost data at the bottom the operating profiles of real-time data streams.

The combination of an "Expert" Module that would help in the interpretation and explanation of displayed operating patterns and leverages information collected from system participants to optimize the efficiency of commodity markets, collaborate on finding solutions to common problems, as well as discovering new technologies and the sharing of knowledge and ideas regarding the availability and the implementation of new energy systems, methods, and technologies.

The method of the composition of the "Expert" Module.

The combination of a "Costs" module that could monetize the difference in operating patterns from one year to the next as well as from one year to a preselected base year.

The use of the above methods separately or in combination with each other.

Triggering automated notifications and visual and audible warning signals whenever certain combinations of operating conditions and temperature differences (from the prior year or a preselected base year) have been met.

Triggering predetermined Action Control Scripts based whenever certain combinations of operating conditions and temperature differences (from the prior year or a preselected base year) have been met.

Tracking is not limited to energy and weather on the chart, it can include other parameters of interest to the user, such as hotel vacancy rates, number of meals served, etc.

In certain example embodiments, a method of synchronizing current and/or recent operating pattern(s) with corresponding operating pattern(s) of a prior year may be provided. The method may comprise storing current and/or recent operating patterns on at least one storage device, the current and/or recent operating patterns comprising current and/or recent incremental commodity usage data. The method may further comprise storing operating patterns of at least a year prior to the current and/or recent operating patterns on the at least one storage device, the prior year operating patterns comprising historical incremental commodity usage data. The current and/or recent operating patterns may be synchronized, via a processor coupled to the storage device, with operating patterns of at least a year prior, based at least in part on periodically-repeating time periods over which the usage occurred to generate an incremental historical comparison of usage from different but related periodically-repeating time, that at least partly takes into account time-variable factors affecting the usage, including using the processor to automatically correlate usage data that is exactly an integer multiple of 364 days apart, in certain example embodiments.

Other example embodiments may relate to a system for monitoring and reporting usage of a commodity such as energy. The system may include at least one storage device configured to store historical incremental commodity usage data. The system may further include a processor coupled to the storage device, the processor time-correlating the historical incremental usage data based at least in part on periodically-repeating time periods over which the usage occurred to generate an incremental historical comparison of usage from different but related periodically-repeating time periods that at least partly takes into account time-variable factors affecting the usage. Furthermore, in certain instances, the processor may automatically identify unusual usage patterns by comparing with synchronized historic usage patterns and automatically providing contextual interactivity for the usage patterns based on a stored knowledge base, temperature- and/or consumption-based action control lists, and information including commodity pricing, and/or facilities analytics.

In further example embodiments, a system for tracking performance of a facility relating to energy and/or water usage may be provided. In certain instances, the system may include at least one storage device configured to store historical and/or current incremental commodity usage and/or cost data. The system may further comprise a first computer-implemented module comprising a plurality of components, the components comprising a facility information component, a cost analysis component, and an operations analysis component. In certain cases, the facility information component may comprise data pertaining to a particular facility, comprising a description of the facility, a function of the facility, operating hours of the facility, and/or information relating to usage of utilities by the facility, stored on the storage device. The cost analysis component comprising historical billing data may be stored on the storage device. The operations analysis component may comprise data corresponding to a plurality of weekly modules comprising 15 to 30 minute interval usage and weather data for each day of the week. Additionally, a second computer-implemented module may comprise periodic updates to the cost analysis and operations analysis components. The system may also include a processor configured to execute the first and second computer-implemented modules. Furthermore, the data corresponding to the weekly modules from a prior year and from a current year may be synchronized by day of week such that data from a Monday of a particular week in the prior year and data from a Monday of a corresponding week in the current year are synchronized in order to accurately track performance of the facility with respect to energy and/or water usage. In certain example embodiments, this synchronization may result in data from a given day being correlated with data from a day 364 days prior to the given day.

In other example embodiments, the modules may be daily rather than weekly. Further, rather than synchronizing by day of the week, the data corresponding to the modules from a prior year and from a current year are synchronized by day of week such that data from the given day and data from a day 364 days before the given day and/or a multiple thereof are synchronized in order to accurately track performance of the facility with respect to energy and/or water usage.

Further example embodiments relate to a method of tracking performance trends relating to utility usage. The method may comprise synchronizing 15 to 30 minute intervals of data from a particular week in first year with 15 to 30 minute intervals of data from a corresponding week in a second year such that the data is synchronized by day of the week in order to track the performance of utility usage from the particular week of the first year to the corresponding week of the second year by comparing usage from the week of the first year and the week of the second year in 15 to 30 minute intervals.

Still further example embodiments relate to a non-transitory storage medium arrangement for in use being operatively coupled to a computing device. The computing device in use may access the storage medium arrangement to generate an output including at least user display data. The storage medium arrangement may store at least instructions executable by computing device to correlate data stored on the storage medium arrangement and generate said user display data output. In certain examples, the storage medium arrangement may have stored thereon: utility usage data defining at least utility usage including an amount of usage and time periods corresponding to said usage; and instructions executable by said computing device to process usage amount at least in part based on said time periods to correlate and register said usage data accordingly to utility demand patterns that are likely to recur in time, to thereby enable comparison between time-comparable demand cycle patterns.

In certain example embodiments, the correlation may be performed by aligning a given day in a current year with the day that is exactly 364 days before the given day. In other example embodiments, the correlation and/or synchronization may be with a day that is a multiple of 364 days prior to the given day, and/or with a day that is close to 364 days prior to the given day and is divisible by 7 (e.g., 350, 357, 371, 378, and the like).

BRIEF DESCRIPTION OF THE DRAWINGS

FIG. 9 illustrates an example overview of the Expert module;

FIG. 11 illustrates a snapshot of an example (e.g., partial) Expert module;

FIGS. 12(a)-(b) illustrate example methods relating to line-item by line-item recompilation of a facility's monthly electric bills;

FIGS. 13(a)-(b) illustrate snapshot of example "What If" financial modeling according to certain example embodiments;

FIGS. 14(a)-(b) illustrates partial snapshots showing how "What If" financial modeling may allow a user to modify any aspect of energy use and/or price according to certain aspects;

FIGS. 16(a)-(d) illustrate certain example embodiments of a cost module and example interface(s) for online access of the cost module;

FIGS. 26(a)-(c) illustrate a "Costs" template and architecture according to certain example embodiments and example schematics of possible Costs Module "What-If" Template;

FIG. 27 illustrates how synchronizing to a period exactly 364 days in arrears in a given year in a non-limiting exemplary example embodiment, will result in a match for the same weekday from one year to another.

DETAILED DESCRIPTION

Certain example embodiments relate to a computer implemented method and system which may include three modules whose combined functionality provides for the quick enhancement of the operating and financial performance of energy systems at large facilities; the interpretation of usual and unusual patterns in energy consumption; the identification, quantification, and monetization of hidden operating and financial waste; and the accurate measurement of the results of implemented energy management solutions.

In certain example embodiments, the methods and systems relating to synchronization described herein may operate in a "retroactive analysis" fashion. In other words, the identification, quantification, and monetization of hidden operating and financial waste (e.g., in terms of utility usage) may be analyzed "after the fact", in certain cases. In other example embodiments, a "real time" analysis may be performed instead of or in addition to the retroactive analysis. Example embodiments of the delayed/retroactive analysis will be described first.

Figure 1A:
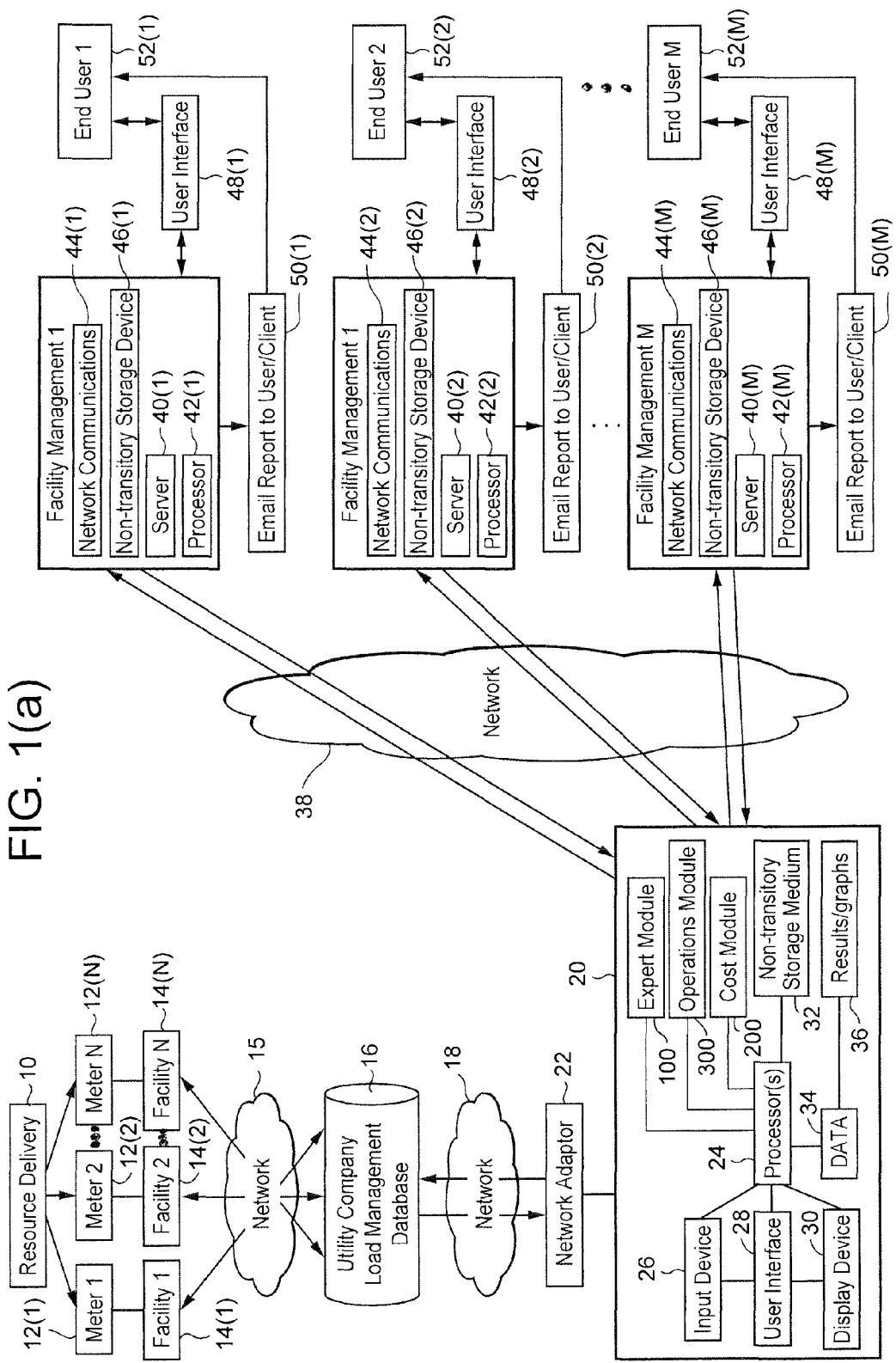
FIGS. 1(a)-(b) illustrate an example of a retroactive analysis system for improving operating and/or financial performance of energy.

FIG. 1(a) illustrates an example overview of certain example embodiments of a "retroactive analysis" system for improving operating and/or financial performance of energy as described herein. Certain example systems and methods relating to the "retroactive analysis" may include at least three modules: an expert module, a costs module, and an operations module.

In FIG. 1(a), resource delivery 10 (which can be one or a number of entities or distribution channels) delivers resources such as energy, water, and/or any other commodity to a facility or facilities 14(1), 14(2) . . . 14(n). In certain instances, one facility may be provided; however, in non-limiting example implementations, one or more resource delivery agents may deliver resources to a plurality of facilities including a plurality of meters, as well as a plurality of facility management entities and/or end users. Each facility may comprise one or several buildings, rooms, or other physical entities capable of using or consuming the delivered resource.

The amount of resources delivered is characteristically measured by meters 12(1), 12(2) . . . 12(n), or another measuring device. Information relating to the usage of these resources is sent to (and/or retrieved by) a utility company load management database 16. Via a network 18 or otherwise, this information may be retrieved by a computer 20.

Computer 20 includes a processor 24, which may be connected to non-transitory storage medium 32, user interface 28, input device 26, and display device 30. Data 34 is retrieved from database 16 and entered into computer 20. The computer 20 also includes an Expert module 100, a Cost module 200, and an Operations module 300, in certain example embodiments. The data 34 is processed (e.g., by processor 24, in connection with at least one of the modules) to produce results/graphs 36. Results/graphs 36 are sent to distributer facility management server(s) 40(1), 40(2) . . . to 40(m) via network(s) 38.

A facility management server 40(1) may include a processor 42(1), non-transitory storage device 46(1), and network communications 44(1). The information (e.g., results/graphs 36) stored in server 40(1)/storage device 46(1) are accessible via user interface 48(1) (e.g., a webpage, file, program, etc.), and may be accessed by an end user 52(1) (e.g., an employee, the client, the management office, etc.). The information (e.g., results/graphs 36) stored in server 40(1)/storage device 46(1) may also be sent as an email report 50(1) to the end user 52(1) (e.g., the client, management office, etc.).

Similarly, server 40(2) may include processor 42(2), non-transitory storage device 46(2), and/or network communications 44(2). The information (e.g., results/graphs 36) stored in server 40(2)/storage device 46(2) are accessible via user interface 48(2) (e.g., a webpage, file, program, etc.), and may be accessed by an end user 52(2) (e.g., an employee, the client, the management office, etc.). The information (e.g., results/graphs 36) stored in server 40(2)/storage device 46(2) may also be sent as an email report 50(2) to the end user 52(2) (e.g., the client, management office, etc.). Server 40(m) may include processor 42(m), non-transitory storage device 46(m), and/or network communications 44(m). The information (e.g., results/graphs 36) stored in server 40(m)/storage device 46(m) are accessible via user interface 48(m) (e.g., a webpage, file, program, etc.), and may be accessed by an end user 52(m) (e.g., an employee, the client, the management office, etc.). The information (e.g., results/graphs 36) stored in server 40(m)/storage device 46(m) may also be sent as an email report 50(m) to the end user 52(m) (e.g., the client, management office, etc.).

In other words, certain example systems and methods may include a plurality of facilities (e.g., up to "n"), and computer 20 may process commodity usage data from the plurality of facilities 14, and may send the customized customer-specific processed information to a plurality of facilities management(s) and/or end users (e.g., up to "m"). Thus, the number of facilities and facility management may correspond one-to-one, in certain example instances; however, in some cases these may not so correspond (e.g., when a facility includes more than one location and/or building, when a facility is managed by more than one facility management unit, or when one facility management unit manages more than one facility, etc.).

Figure 1B:
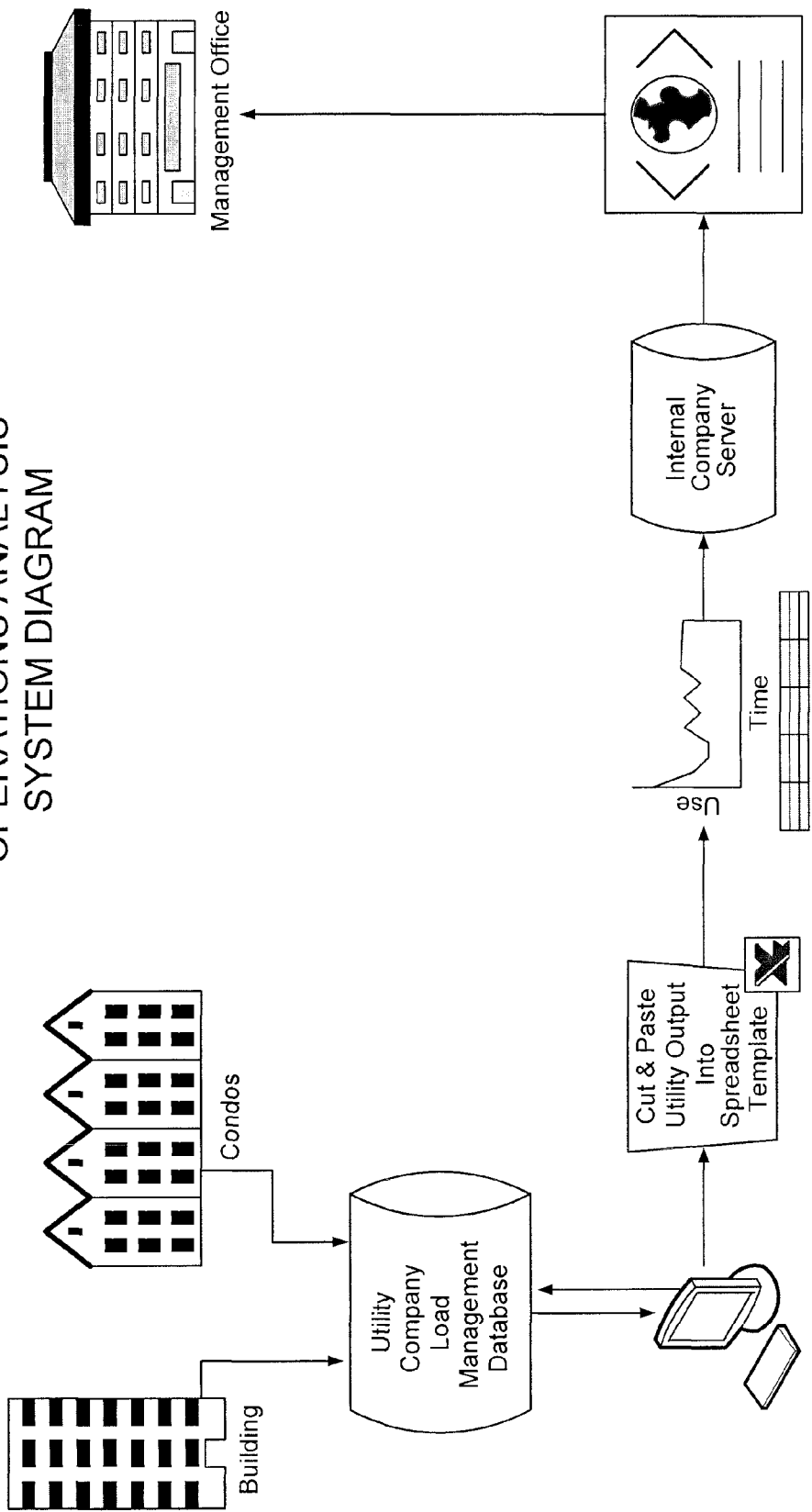

FIG. 1(b) illustrate a non-limiting example a system according to certain example embodiments. FIG. 1(b) shows a general overview of information relating to energy/resource use in facilities being sent to a utility company load management database. A computer is used by a user to log into the utility company's database and retrieve data, which is manually entered into the computer (e.g., via an input device—but may be automatically sent in certain examples). Data may be placed in an Excel spreadsheet in certain example embodiments. The data is then processed, e.g., utilizing the Expert module, Cost module, and/or Operations module, to create related graphs and/or tables. These graphs and/or tables are then stored on an internal company server. The information from the data and graphs and/or tables may be sent to and/or retrieved via a user interface such as a webpage. In other examples, the information may be stored in a file and/or program. Then, the information including the graphs and/or tables (and possibly the data) is sent to an end user such as a management office.

Figure 2:
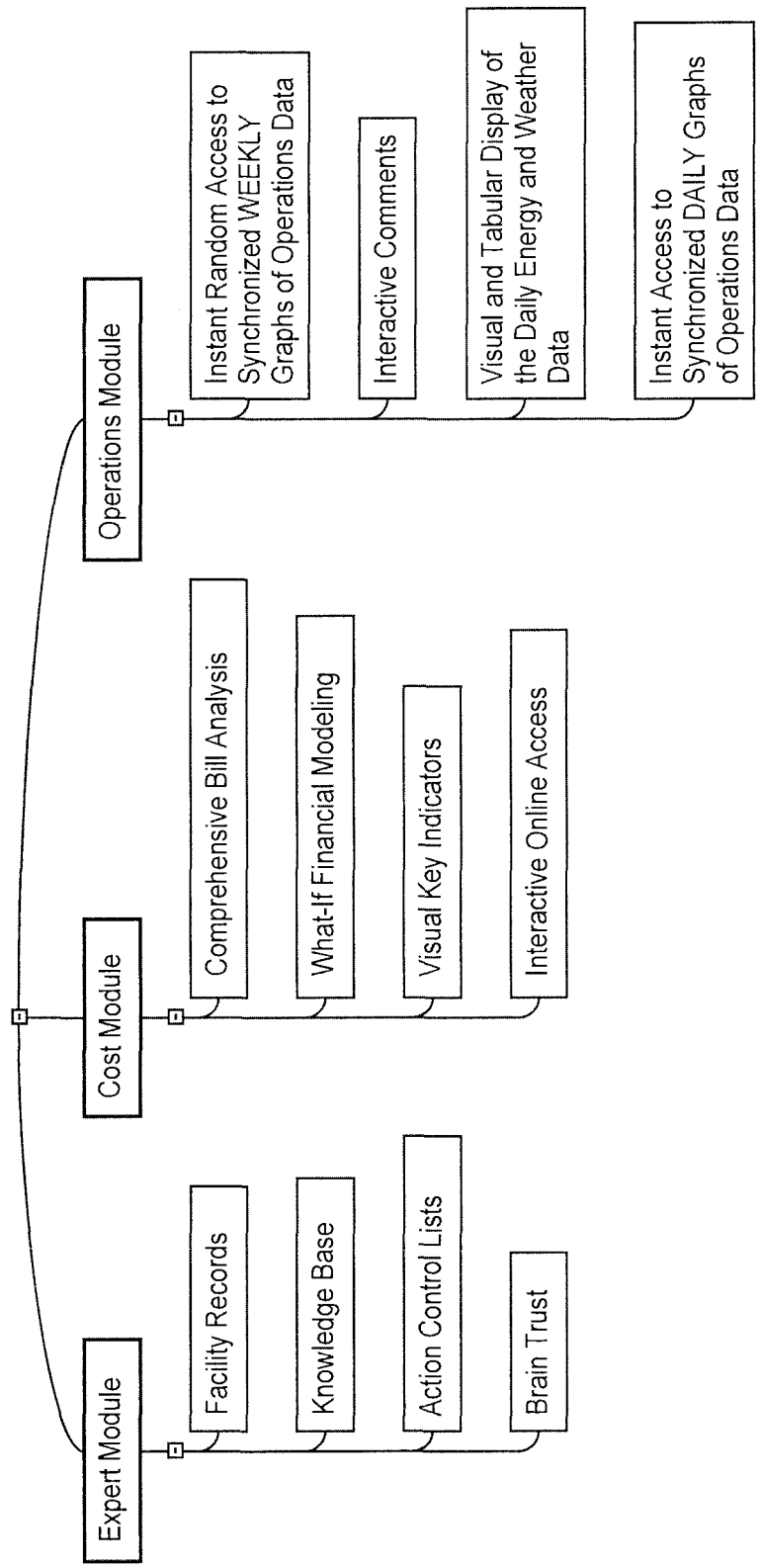
FIG. 2 illustrates an overview of example software architecture of the FIG. 1(a) system for improving operating and/or financial performance of energy, according to certain example embodiments.

FIG. 2 illustrates an example overview of example systems and/or methods for improving the operating and financial performance of energy systems at larger facilities; interpreting usual and unusual patterns in energy consumption; identifying quantifying, and monetizing hidden operating and financial waste; and accurately measuring the results of implemented energy management solutions, in a reduced amount of time, with reduced effort and/or cost.

In certain instances, an example system may include at least an Expert module, a Cost module, and an Operations module.

The first, "Expert module", provides information that may assist with accurate interpretation and improvement (e.g., optimization) of the information provided in the Operations module.

The second, "Costs module", allows users to modify consumption and price components and derive resulting operating costs based on the facility's applied rate structures.

The third, "Operations module", charts and evaluates the current operating performance of a facility down to 15-minute intervals in comparison to the operating performance of a pre-selected "base year" —identifying and quantifying hidden operating and financial waste as well as providing accurate measurements of the change in operating performance from one year to the next. Comparisons are synchronized over weekly intervals in a manner allowing users to comment on each graph interactively.

Certain example synchronization systems and methods described herein may include an Expert module, a Cost module, and an Operations module, that symbiotically work together in order to improve the operating and financial performance of energy systems at large facilities. For example, certain example systems and methods may relate to interpreting usual and unusual patterns in energy consumption; identifying, quantifying, and monetizing hidden operating and financial waste; and substantially accurately measuring the results of implemented energy management solutions. In certain instances, example methods and systems disclosed herein may advantageously provide the above-described analysis in a reduced amount of time, with reduced cost and/or effort.

Further example embodiments relate to a system for processing historical utility usage and cost data collected from a utility, said system including: at least one storage medium that stores said utility usage data; at least one user input/output device; at least one processor operatively connected to the storage medium and the user input/output device, the at least one processor automatically creating a baseline based on at least said stored utility usage and cost data, said at least one processor further updating the stored utility usage and cost data with more current usage and cost data and synchronizing the updated data with previously stored data to generate graphical visualizations that allow discovery of performance discrepancies and/or usage or cost aberrations compared to said baseline; and a display device operatively coupled to the at least one processor, the display device displaying said generated graphical visualizations.

In other example embodiments, the at least one processor further may act through the input/output device and may enable a user to interactively log causes for said discrepancies and/or aberrations. In other examples, the at least one processor may further act through the input/out device, which may enable a user to use an interactive log in order to search for solutions to similar discrepancies and/or aberrations.

Figure 3:
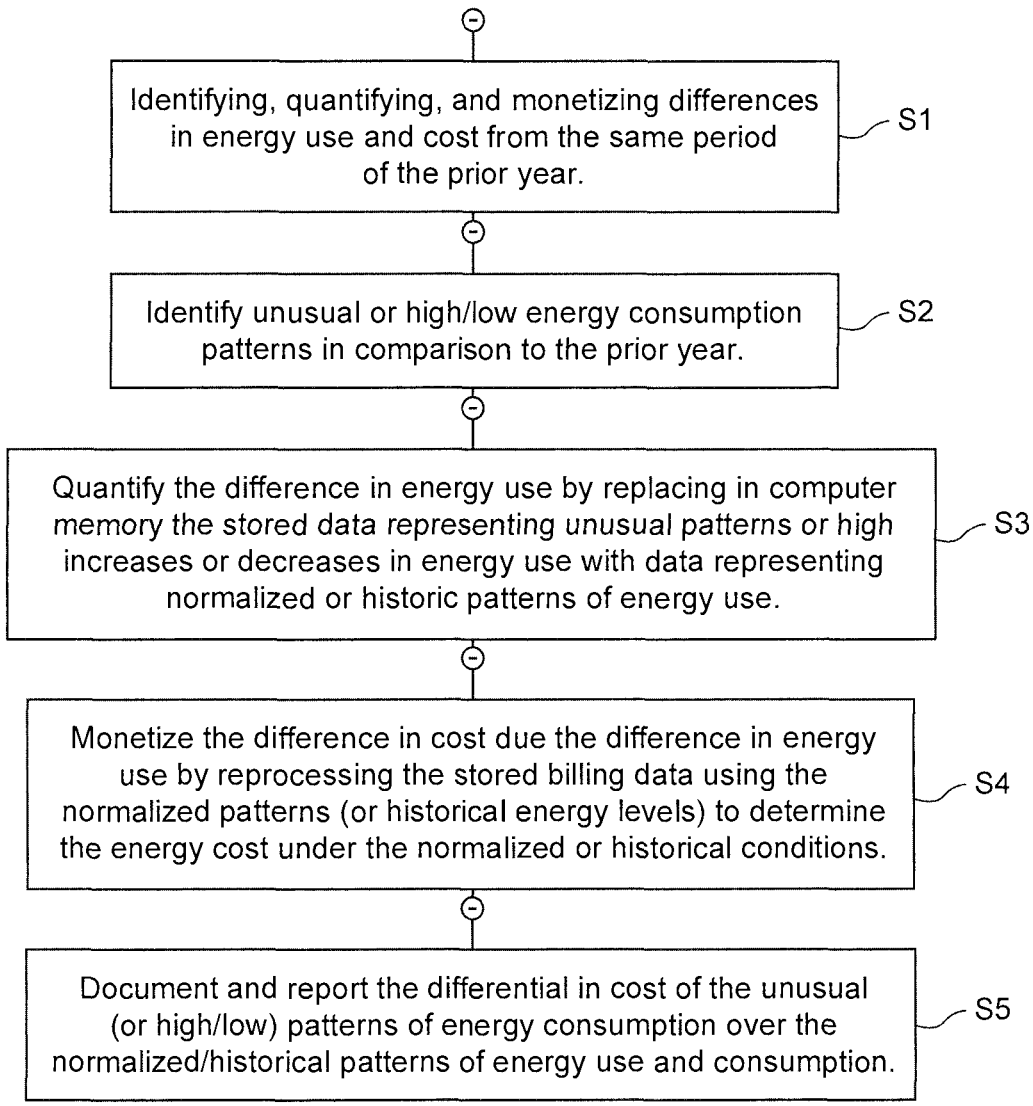
FIG. 3 illustrates an example software processing of the FIG. 1(a) system for identifying, quantifying, and monetizing differences in energy use from the same period of a prior year.

FIG. 3 illustrates an example system and/or method for identifying, quantifying, and monetizing differences in energy use from the same period of a prior year. The steps in FIG. 3 include: (S1) identifying, quantifying, and monetizing differences in energy use from the same period of a prior (e.g., the prior) year; (S2) identifying unusual or high/low energy consumption patterns in comparison to the prior year; (S3) quantifying the difference in energy use by replacing in computer memory the stored data representing unusual patterns or high increases or decreases in energy use with data representing normalized or historic patters of energy use (taken from historical or the prior year's records); (S4) monetizing the difference in cost due to the difference in energy use by reprocessing the stored billing data using the normalized patterns (or historical energy levels) to determine the energy cost under the normalized or historical conditions; (S5) documenting and reporting the differential in cost of the unusual (and/or high/low) patterns of energy consumption over the normalized/historical patterns of energy use and consumption.

Figure 4:
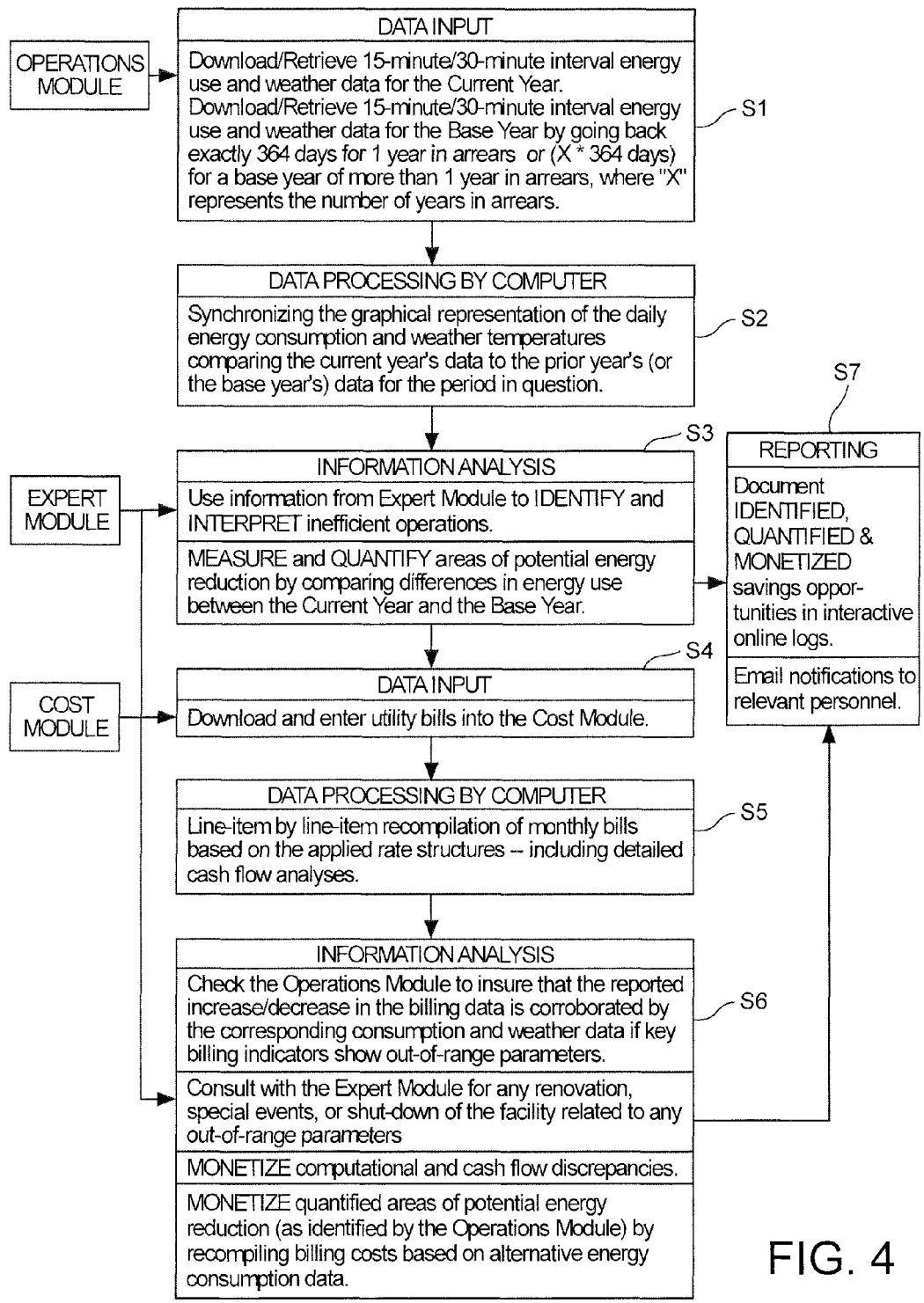
FIG. 4 illustrates a more detailed process workflow diagram related to example systems and/or methods.

FIG. 4 illustrates a more detailed process workflow diagram related to the overview of example systems and/or methods described with respect to FIG. 3. These processes are described in more detail below.

Certain example Operations modules may include a data input step. This is shown as S1 in FIG. 4. With respect to data input, the energy consumption intervals may be downloaded and/or retrieved from a database (e.g., a database owned and/or operated by a utility or commodity company). In certain instances, the consumption intervals may be in 15, 30, or 60 min. increments. However, in other examples, the consumption intervals may be provided in any appropriate increment. Furthermore, weather data may also be downloaded and/or retrieved.

Additionally, in certain example Operations modules, the same consumption intervals for a previous year may also be downloaded and/or retrieved in order to create a baseline to which the more current energy consumption/cost may be compared. In certain example embodiments, the baseline energy use and weather data may be acquired by going back in time exactly 364 days from the target date for one year in arrears (or any reasonable multiple of 364, e.g., 364*X, where X is anywhere from 1 to 5, etc.). In certain instances, X may represent the number of years in arrears. It will be appreciated that in certain instances, it may also be relevant to go back 350, 357, 371, and/or 378 days (e.g., to the same day of the week in the same (e.g., corresponding) week of a previous year, or the same day of the week in a week close to the corresponding week of a previous year).

The Operations module may further include data processing by a computer in certain example embodiments. This is shown as S2 in FIG. 4. The graphical representation of the daily energy consumption and weather temperatures may be synchronized by comparing the current year's data to a prior/baseline year's data, for the period in question, in certain examples.

In S3, an Expert module may be used to perform an information analysis, in certain example embodiments. For example, the information from an example Expert module may be used to identify and interpret inefficient operations, in certain example embodiments. Further, the areas of potential reduction may be measured and quantified by comparing differences in energy use, between the current year and the base year, in some instances.

From S3, one may proceed directly to S7, or one may continue with steps S4-S6 prior to arriving at S7. In certain examples, S7 may be performed twice—after S3 and again after S6. In certain example embodiments, after any areas of potential energy reduction are identified, interpreted, measured, and quantified, these results may be reported by documenting the identified, quantified, and monetized savings opportunities in interactive logs. In further examples, email notifications may be sent to relevant personnel.

S4-S6 are related to the cost module, and in certain examples, the cost analysis may also include data input (S4), data processing by a computer (S5), and information analysis (S6).

In certain example embodiments, the data input step of the cost analysis may include downloading and entering utility bills into the Cost module. More specifically, the data input step (S4) may include (a) downloading, scanning, or otherwise introducing a utility bill into a system; and (b) inputting the entries in the utility bill into the corresponding cost analysis module, according to certain example embodiments.

This may be followed by data processing by a computer (S5) in certain example embodiments. The data processing by computer (S5) may include line-item by line-item recompilation of month bills based on the applied rate structures. In certain examples, this may include detailed cash flow analyses.

More specifically, a computer may generate an output including, for example: (a) detailed line-item by line-item recompilation of the monthly utility bills included in the system—including a detailed representation of the monthly cash flow transactions in certain examples; (b) graphical and/or tabular representations of certain performance indicators of utilities (e.g., energy and/or water) use, price, and/or cost on a monthly, year-to-date, and/or historical basis (these representations may include more or less data than described herein according to different example embodiments; (c) graphical and/or tabular representations of, for example, daily, weekly, monthly, year-to-date, and/or yearly utilities (e.g., energy and/or water) use per gross square foot as compared to a specific base year and/or a related energy reduction baseline (for users who wish to compare current energy use to a baseline older than the two most recent fiscal years, etc.); (d) posting information (e.g., an image, graph, table, etc.) relating to the line-item by line-item recompilation of the cost analysis of certain utilities accounts (e.g., large electric/gas accounts, or any other accounts) to the corresponding account page of the cost analysis section of the webpage and/or program.

During cost analysis, the processing of data by a computer may be followed by an information analysis (S6), in certain example embodiments. The information analysis step of cost analysis may include checking the Operations module to insure that the reported increase and/or decrease in the billing data is corroborated by the corresponding consumption and weather data, if, for example, billing indicators show out-of-range parameters. Further, the information analysis step (S6) may include consultation with the Expert module for any renovation, special event, shut-down of facility, e.g., or the like, related to any out-of-range parameters. Furthermore, in (S6) any computation and/or cash flow discrepancies, as well as any quantified areas of potential energy reduction (e.g., as identified by the Operations module), may be monetized, for example, by recompiling billing costs based on alternative energy consumption data, in certain example embodiments.

More specifically, in certain cases, an example information analysis may include reviewing the line-item by line-item recompilation process for mathematical accuracy. This may include verifying compliance with contractual billing obligations between client facilities and commodity and/or utility companies. The information analysis may further include reviewing the graphical and/or tabular representation of certain indicators of out-of-range parameters in certain cases. The information analysis may also include checking contract records and/or issues tracking databases for additional information related to the account if billing discrepancies are encountered (e.g., check for a recent rate change, a pending billing issue, and/or the like). The operations analysis component may also be checked to ensure that any reported increase and/or decrease in billing data is corroborated by the operations and/or weather data if the certain performance indicators show out-of-range parameters.

The information analysis aspect of the cost analysis (e.g., S6) may also optionally include documenting reasons for discrepancies (e.g., if information is found to justify and/or explain the discrepancies) for future reference. If no reason for a discrepancy is found (e.g., if the discrepancy remains unexplained), an alert may be sent to a user requesting clarification in some cases. In certain examples, this alert may be a "push alert" sent via email. The issue may further be logged under the "issues tracking" section/component for optional further pursuit and/or analysis if no information is found that can justify and/or explain a discrepancy.

During cost analysis, the information analysis may be followed by report generation, in certain example embodiments (S7). In certain examples, report generation may include generating an image/file of the line-item by line-item bill recompilation and/or the graphical and/or tabular representation of certain performance indicators of each utility account. This generated file may be sent to the user (e.g., emailed and/or the like) and/or made available for the user's review (uploaded to a webpage or centralized server, sent to the user for downloading, any method of making a file available to a user, etc.).

A second aspect of a "delayed delivery" synchronization system and/or method may involve the process of incrementally updating the operations analysis section/component. The processes of updating the operations analysis may also include data input, data processing, information analysis, and/or report generation in certain example embodiments.

Figure 5:
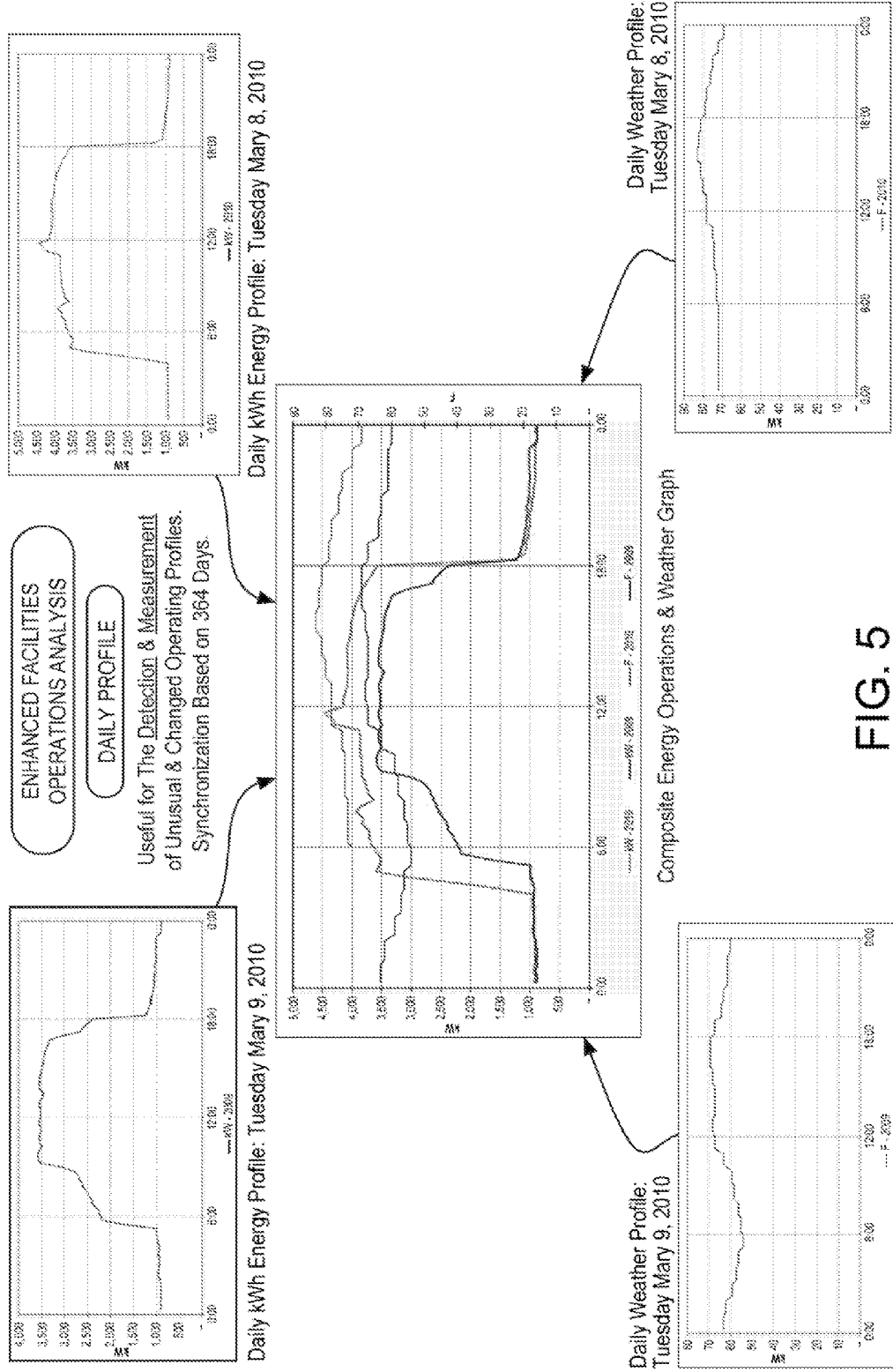
FIG. 5 shows an example comparison of one day in a baseline year to the corresponding day in a current year.
Figure 6:
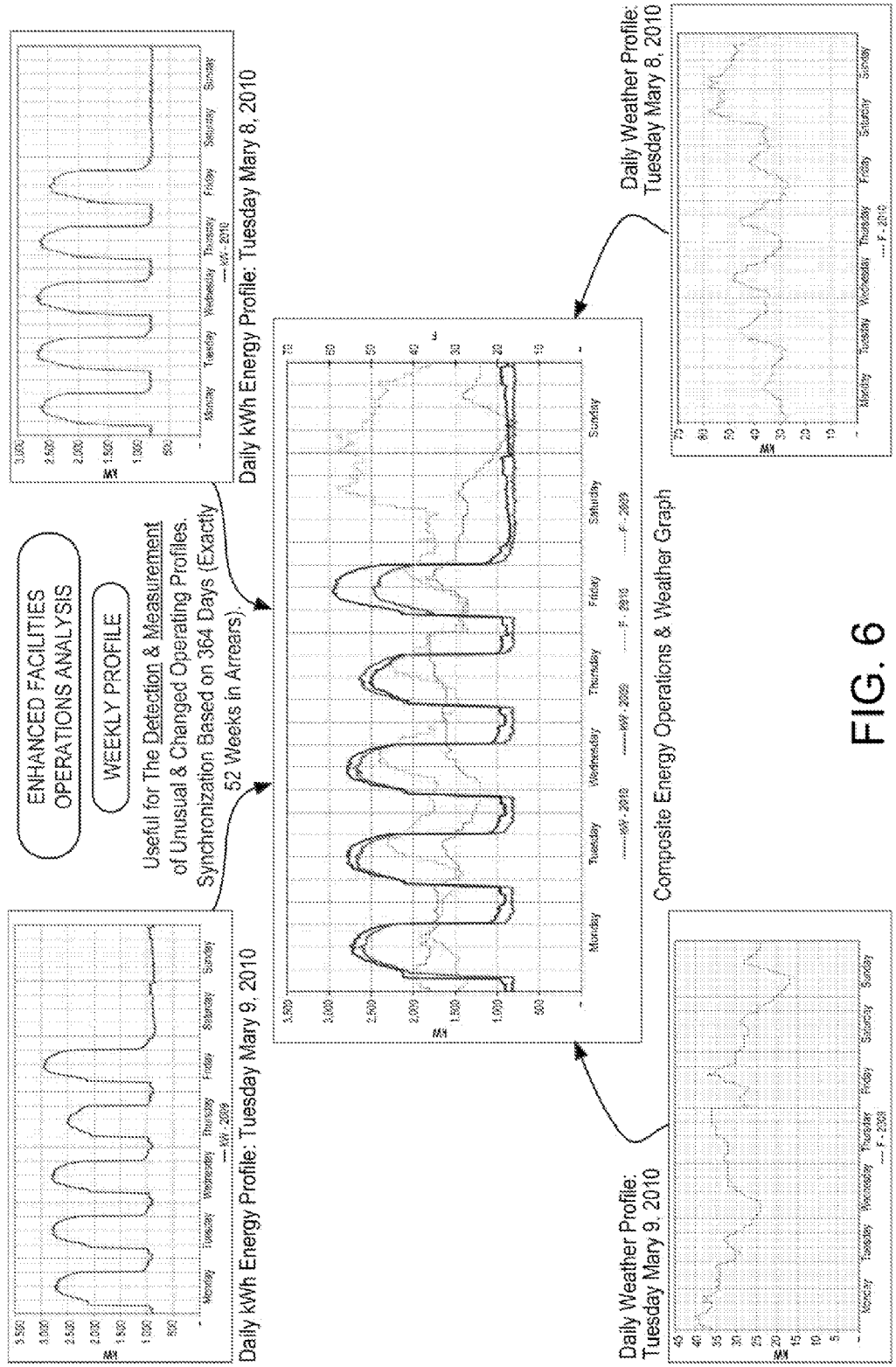
FIG. 6 shows an example comparison of one week in a baseline year to the corresponding week in a current year.

In certain example embodiments, the data input may include tabulating incremental use and/or weather data for each current period (e.g., day, week, month, quarter, etc. of the current year). For example, FIGS. 5 and 6 illustrate how energy profiles from a prior (e.g., baseline) year and a current year may be synchronized to form one graph that includes a representation of the energy profiles. Further, in certain example embodiments, the corresponding weather from the baseline year and the current year is added to the graph in order to compare both the energy profile differences and weather differences between the baseline time period (e.g., hour, day, week, month, etc.) in the baseline year with a current time period (e.g., the more current hour, day, week, month, etc., for which performance analysis or the like is sought) in the current year.

FIG. 5 is a graph illustrating a comparison of one day in a baseline year to the corresponding day in a current year, while FIG. 6 is a graph illustrating a weekly correlation.

In some cases, the usage intervals may be inputted into a file (e.g., a spreadsheet or the like). However, the data may be inputted to any program, webpage and/or any other suitable holder for the data (e.g., an Excel spreadsheet). In certain example embodiments, the intervals of usage may be 15 minute, 30 minute, 60 minute, and/or any appropriate interval, for each day (e.g., as illustrated in the graphs of FIGS. 5 and 6). In other examples, the usage intervals may be in any increment normally provided by a utility company. The usage intervals may also be inputted in any increment desired by a client/customer. The entry and/or downloading of this data may be performed as the data is made available by the utility company, or at other pre-determined intervals. The weather data corresponding to each day and/or usage interval may be inputted and/or downloaded etc. into the file containing the usage intervals, too, in some cases.

The information from the inputted data may be processed by a computer, and the computer may produce a computer-generated output, in certain cases. The computer-generated output may include synchronized graphical representation of the correlation of the daily energy consumption and weather temperatures comparing the current year's data to a prior year's data for any given corresponding day and/or time period as implemented in the data inputting step(s) described above. In certain example embodiments, this will advantageously allow for the synchronized graphical analysis of the hourly, daily, weekly, etc., operations from one year to the next; a Monday will always be synchronized with a Monday, and a Sunday will always be synchronized with a Sunday. For example, the synchronization may be between any given day and a day exactly 364 days prior to the day in question, as described above with respect to certain example embodiments. To do otherwise, such as trying to synchronize by month or by day of year, may result in a mismatch of days and operating profiles, which may in turn make the comparison useless. For example, Apr. 4th of 2011 falls on a Monday (a working day), whereas, Apr. 4th of 2010 falls on a Sunday (a weekend). The operating profiles of a work day and a weekend day may be drastically different, and thus an accurate energy and/or utility-usage comparison may not necessarily be made.

The computer-generated output may also include tabular and/or graphical display of the daily energy and weather data for any given day and/or time period in comparison with the corresponding period of a prior year, in some cases. In further examples, the output may also include the hourly, daily, weekly, etc., differences between the current year's data and the prior year's data, which may be expressed as a percentage (e.g., the various percentages that these differences represent). The computer-generated output may also include tabular and/or graphical representation of the interval data (e.g., 15-minute, 30-minute, 60-minute interval data, etc.) used in generating the synchronized correlation graph described above. An image of each graph (e.g., hourly, daily, weekly, monthly, etc.) may be posted to the corresponding account page of the operations analysis component/section of a webpage, file and/or program, etc., in certain cases. In certain non-limiting implementations, the graphs may be weekly. In other cases, an interactive log may be provided under each periodic graph posted in the "Operations" section of the website, file, program, etc., to allow users to comment on, or explain, the information presented in the graph. This may be particularly advantageous if there is an easily-recognizable discrepancy, such as a large difference in temperature, a conference, a holiday (e.g., July $4^{th}$), and/or the like. In cases such as those, the interactive log may be used to describe the reason for the discrepancy.

Another aspect of the operations analysis component of certain example synchronization systems and/or methods is information analysis, in certain example embodiments. In certain example instances, the information analysis may include the data may be analyzed by reviewing the daily graphs such as that shown in FIG. 5 to determine the presence of possible operating errors, equipment problems, and/or hard-to-detect billing errors. Other periodic intervals of time may also be used (e.g., weekly, as shown in FIG. 6, or even monthly and/or yearly, or hourly, according to different example embodiments.) This may be done by identifying irregular profiles and comparing them to documented patterns of unusual circumstances. These could represent inefficient operations for which solutions are known based on historical empirical analysis in certain example embodiments, as described by the methods of U.S. Pat. No. 6,366,889 B1 by the same inventor. The information analysis may also include identifying areas of potential energy reduction based on a detailed assessment of the current and historical daily operating profile taking into consideration the function of the facility, its weekly operating hours, and/or other relevant parameters. For example only, an office building that uses 60% of its peak operating energy during nights and weekends, when most of the staff are gone, may have potential to reduce operating costs through the adoption of vigilant operations, the installation of more efficient lighting, the installation of motion sensors, the installation of a computerized energy management system, and/or a combination of any of the above.

The information analysis may further include measuring the results of changes in operating performance from the implementation of innovative solutions by easily identifying, quantifying, and monetizing differences in energy use from the same period of the prior year. It may also involve checking the corresponding weather data and/or other relevant components/sections of the expert system for any renovation, expansion, and/or shut-down of the facility if the daily graphs show unusual increases and/or decreases in energy use.

In certain example embodiments, the reasons for discrepancy (e.g., unusual increases and/or decreases in energy use), if known and/or discovered, may be documented in a log below the graph (e.g., the interactive log). In other embodiments, an alert may optionally be sent to the user requesting clarification, and optionally logging the issue under the issues tracking section for further pursuit and/or analysis if no information is found that can justify or explain the unusual increases or decreases in energy use.

The report generation aspect of the operations analysis may include generating a file and/or image corresponding to each newly generated graph, and sending and/or making available the file to the user.

Figure 7:
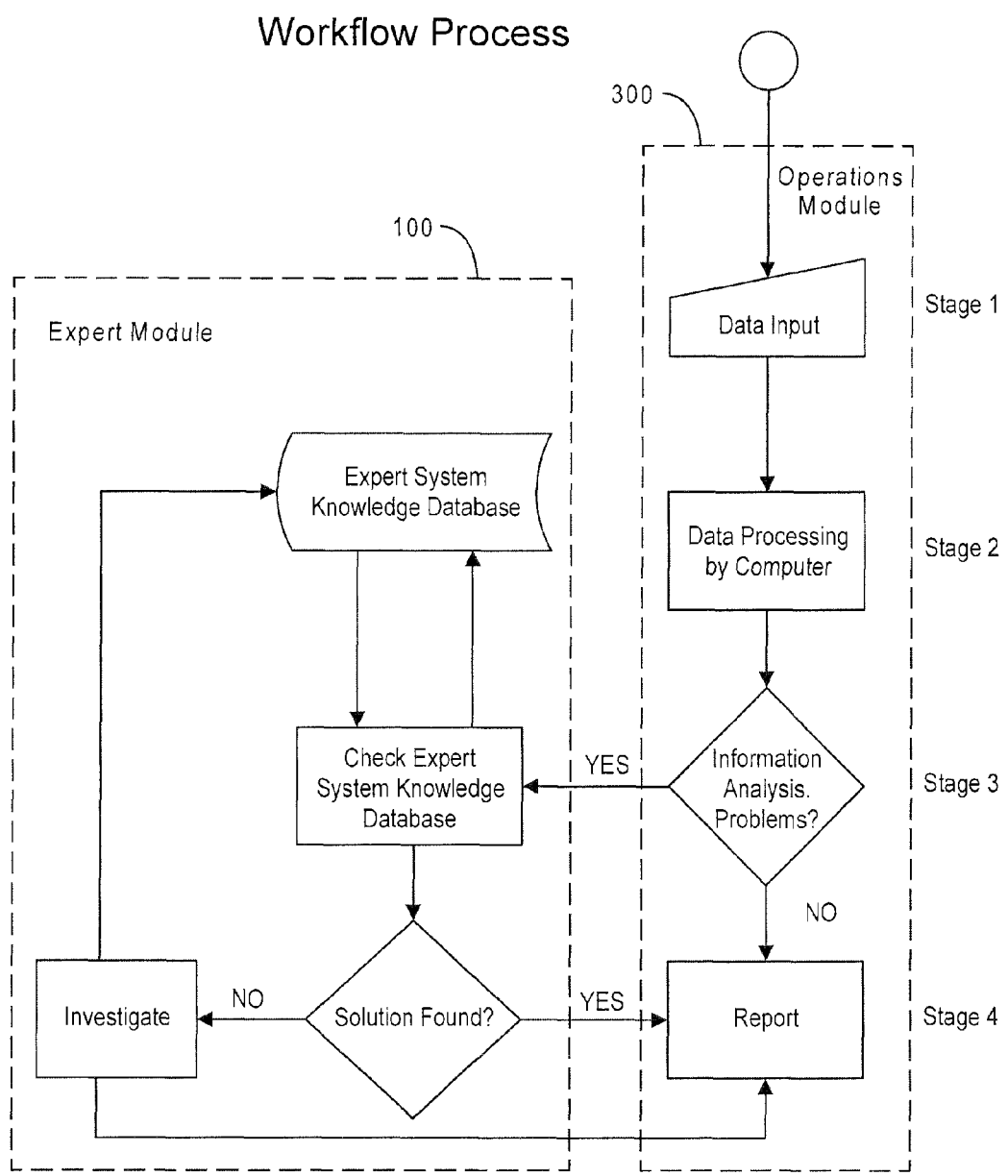
FIG. 7 illustrates a workflow process according to certain example embodiments.

For example, FIG. 7 illustrates an example workflow process for expert module 100, cost module 200 and operations module 300. In certain example embodiments, the cost analysis and/or operations analysis modules may include (1) data input; (2) data processing by computer; (3) information analysis; and (4) report generation. In certain example embodiments, if any problems arise during the information analysis of said data, the expert module comprising at least knowledge data base may be checked for a solution. If no solution is found, an investigation may be performed. In any event, a report will be generated after data processing and information analysis, in certain example embodiments.

Turning more specifically to the Expert module, certain example Expert modules/systems described herein may serve as an indispensable interactive and expandable knowledge base that provides context for a quick understanding of the links between the operating and financial performance of a given facility and its mechanical systems, its function, operating hours, tenant activities, energy rates, maintenance issues, occupancy, weather, and any other relevant factors, in certain example embodiments. The Expert module may serve as the "memory" of an example system. It may provide instant access and reference to relevant knowledge for the accurate identification and interpretation of inefficient operating and financial performance related to usual and unusual operating patterns in energy consumption.

In certain exemplary embodiments, the Expert module may serve as an all-encompassing, interactive, fully indispensable and/or expandable knowledge base that collects and/or organizes information from a plurality of system participants. The Expert module may present the information in a manner that provides for the interpretation of the information presented in the Operations module, and/or the identification of inefficient operational practices. Furthermore, in certain instances, the Expert module may leverage information collected from the plurality of system participants to improve their purchasing power with respect to electricity and/or gas commodities. The Expert module may also provide a forum for the sharing and exchange of knowledge and ideas, in certain example embodiments. It may further provide a collection of facts and/or rules for solving problems as well as providing context for a quick understanding of the links between the operating and financial performances of a given facility, in certain instances. The Expert system/module may also provide context for a quick understanding of the links between the aforesaid performance of a given facility, and its mechanical systems, function, operating hours, tenant activities, energy rates, maintenance issues, occupancy, special events and/or situations, weather, and/or any other relevant factors.

Figure 8:
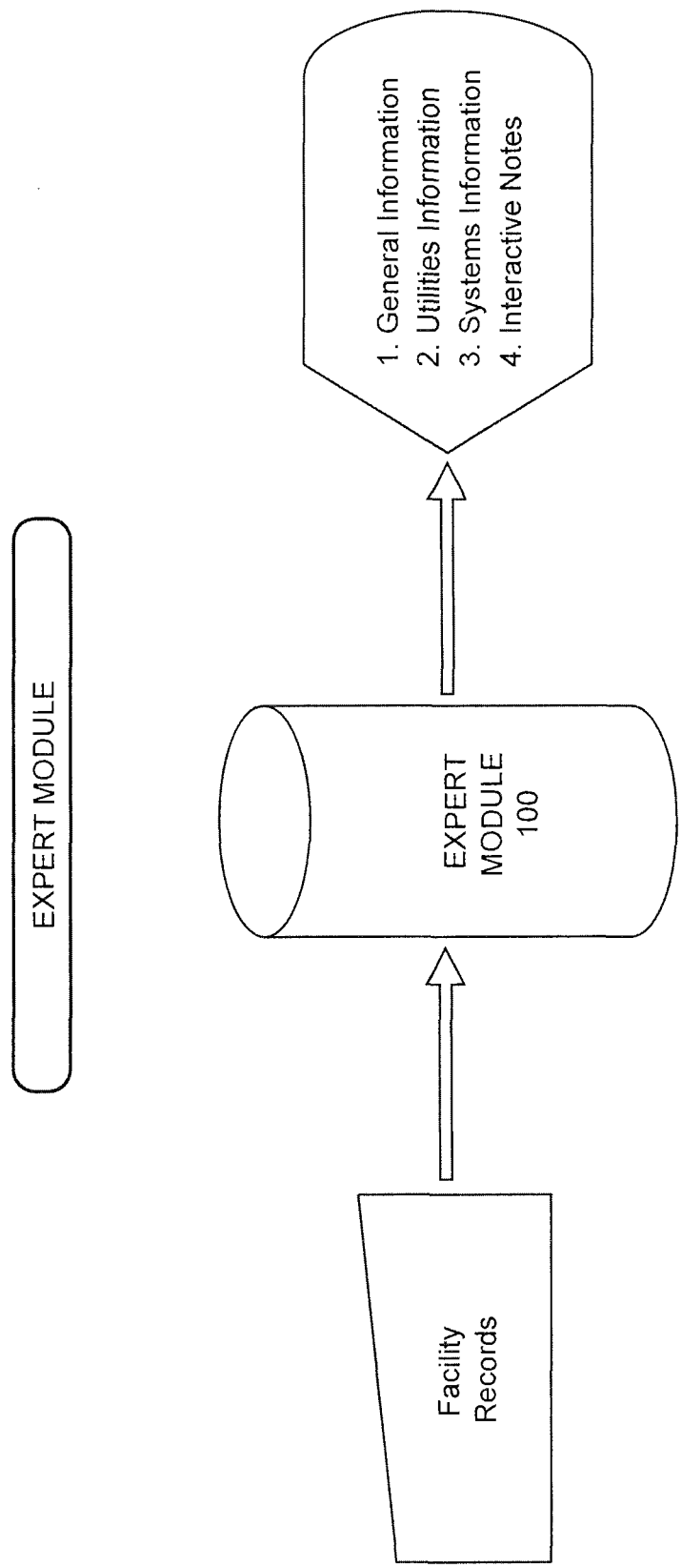
FIG. 8 is a flow diagram illustrating certain example components of an example Expert module.
Figure 1:
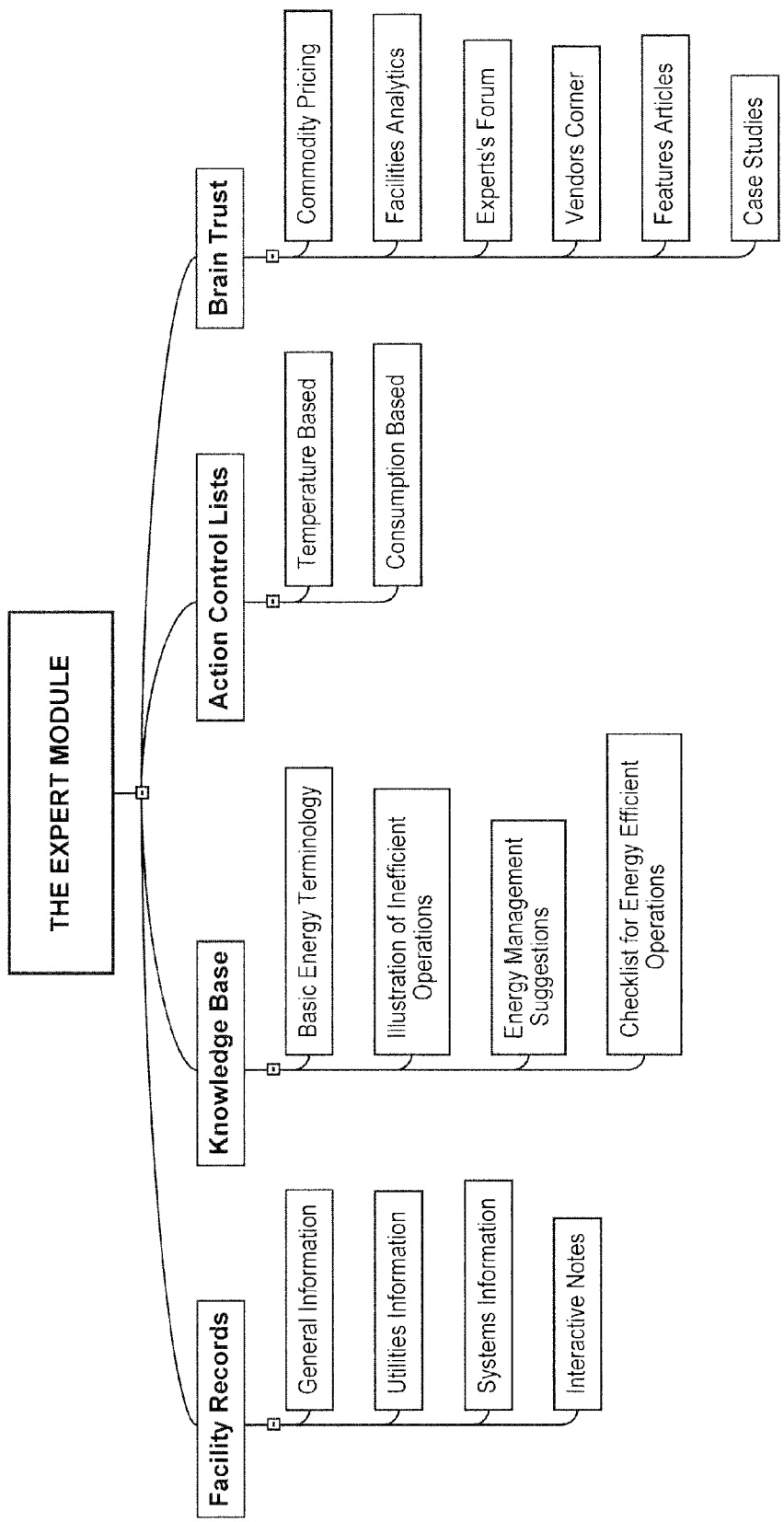

FIG. 8 is a flow diagram showing that certain example components, such as facility records, may be inputted into the Expert module. This information may include general information, utilities information, systems information, and/or interactive notes.

FIG. 9 illustrates an example overview of the Expert module. In certain instances, the Expert module may include at least some and/or all of the following four components: (1) Facility records, (2) Knowledge Base, (3) Action Control Lists, and/or (4) Brain Trust.

Turning more particularly to each of these components, in certain example embodiments, the Facility Records component may aggregate much and/or all information related to a given facility under one roof. It may provide context for a quick understanding of the links between the operating and financial performance of a given facility and its mechanical systems, its function, operating hours, tenant activities, energy rates, maintenance issues, occupancy, weather, and any other relevant factors, in certain example embodiments.

It may provide instant access and reference to relevant knowledge for the accurate identification and interpretation of inefficient operating and financial performance related to usual and unusual operating patterns in energy consumption. The Facility Records component may include General Information, Utilities Information, Systems Information, and Interactive Notes The General Information section provides basic information regarding the facility, such as a picture of the facility, its address (also displayed on a live Google map), function, total area, year built, operating hours, tenants' makeup and operations, the presence of any special operations or equipment, such as a data center, labs, auditorium, and/or the like.

The Utilities Information section provides the name of the utility companies serving the facility, the number of utility accounts associated with each utility, and the number and type of meter associated with each utility account—as well as other important relevant information such as whether the facility is being fed by other sources of energy from a neighboring facility (such as steam, gas, hot water, chilled water, etc. . . . ) and whether the facility itself feeds any type of energy to other neighboring facilities (such as gas, hot water, steam, etc. . . . )

The Systems Information section provides general information regarding the structure and layout of the various heating, cooling, and electronic systems at the facility. Also information that would indicate if this is an all-electric facility, a facility that has dual-fuel capability, etc.

The Interactive Notes section provides additional information of any kind. It may include the date of the new entry, category of the new information (i.e. electricity, gas, or water related), followed by the title and description of the new information. The name of the author as well as the date of entry will be automatically recorded by the system. The kind of information that can be entered in this component includes information such as a record of a major water leak, new boiler installation, replacement of a faulty electric meter, a major vacancy or renovation, and/or the like.

Turning to the Knowledge Base aspect of the Expert module, the Knowledge Base component mainly includes providing a collection of facts, suggestions, and recommendations on how to operate a facility for improved operating and financial efficiency, in certain example embodiments. The Knowledge Base may include Basic Energy Terminology, illustration of inefficient operations, energy management suggestions, and/or a checklist for energy efficient operations.

The Basic Energy Terminology section may include definitions of electric energy, electric power, how utilities measure electric demand, as well as the definition of Load Factor and other important parameters.

The Illustration of Inefficient Operations section builds on an important aspect of U.S. Pat. No. 6,366,889 B1 to the same inventor by providing illustrations, characteristics, criteria, and explanation of documented patterns which could represent inefficient operations for which diagnosis and solutions are known (based on empirical analysis over a long period of time). This section also provides operating engineers recommendations and guidelines on how to best operate their facilities in order to avoid the occurrence of similar inefficient operations in the future.

The Energy Management Suggestions section includes providing recommendations on improved and/or preferable methods to operate chillers, boilers, air handlers, emergency generators, and pumps under different operating conditions.

The Checklist for Energy Efficient Operations section includes spring and summer checklist for energy efficient operations, no cost and low cost energy management opportunities, and potential energy conservation opportunities for office buildings and warehouses, etc.

The Action Control List(s) component may have temperature and/or consumption-based aspects. In certain example embodiments, the Action Control List(s) component can be used to provide a list of predefined actions—or sequences of actions—that operating engineers would be recommended to take when a combination of specific operation and/or temperature conditions has been met. For example, this component can provide the sequence of equipment to turn on and how long to wait before initiating the startup of each piece of equipment after an electric power outage, in order to avoid a demand spike which would result if all equipment were to suddenly start up at the same time after a power outage. It could also provide the sequence of equipment to startup and how long to delay each startup if the outside temperature falls below a certain predefined level on cold winter days in order to avoid electric demand spikes on the coldest winter days. The list can also be used for weekend operations, for sudden temperature increases in the middle of the day, etc.

The virtual automatic computerized Brain Trust component of the Expert module may serve several distinctive purposes, in certain example embodiments. For example, it may leverage information collected from system participants to improve and/or optimize the efficiency of commodity markets by listing the contract parameters of participants' commodity contracts—without divulging their "owners", in certain instances. This may provide other participants with "benchmarks" from which to conduct their negotiations with commodity suppliers. Furthermore, through the Brain Trust, the system participants may be ranked (for example) in order to see how their operating performance and/or efficiency compares to that of other system participants.

In certain example embodiments, a comparison among different facilities for energy and/or commodity usage and/or cost on a particular day may advantageously show system participants whether any deviations from normal operations and/or costs are localized and/or specific to a particular participant, or whether the deviations from normal operations/costs similarly affected different participants in the same industry, or with the same type of facility, or in a particular physical location. For example, abnormal weather, city-wide events, or a unique situation affecting one particular type of facility may be used by the Brain Trust to explain deviation patterns in system participants' operations. Additionally, the lack of similar deviation patterns may also be indicative of a specific problem at a specific location of a system participant's facility.

The Brain Trust component may also leverage the use, price, and cost analytics of system participants in order to get a better understanding of how price relates to consumption and peak demand levels, correlating consumption with price, price with Load Factor, Load Factor with type of facility for different commodity suppliers and/or energy markets, in certain example embodiments.

The Brain Trust component of the Expert module may also provide for an "Experts' Forum", which may serve as a platform for collaborating to find solutions to common problems facing energy mangers, and/or as a platform for the sharing of knowledge and ideas regarding the availability and the implementation of new energy systems, methods, and technologies.

Additionally, in certain instances, the Brain Trust component may also provide a "Vendors' Corner" which enables vendors to advertise new technologies, systems, and services and for users to be aware of these new systems, methods, and technologies.

The Brain Trust may even, in certain instances, provide for feature articles, case studies, and other contributions by participating members as well as by a professional staff of energy experts consistent with those provided by existing energy and industry publications.

In certain example non-limiting embodiments, the entire Expert module and/or certain aspects of the Expert module may include artificial intelligence technology. However, it other examples, it may not.

Figure 10:
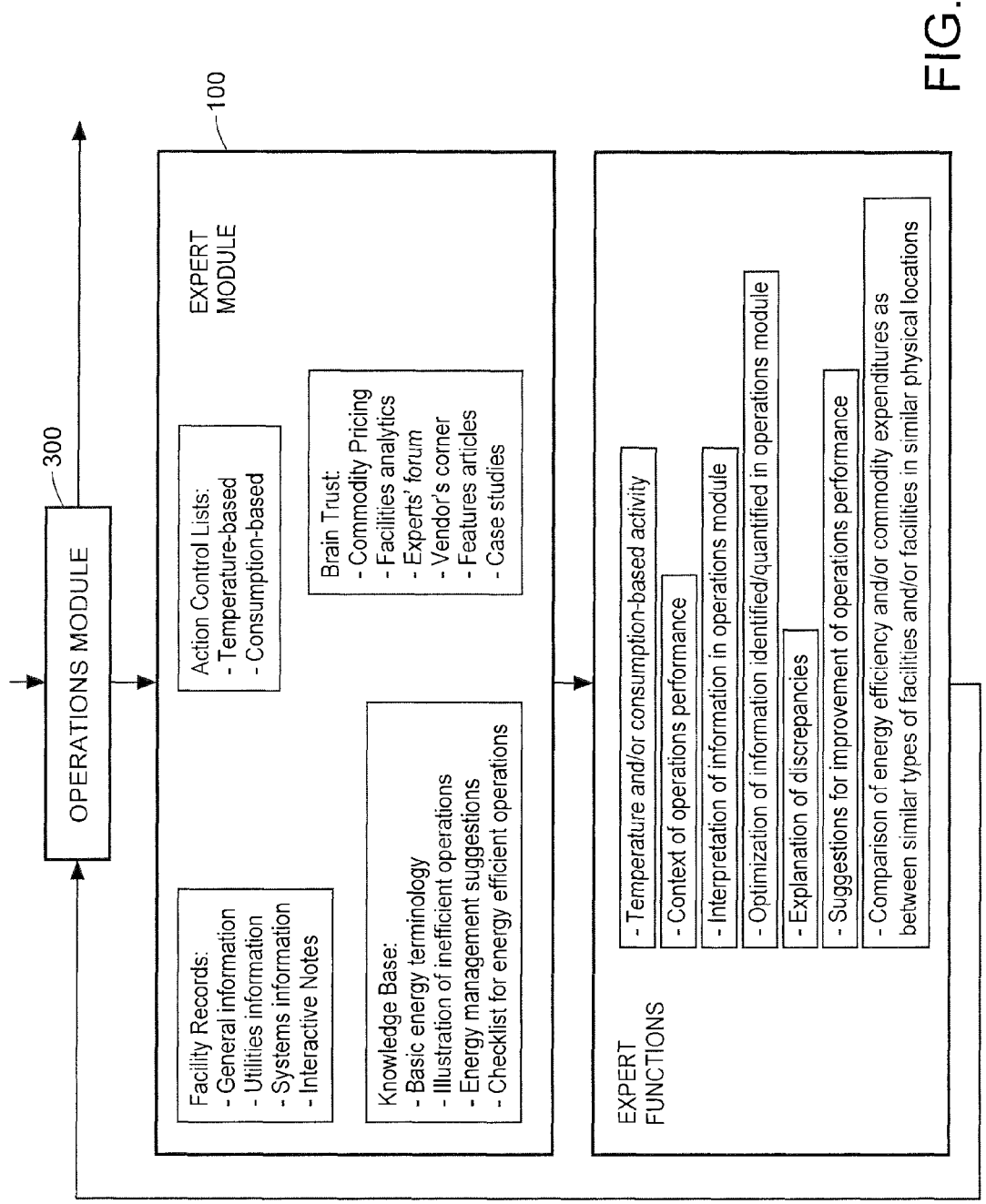
FIG. 10 is a block diagram illustrating certain example embodiments of the Expert module.

FIG. 10 is a block diagram illustrating certain example embodiments of the Expert module. FIG. 10 illustrates that the above-described sections and components of the Expert module may all contain information that is inputted to a processor. The processor may include the Operations module, in certain examples. The inputted information is analyzed by the Expert module via the processor, and the processor outputs, for example, context for the operational performance, interpretation of operational data, optimization of information identified and/or quantified in the operations module, explanation of any discrepancies, suggestions for improvement of operations performance, comparison of energy efficiency and/or commodity usage and/or expenditures as between similar types of facilities and/or facilities in similar physical locations. Furthermore, the analysis of the Expert module may further produce temperature and/or consumption based action suggestions. For example, if the analysis shows that particular temperature and/or consumption-based limits have been exceeded, suggestions for reduction in temperature and/or consumption may be outputted by the processor. Additionally, certain actions may be triggered by the analysis in some instances.

Figure 11:
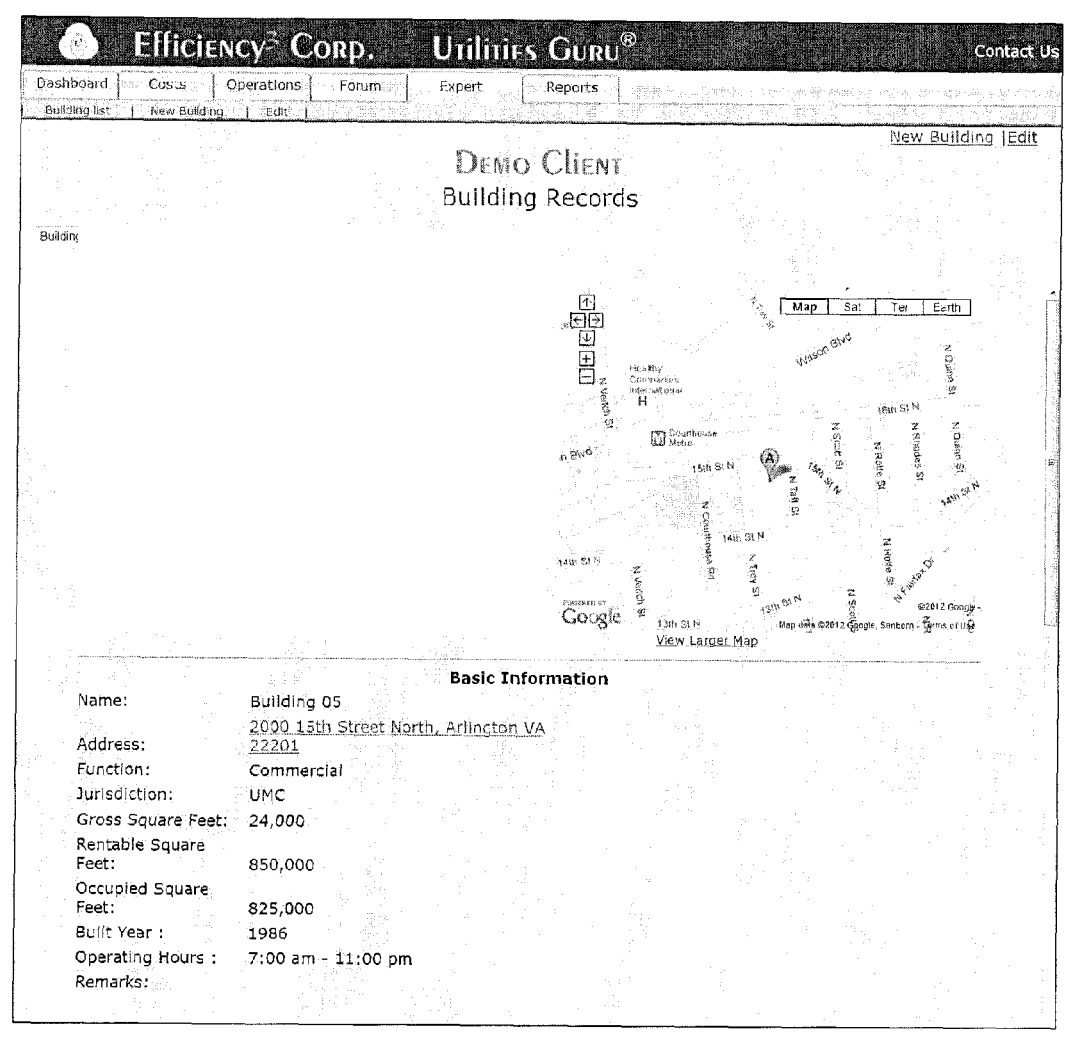

FIG. 11 illustrates a snapshot of an example (e.g., partial) Expert module. In certain example embodiments, a pull-down menu on the upper left-hand-side of the Fig. may provide instant navigation to the various components of the Expert module.

The information presented in the FIG. 11 illustration described above is an example non-limiting embodiment, and may be arranged and expanded upon at will. Further, the illustrations of the example various components relating to certain example embodiments are being presented in the context of a "full-fledged" performance management system as provided by Efficiency3 Corp. Such a system typically encompasses other components such as a "Dashboard" section, a "Forum" section, and a "Reports" section.

Turning to the Cost module, in certain example embodiments, the Cost module is a component for the identification of financial waste and/or monetization of operating waste. It also may provide substantially accurate financial measurements of the results of implemented energy management solutions, and substantially accurate assessments of the savings and the opportunity costs of proposed energy management solutions. In certain example embodiments, the Cost module may include at least some and/or all of the following four components:

(1) Comprehensive Bill Analysis: This aspect of the cost module may include a detailed line-item by line-item recompilation of monthly bills for the current and up to two most recent fiscal years—based on the applied utility rate structures—including detailed cash flow analysis. This component is used for the identification of billing errors (financial waste) as well as for understanding how energy operations impact energy costs.

(2) What-If Financial Modeling: This component allows the user to modify any aspect of energy use and price (as laid out in the Comprehensive Bill Analysis section above) and derive the resulting difference in cost. This component can be used to monetize hidden operating and financial waste, provide accurate assessments of the savings and the opportunity cost from proposed energy management solutions, measure the actual savings from implemented energy management solutions, and assist in budget planning.

(3) Visual Indicators: This component provides detailed visual analysis of every component of energy use, price, and cost of every utility bill over for a period of up to 3-years. This component provides for the quick detection and explanation of unusual patterns in use, price, and cost.

(4) Interactive Online Access: This component provide instant access to historical snapshots of billing records, instant access to the applied utility rate structures and commodity contracts, instant access to bill archives and an interactive log under the historical snapshots of the billing records to allow users to comment on, and explain, unusual patterns in use, price, and cost, such as billing errors, cancelled bills, partial bills, etc. This component helps with the quick understanding of the applied utility rate structures, for negotiating better commodity contracts, for a quick grasp of current and historical billing profiles, as well as for analyzing the monthly cash flow of utility transactions.

Figure 12A:
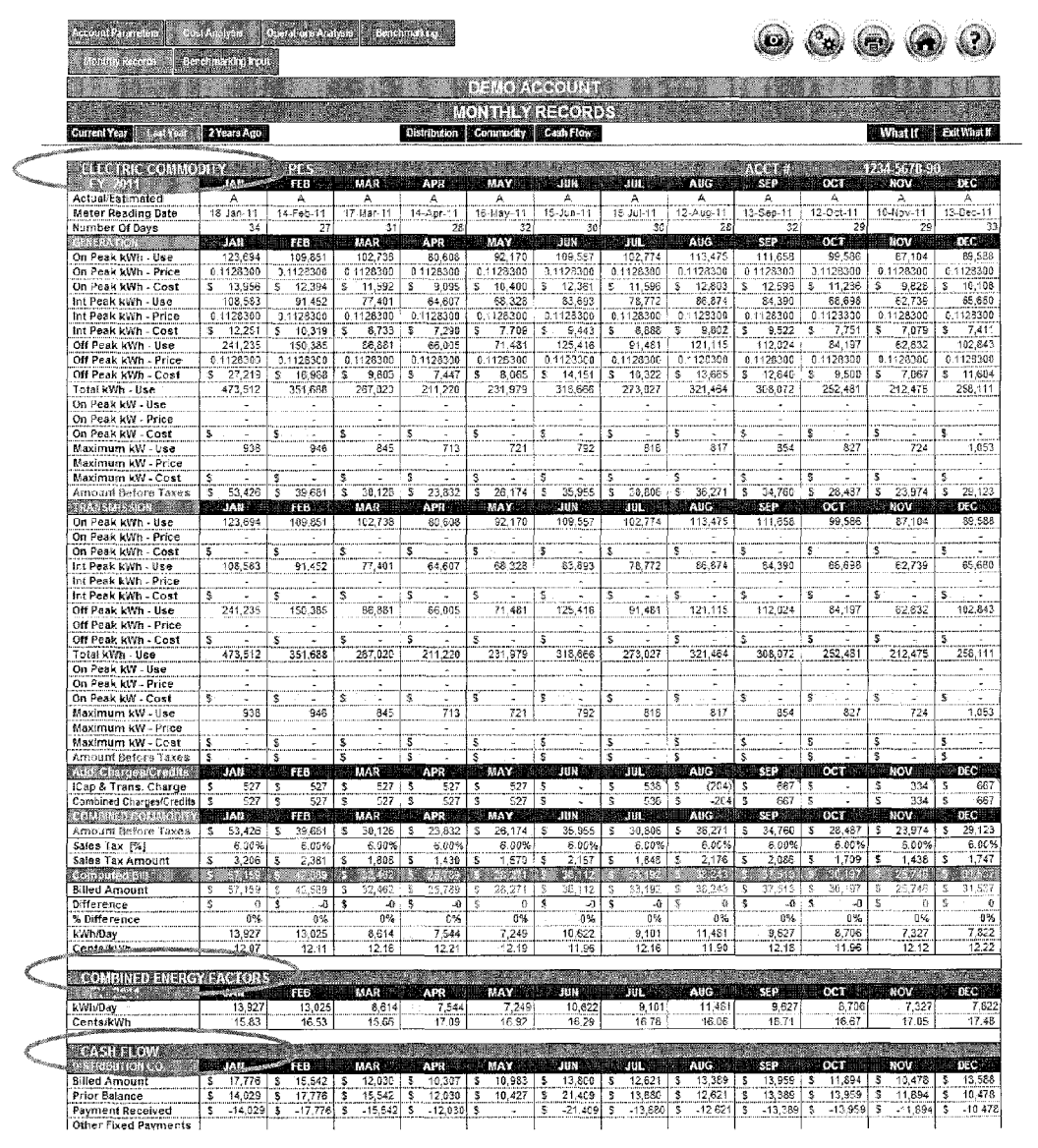

With respect to the Comprehensive Bill Analysis, FIG. 12(a) illustrates an example method of the line-item by line-item recompilation of a facility's monthly electric bills. FIG. 12(a) represents a partial 12-month representation of applied electric rates. In contrast to many competing software programs that use a database driven universal rate engine to re-compute a facility's utility bills, certain example embodiments may utilize Microsoft Excel spreadsheets configured specifically to mirror the intricacies of the rate schedules applied to the subject facility.

Figure 12B:
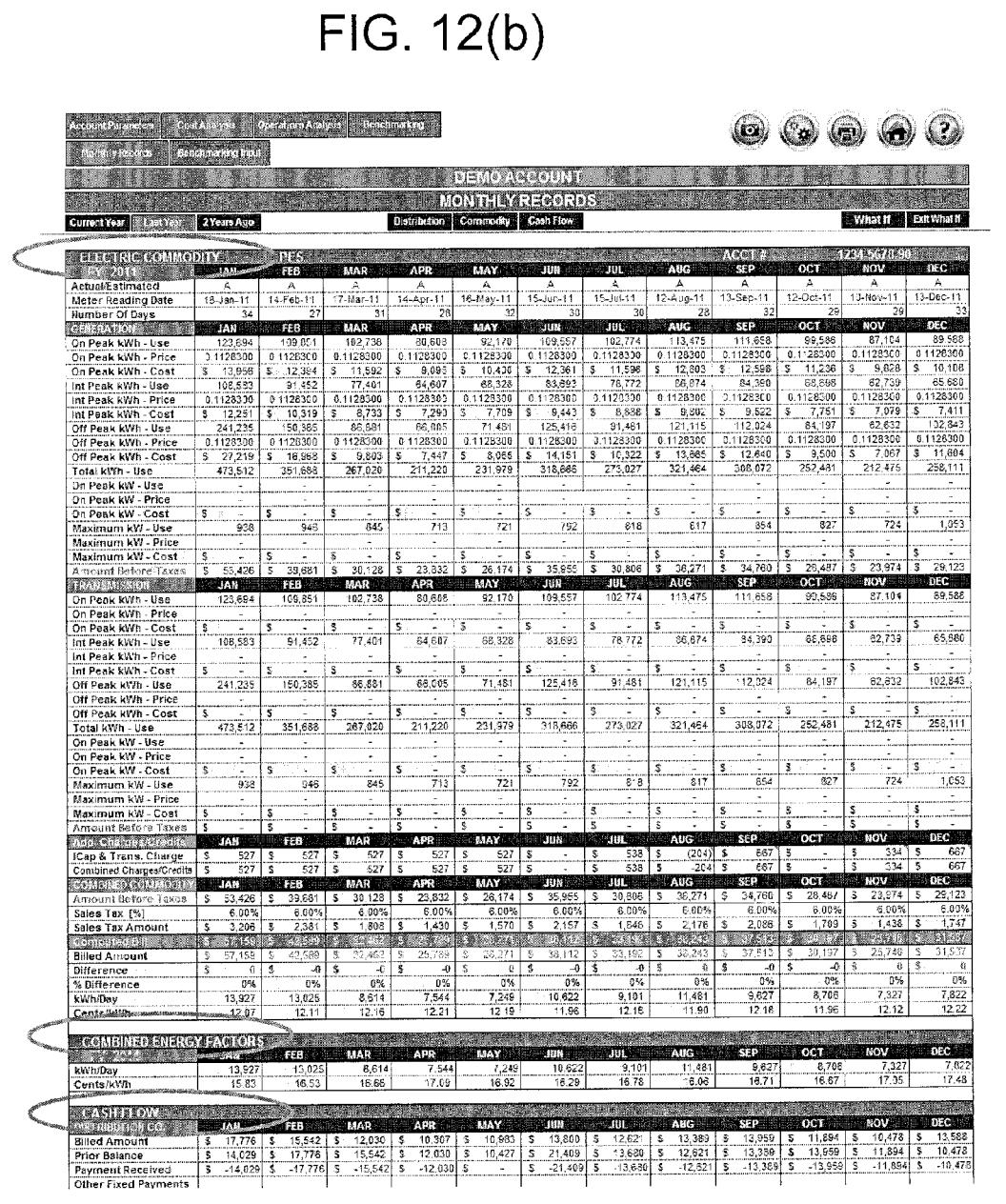

FIG. 12(b) represents the last section of the line-item by line-item recompilation method explained above.

Figure 13A:
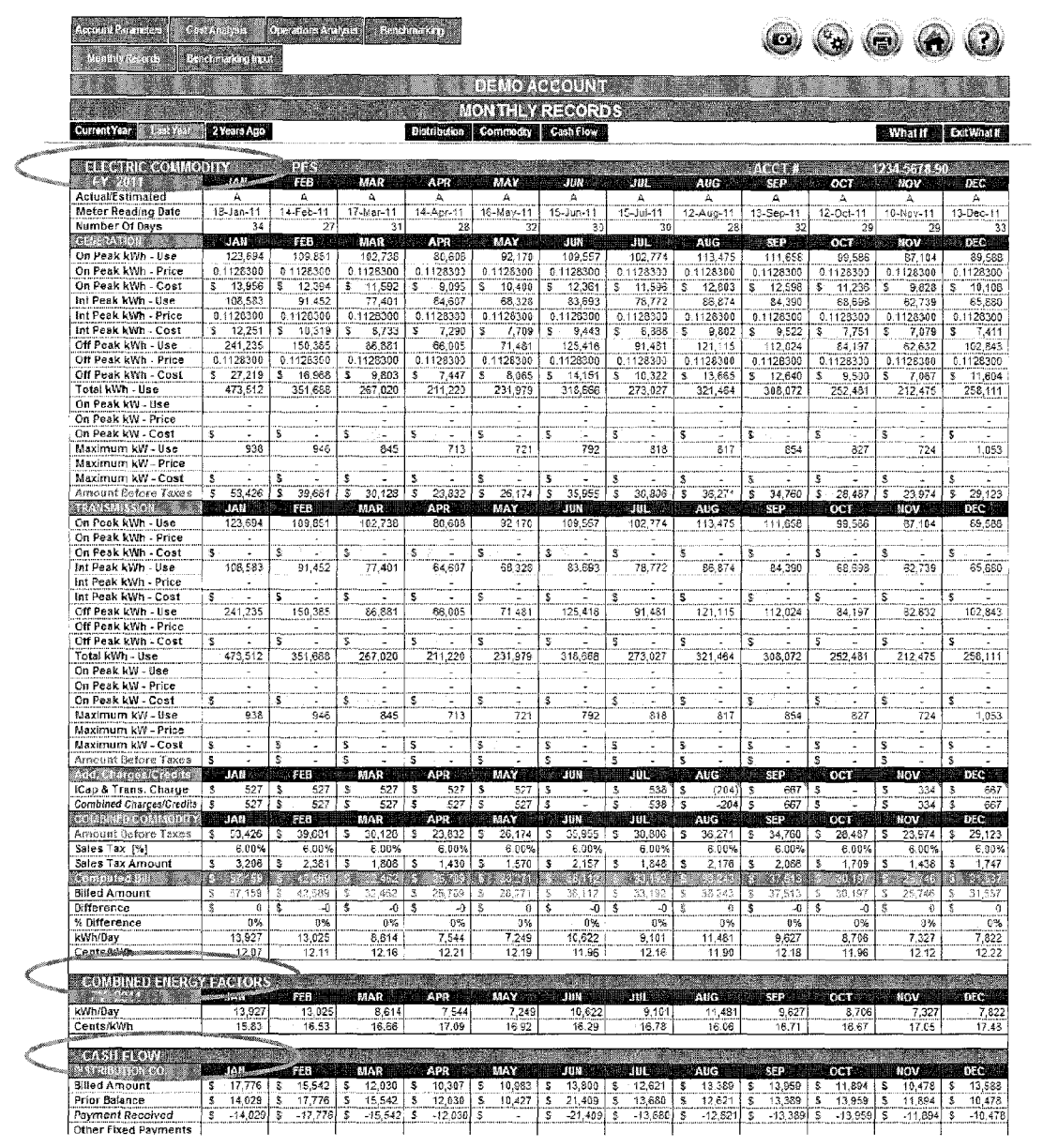
Figure 13B:
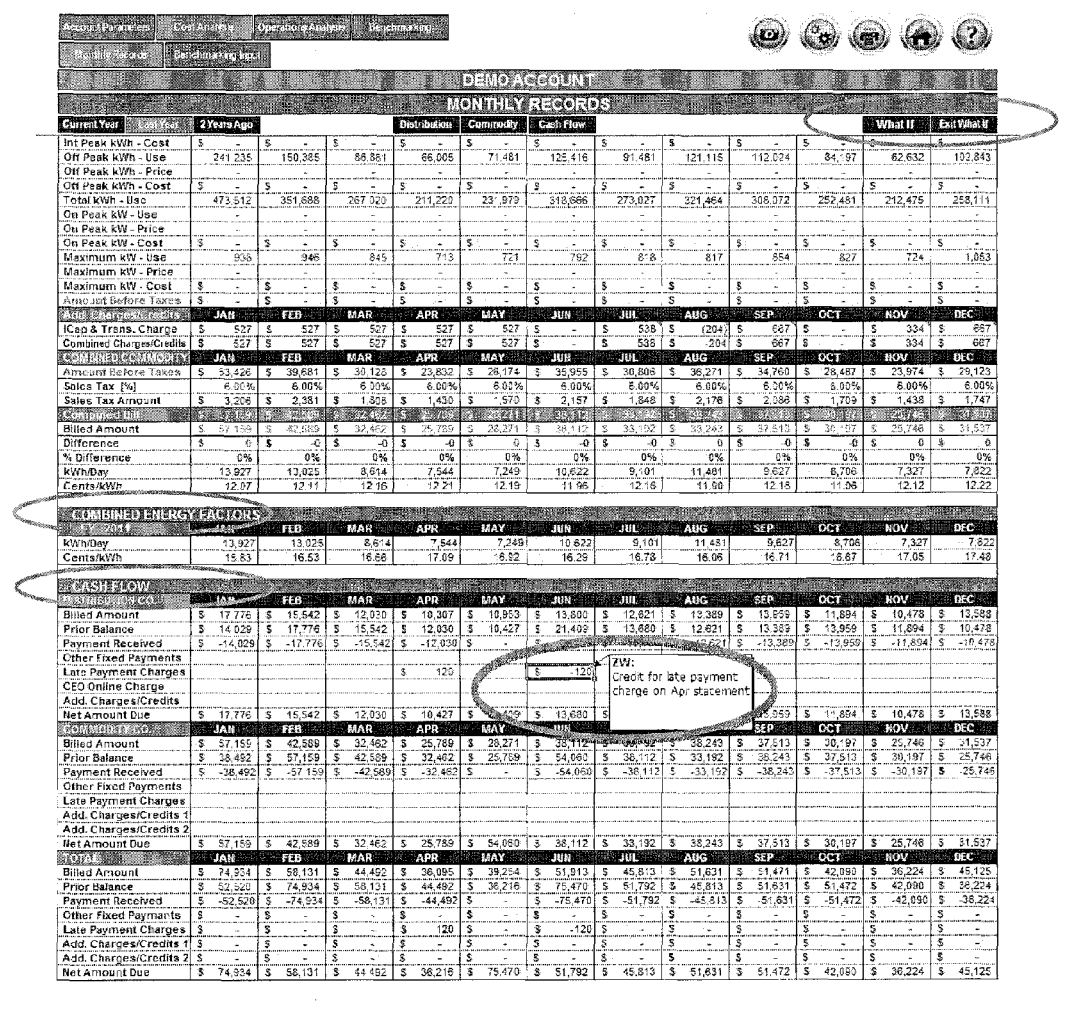

A snapshot of example "What If" financial modeling is shown in FIGS. 13(a)-(b). In the "Cash Flow" section, at the bottom of the spreadsheet illustrated, for example, in FIG. 13(b), analysts can add comments regarding special charges, out-of-range parameters, or any other matter that require users' attention, in certain examples. In fact, analysts can add comments into all lighter colored cells of the spreadsheet. Lighter-colored cells represent data entry cells as opposed to the darker cells, which represent results of computations. Also, a "What If" button may be displayed on the upper right hand side of the spreadsheet. Users can click on this button to access the "What If" analytical function of the spreadsheet.

Figure 14A:
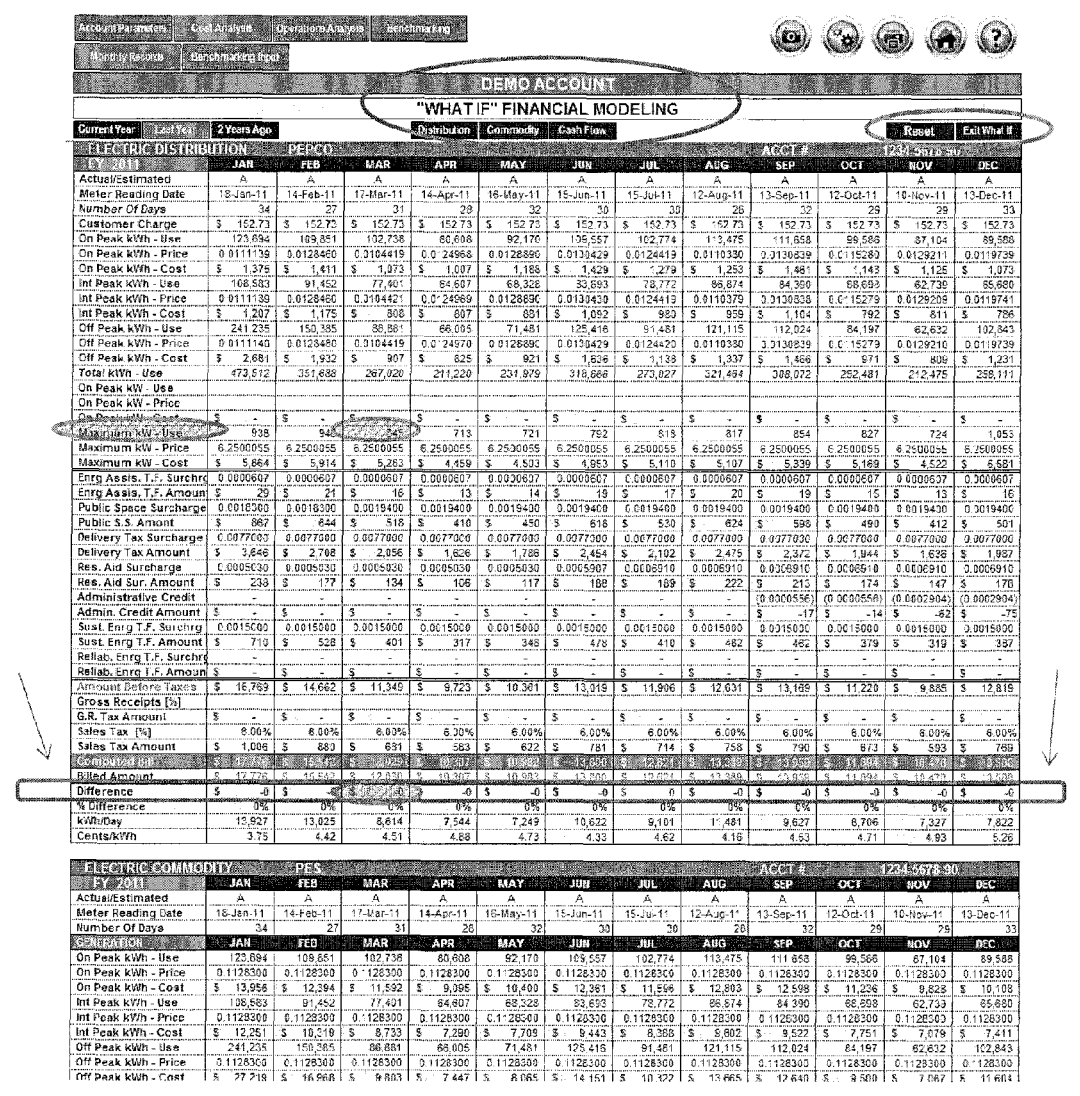

What-If Financial Modeling: FIG. 14(a) illustrates a partial snapshot showing how this component may allow a user to modify any aspect of energy use and/or price (as laid out in the Comprehensive Bill Analysis section above) and derive the resulting difference in cost.

By clicking on the "What If" button (displayed in the circle on the upper-right-hand corner of the snapshot), the user enters the "What If Financial Modeling" mode and "unlocks" the lighter shaded cells of the spreadsheet enabling these cells to be "overridden" with new numbers. The rectangle shown in FIG. 14(a), when performing comprehensive bill analysis, highlights that the difference between the computed bill (as computed by Comprehensive Bill Analysis spreadsheet) and the billed amount as provided by the utility company should be equal to zero.

Figure 14B:

FIG. 14(b) illustrates how by changing the "Maximum kW Use" number for the month of March from 845 kW in FIG.

14(a) to 700 kW (the change illustrated in FIG. 14(b)) would result in a computational discrepancy of $962. This computational discrepancy, being negative, represents a reduction in cost of $962 due to the lower peak kW demand. Varying other consumption and price numbers would result in other corresponding changes in costs. Furthermore, clicking on the camera button illustrated in FIG. 14(a) would result in a copy of the current spreadsheet being taken and open as a separate Excel file depicting a separate scenario. Still referring to FIG. 14(a), pressing the "Reset" button on the upper right hand side of the snapshot would result in resetting the What-If spreadsheet to its original configuration—prior to the modification of any number. This process is used to quantify waste and savings opportunities as well as to perform budget projections.

Visual Indicators: This component may provide a detailed visual analysis of one or more components relating to energy use, price, and/or cost of every utility bill over for a period of up to 3-years for the quick detection and explanation of unusual patterns in use, price, and cost.

Figure 15A:
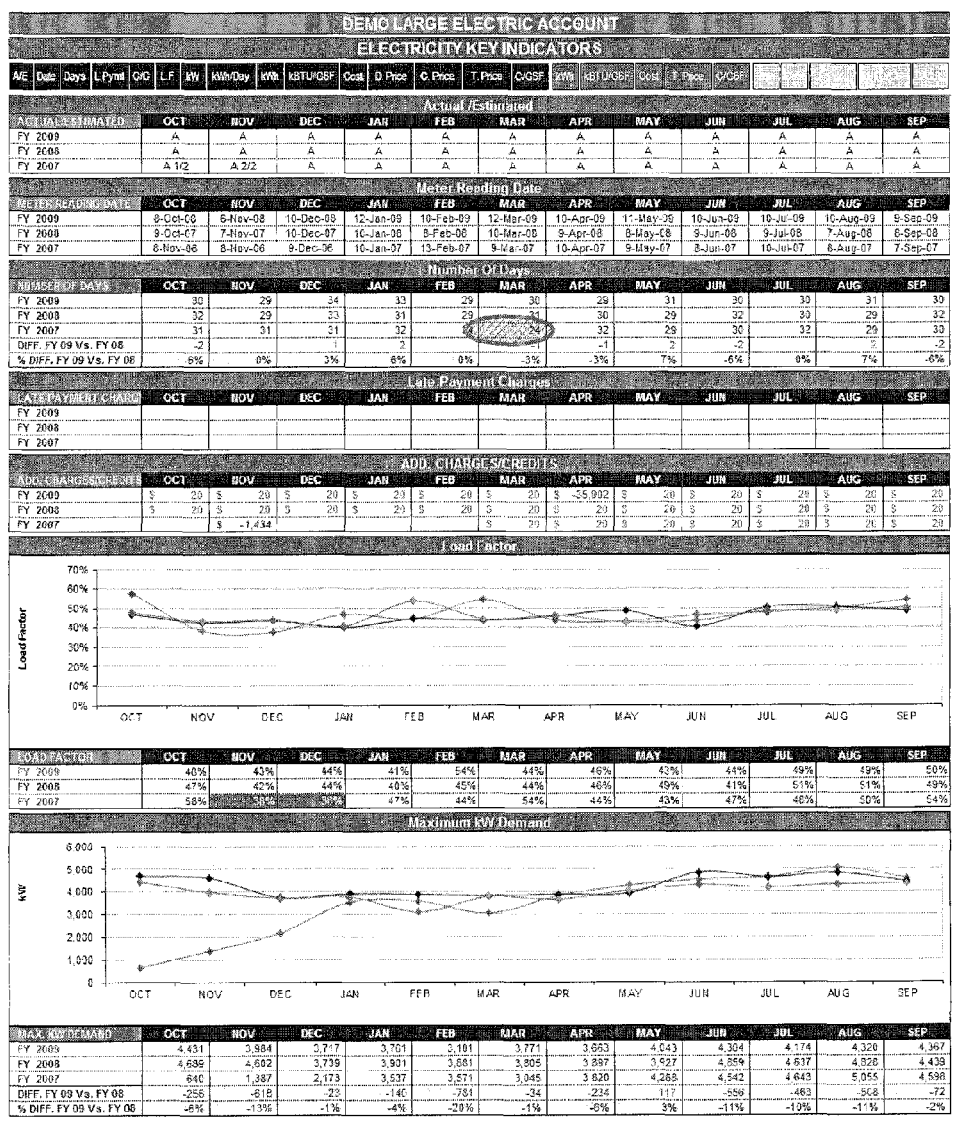
FIGS. 15(a)-(g) illustrate example screen shots and graphs of a Visual Indicators component.

FIG. 15(a) illustrates a snapshot showing the first page of the Visual Indicators component. Detection and explanation is performed as follows: When an out-of-range parameter is identified in one graph for a particular month, it is matched with corresponding visual parameters for the same month in other graphs (of the Visual Indicators component) until an answer is found. In this page, the first three months of 2007 represent the building commissioning phase.

Figure 15B:
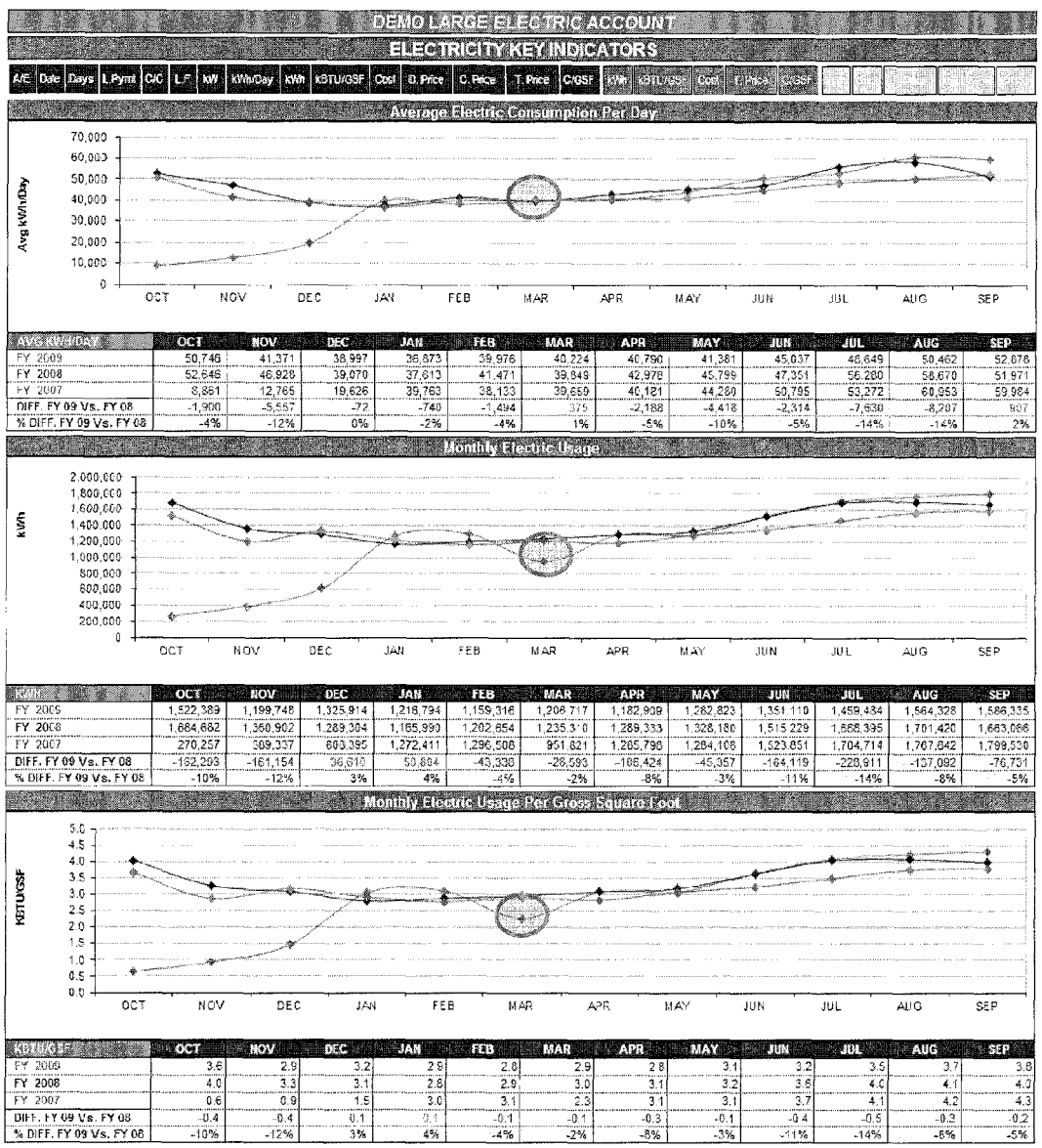

FIG. 15(b) illustrates a snapshot showing the second page of the Visual Indicators component. The first graph shown in FIG. 15(b) illustrates that the average consumption per day for the month of March 2007 is not noticeably different from that of FY 2008 and FY 2009, but in the second graph, the kWh for FY 2007 is noticeably lower than those of FY 2008 and FY 2009. A look at the "Number of Days" table in FIG. 15(a) indicates the reason for the low reported kWh consumption is the result of the much shorter billing period for that month.

Figure 15C:
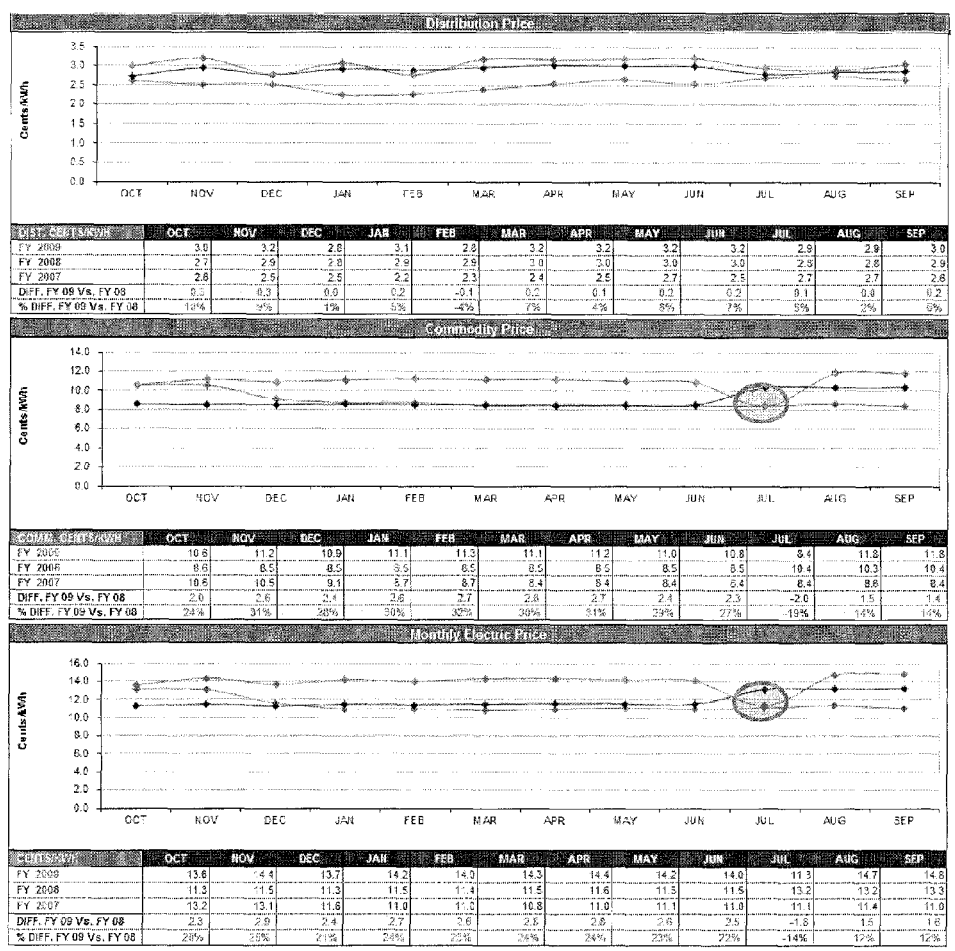

FIG. 15(c) illustrates a snapshot showing the third page of the Visual Indicators component. Note in the second graph in FIG. 15(c) that the commodity price and the overall electric price had dropped noticeably in the month of July 2008. After looking at the line-item by line-item analysis of the July 2009 bill, it turned out that the utility company had failed to bill the facility for some of the monthly charges on that bill—hence the unusually low commodity price. The lower commodity price resulted in a lower Monthly Electricity Price, which in turn resulted in a lower overall dollar cost and cent/GSF figure in the graphs shown in FIG. 15(c).

Figure 15D:
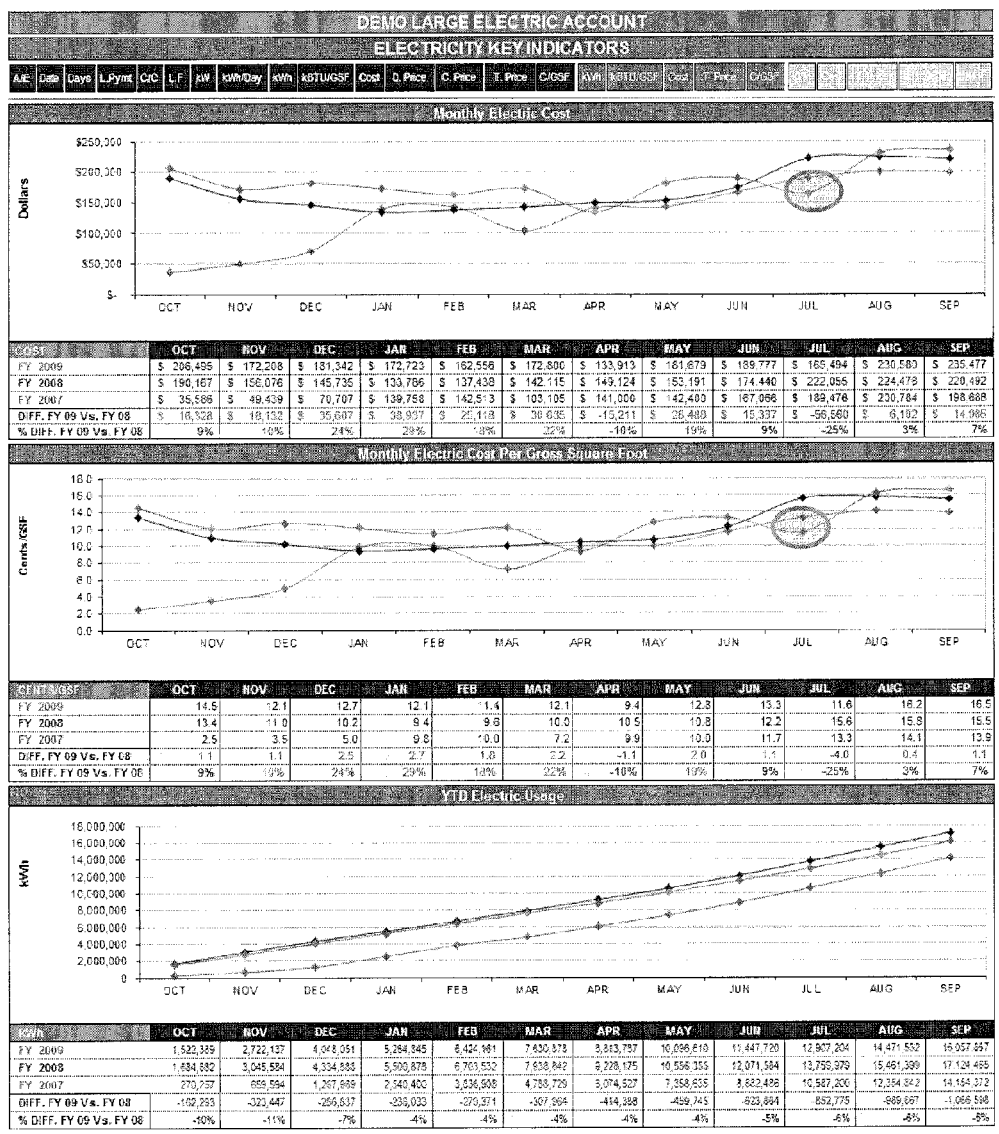

As stated above, the lower commodity price resulted in a lower Monthly Electricity Price, which in turn resulted in a lower overall dollar cost and a lower cent/GSF figure, as shown in the graph of FIG. 15(d).

Figure 15E:
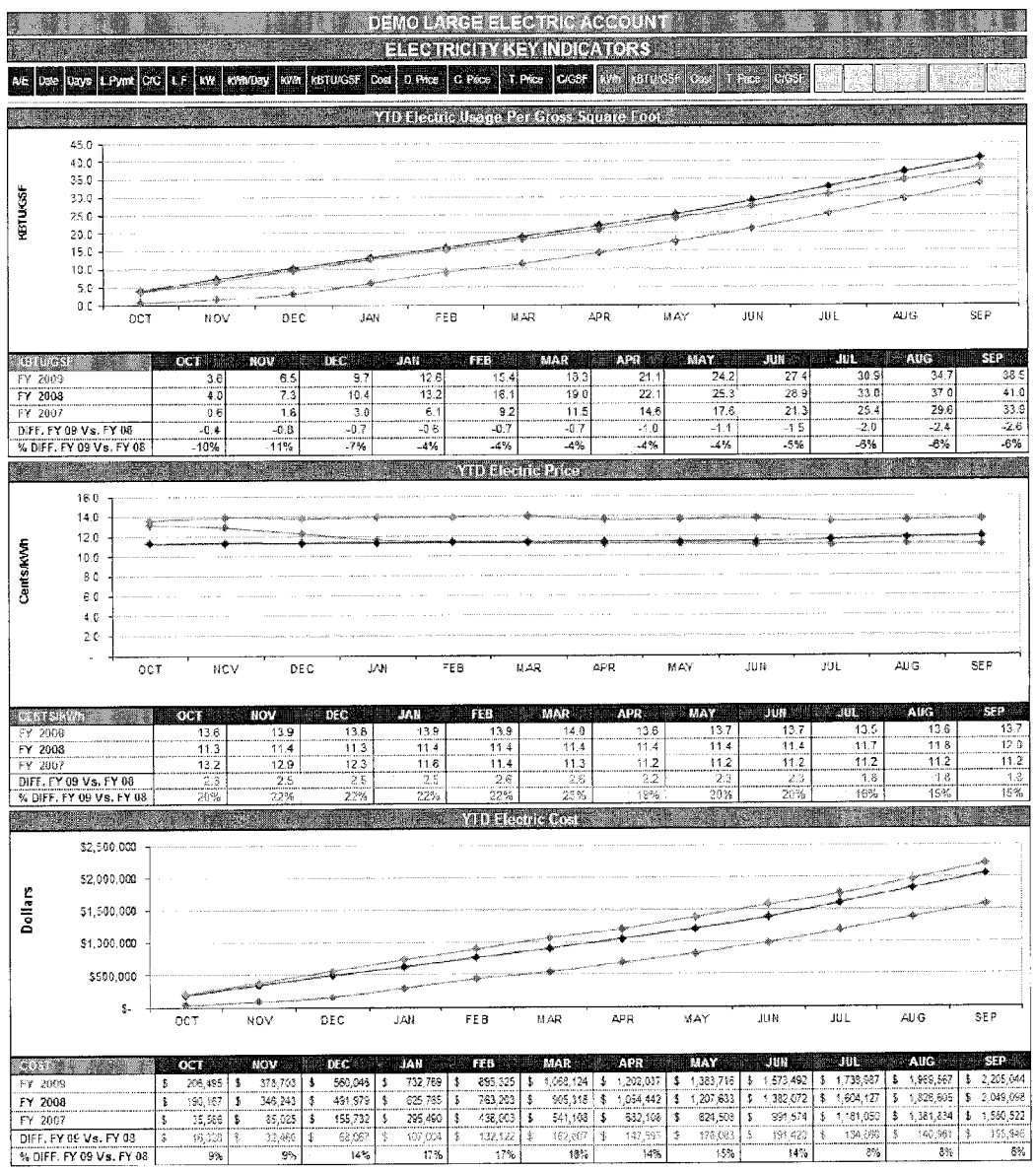
Figure 15F:
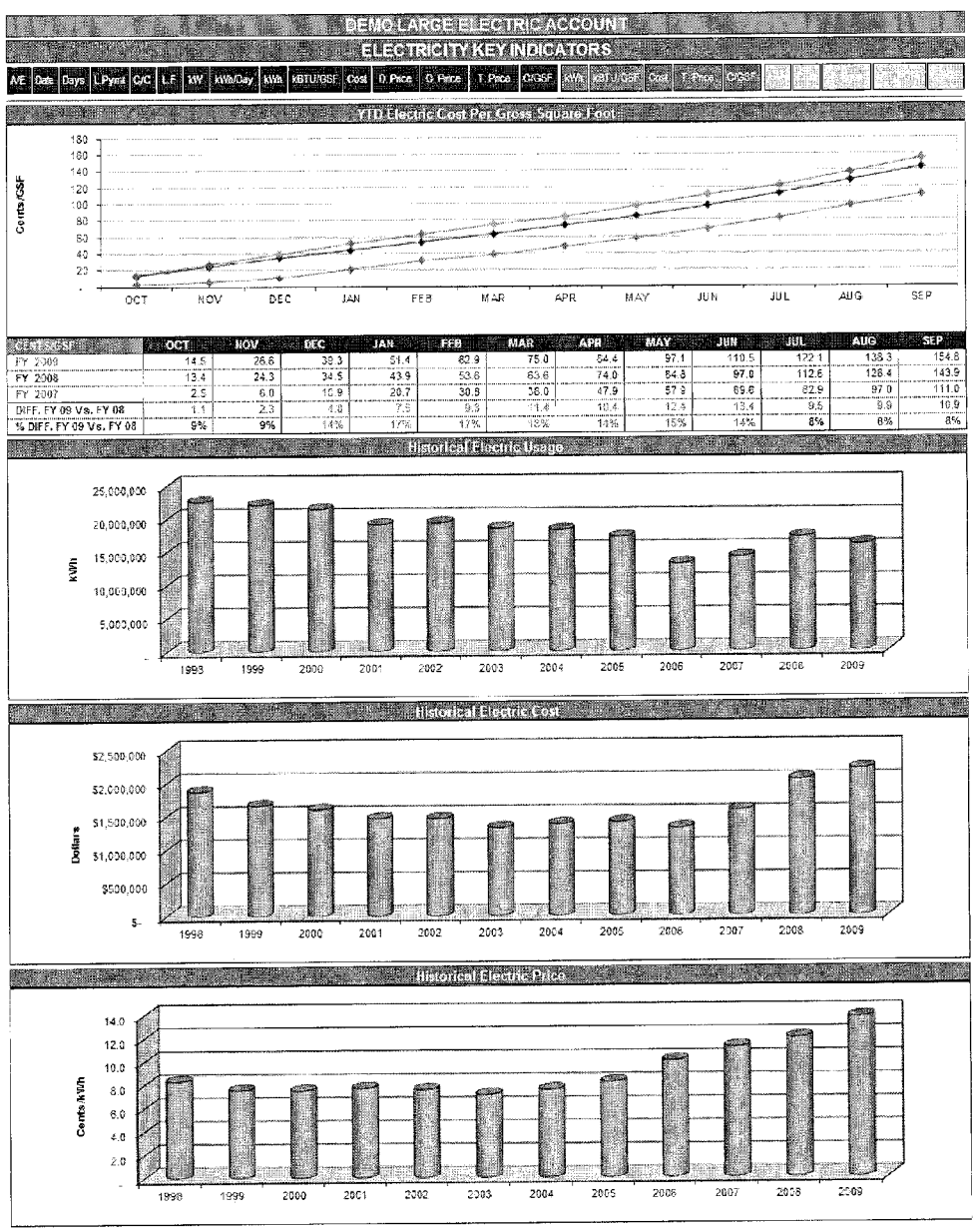
Figure 15G:
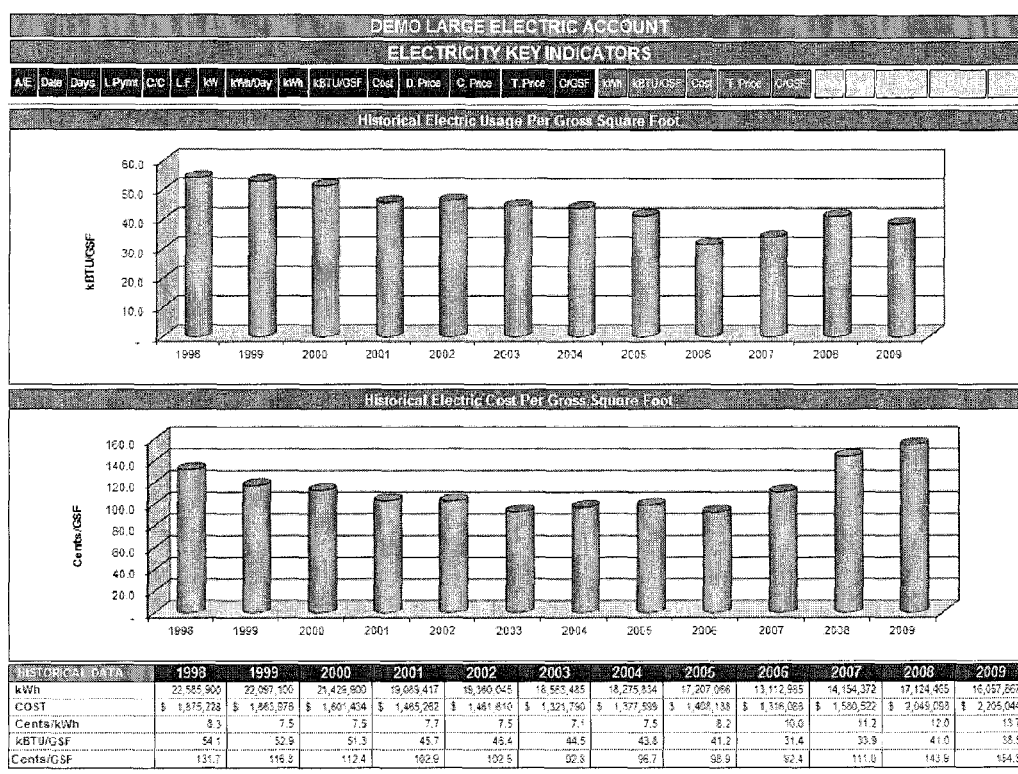

FIGS. 15(e)-(g) illustrate further example graphs from the visual indicators aspect of the costs module. FIGS. 15(e)-(g) do not show and/or report any unusual parameters.

Figure 16A:
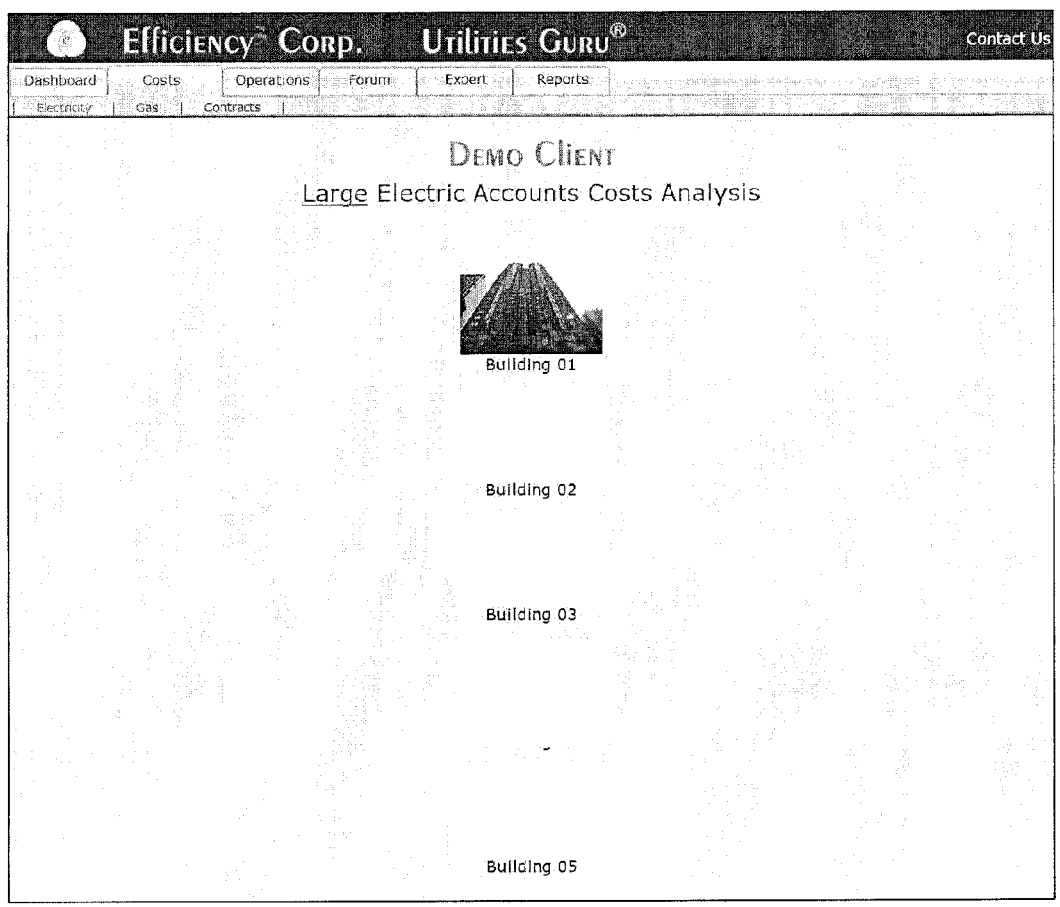
Figure 16B:
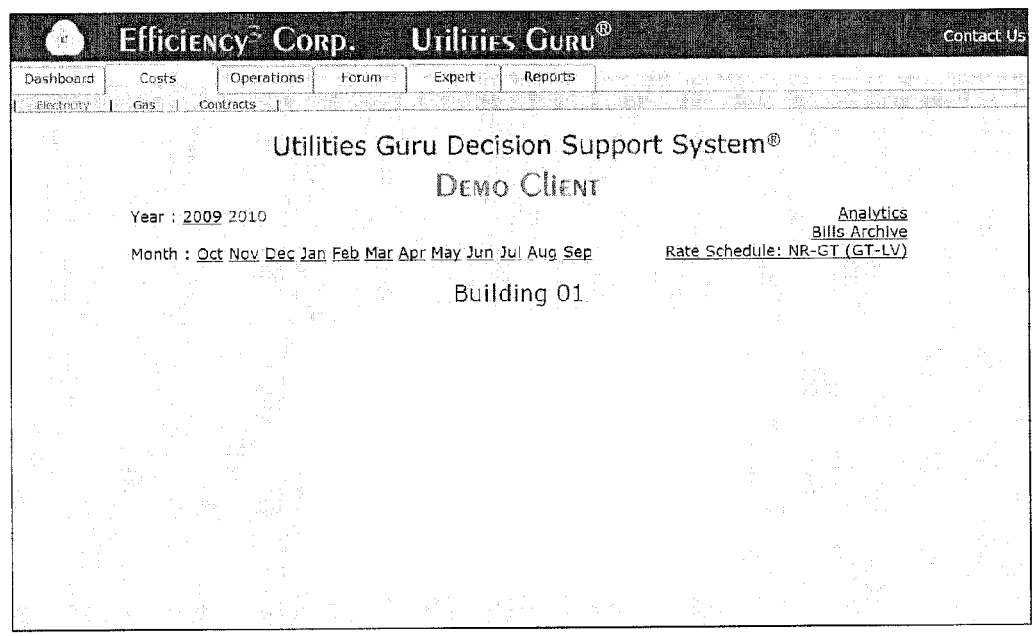
Figure 16C:
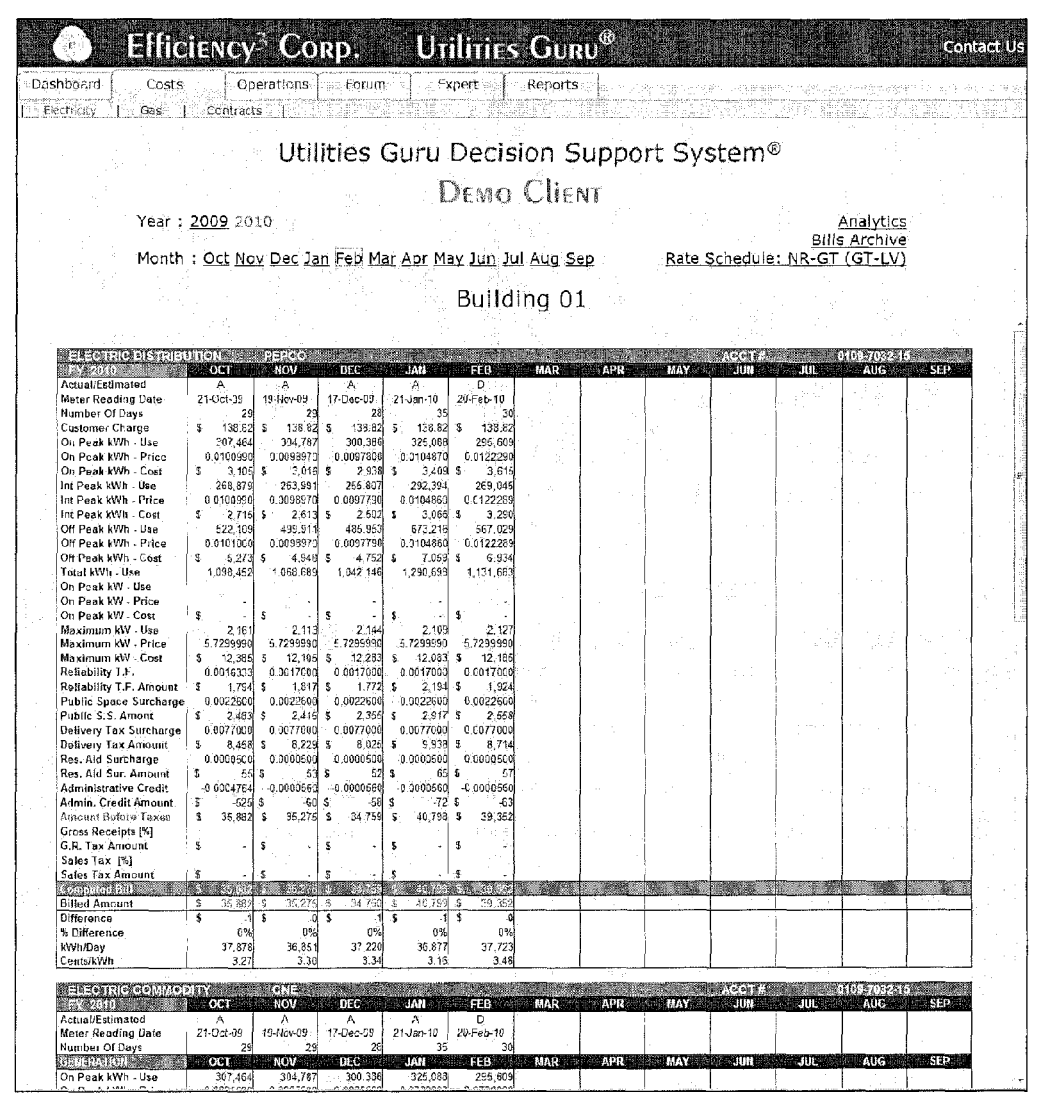
Figure 16D:
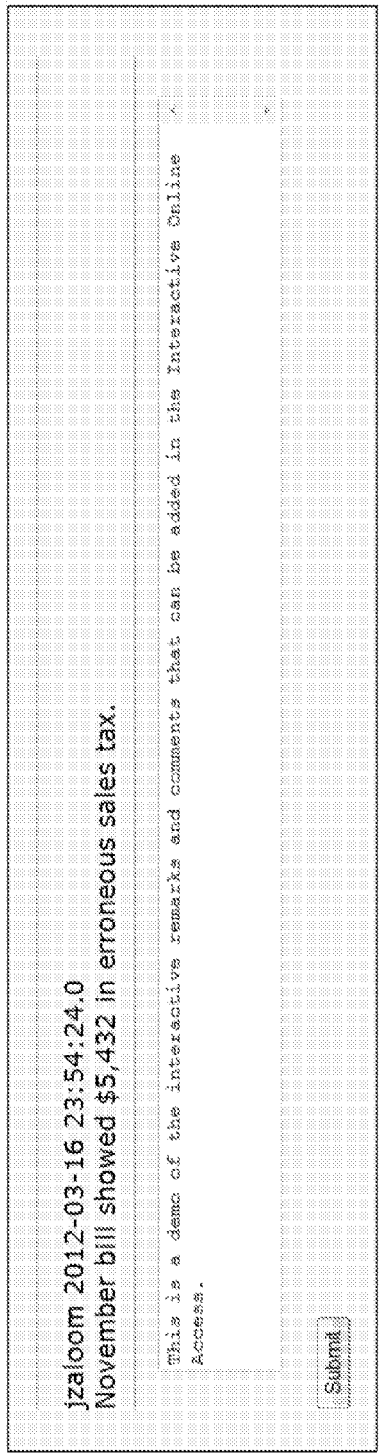

Interactive Online Access: FIG. 16(a) illustrates the online access to the Cost Module. Each building is typically represented by an actual image of that building. FIG. 16(b) illustrates how clicking on an image of a particular building will provide access to the historical visual records of that building. FIG. 16(c) illustrates a chart showing how clicking on a particular month for a selected fiscal year will bring an image of the billing records for that building up to the "clicked" particular month. Finally, FIG. 16(d) follows from FIG. 16(c) and illustrates how users can comment and discuss, interactively, the line-item by line-item billing information provided in the chart shown in FIG. 16(c).

In certain example embodiments, the Operations module is a novel approach that provides unusual insight into the operations of a facility. In certain cases, other competing systems and methods may use 15-minute or 30-minute interval data to show when and how energy (and particularly electricity) is used at a given facility, certain example systems and methods disclosed herein may provide for the measurement of how much energy consumption has varied from one year to the next, or from one year to a specific base year. It depicts "motion" (e.g., the difference between two points in time) and provides quantification of that motion, in certain example embodiments.

Figure 17:
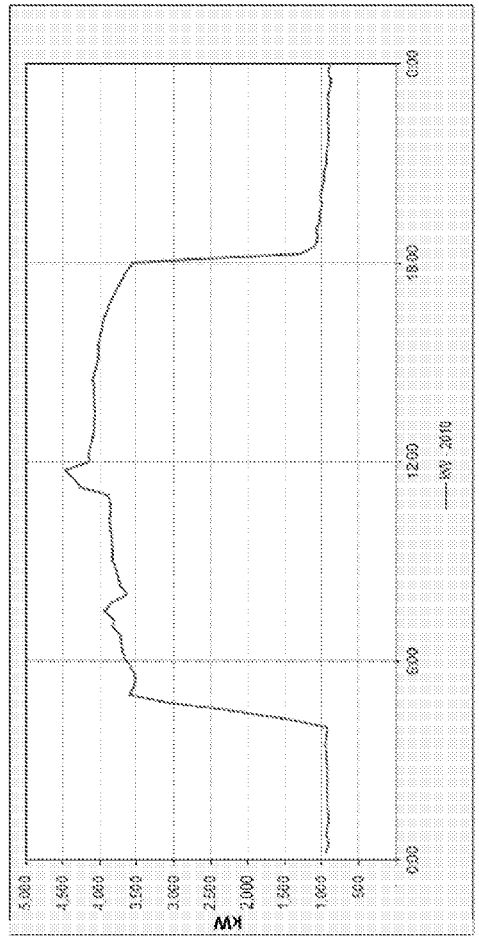
FIG. 17 illustrates a facilities operations analysis according to certain example embodiments.

FIG. 17 illustrates a facilities operations analysis, which may be useful for the detection of unusual operating profiles in certain example embodiments. FIG. 17 illustrates a 12 hour period of operations; however, graphs may be provided for shorter and/or longer time periods according to different example embodiments.

Figure 18A:
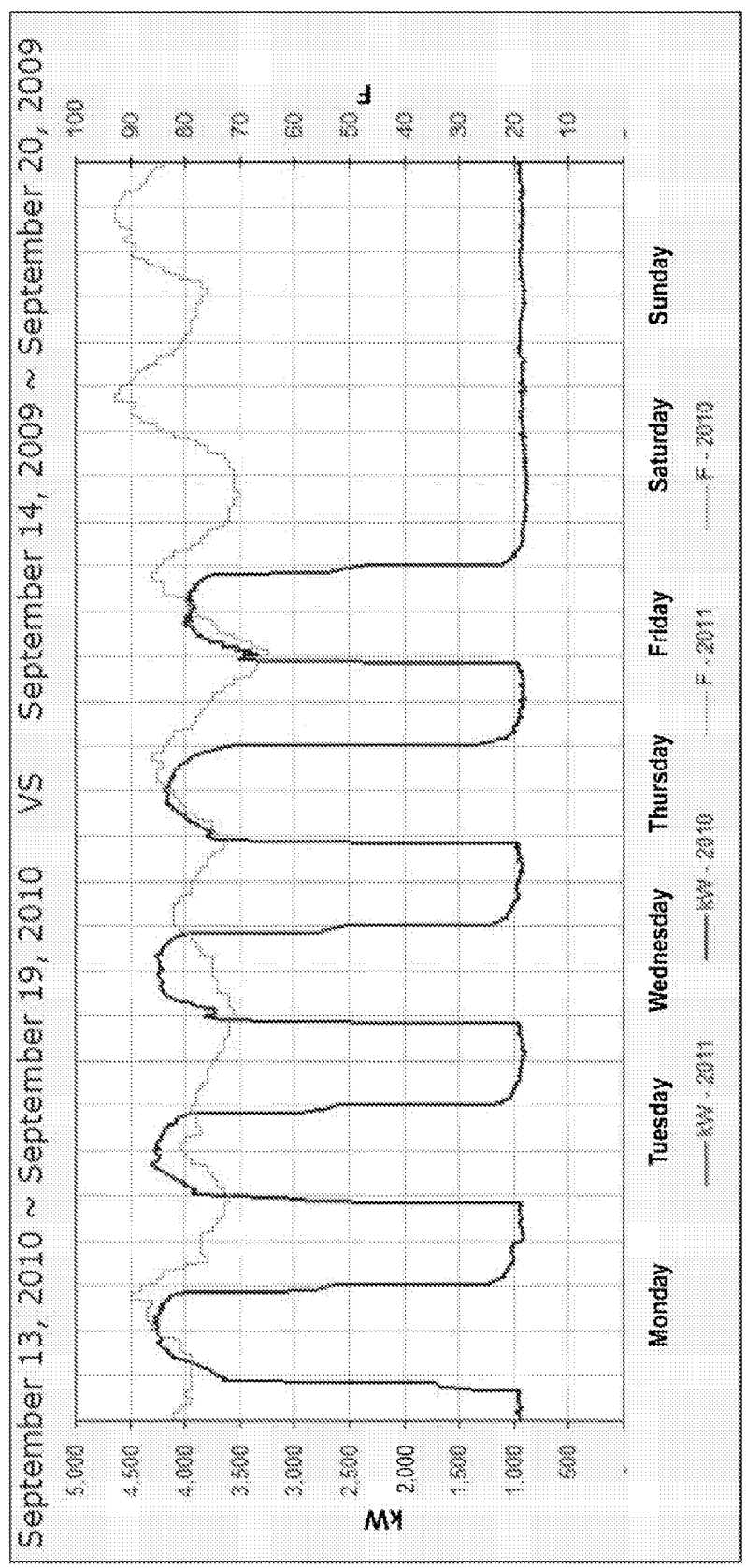
FIGS. 18(a)-(e) illustrate an example method of analyzing energy operations over the period of a week according to certain aspects.

FIGS. 18(a)-(e) illustrate an example method of analyzing energy operations over the period of a week. FIG. 18(a) illustrates the conventional method of analyzing energy operations; it includes a plot of electric demand (kW) over time. Time can be measured over 15-minute, 30-minute, or hourly increments. FIG. 18(a) also displays the corresponding temperatures over the same periods of time—which most conventional systems do not include.

Figure 18B:
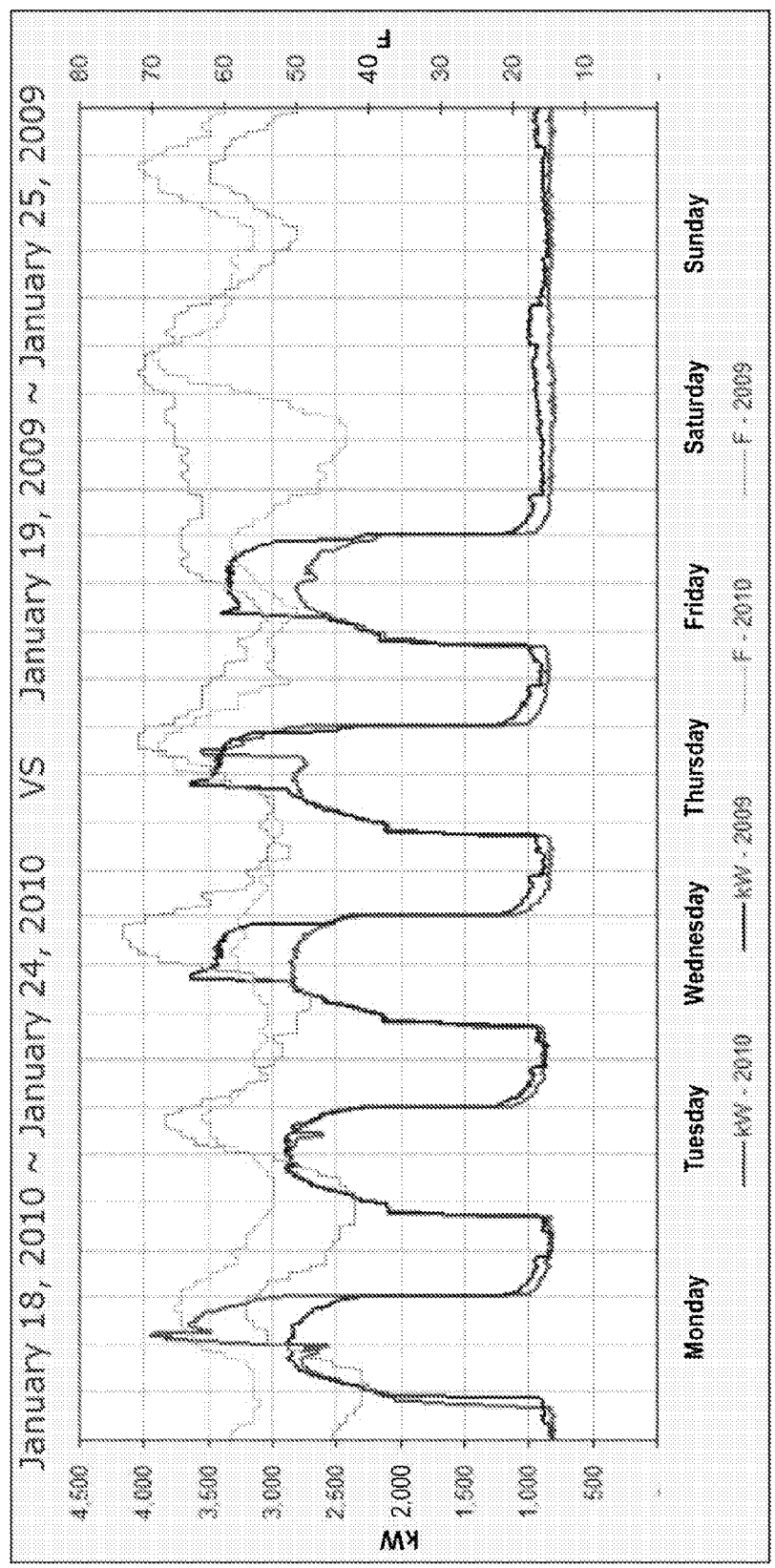

FIG. 18(b) is a graph illustrating certain example improved methods related to certain example embodiments; which is to superimpose two weekly graphs on top of each other and to synchronize them by the number of the week in the calendar year rather than by calendar date. (i.e. the first Monday of the first week of the current year is synchronized with the first Monday of the first week of the prior year—or a benchmark year—and so on . . . ) By synchronizing by number of week, Mondays will always be synchronized by Mondays and holidays (e.g., that fall on a particular day of the week every year) will always be synchronized with prior holidays.

In other words, FIG. 18(a) illustrates when and how the facility is being operated over time and identifies unusual patterns in energy use over time; however, in contrast, FIG. 18(b) (e.g., an aspect of certain example embodiments) not only can illustrate when and how the facility is being operated and identifies unusual patterns in energy use over time; it also may provide certain example additional benefits in certain example embodiments. For example, systems and methods related to the FIG. 18(b) example embodiment may advantageously identify areas of waste and savings opportunities, quantify the extent of energy waste and possible energy savings, and/or measure the actual results of implemented energy management solutions.

In certain example embodiments, the Operations module may illustrate when and/or how electricity (or any other form of energy or water) is used at a given facility (or metered area, etc.). Further, the Operations module may use information from the Expert module to understand the function, hours of operation, type of tenant operations at the facility, and other useful information. Thus, in certain example embodiments, the Operations module may advantageously provide unique insight that enables users to identify operating waste and savings opportunities.

Moreover, by comparing the current 15-minute consumption (e.g., or 30-minute, 1-hour, and/or any appropriate consumption interval) profile at a given facility with a prior (baseline) consumption interval (e.g., 15-minute, 30-minute, 1-hour, and/or the like) profile of the same facility one can quantify the difference between the current operating profile and the prior year's operating profile. Finally, when combined with the "What If" financial modeling capability of the Cost Module described above, one can monetize the difference between the current operating profile and the prior (or baseline) operating profile.

Figure 18C:
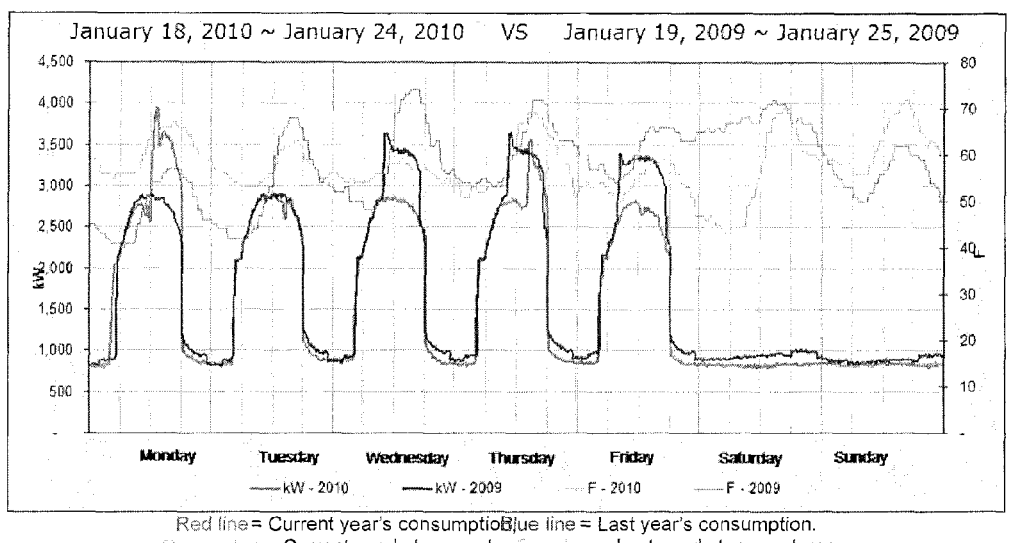
Figure 18D:
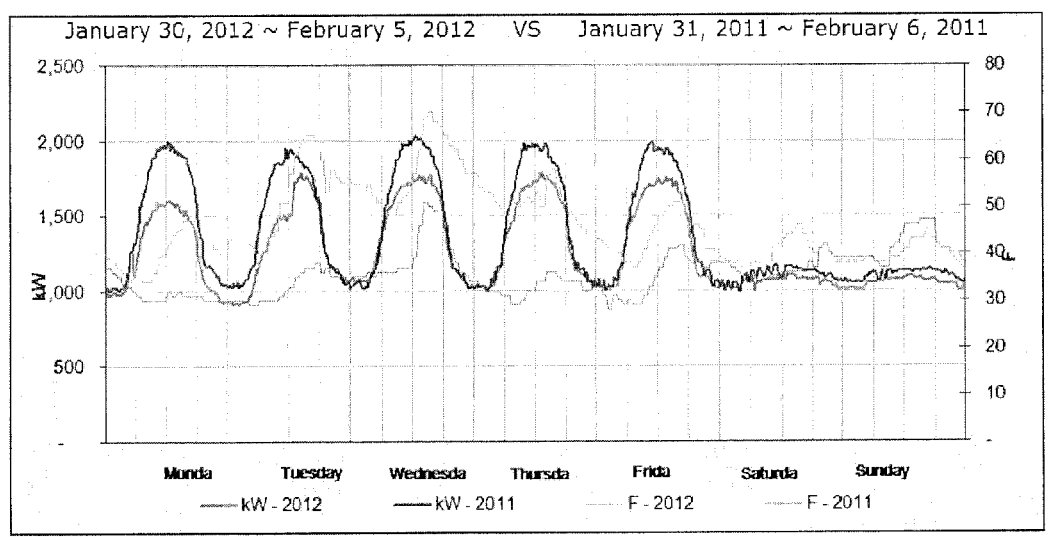
Figure 18E:
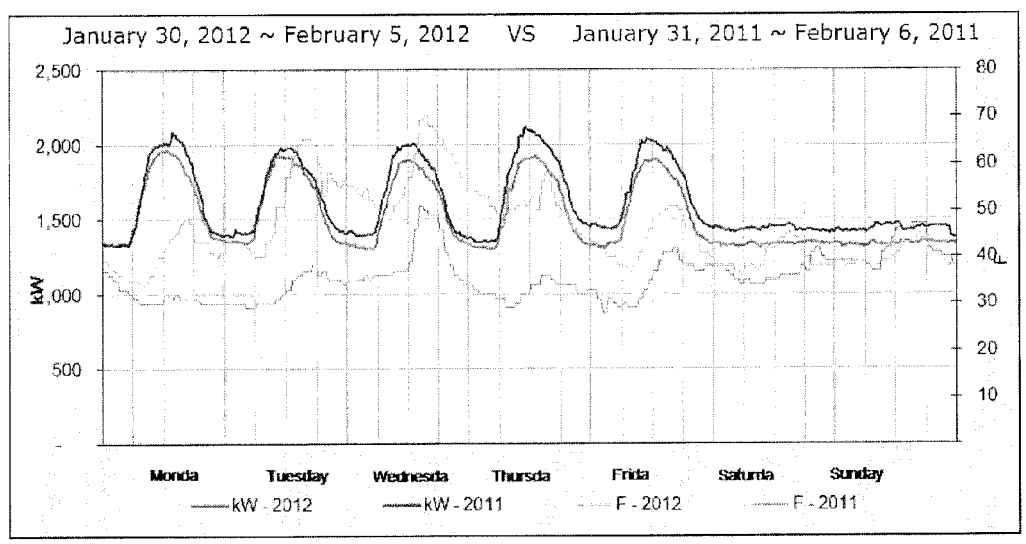

FIGS. 18(c) and 18(e) show additional examples of the powerful interpretive analysis of certain example methods relating to the Operations Module.

In certain instances, referring to FIGS. 18(d) and 18(e), what is striking about the illustrated graphs is not the shape of the curves, but rather the location of the baseline of the curves. The Expert module indicates that this is an office building that occupies a full block in downtown Washington, D.C. This is an old office building that shuts down at 6:00 pm every day—yet, the nighttime operating profile is at least 50% of that of the peak daytime operating profile. This kind of profile indicates that major operating equipment is being left "On" all night long when there is no one in the building; resulting in major waste in energy and cost.

FIG. 18(e) may provide three pieces of information in certain example embodiments: a) that this facility's energy usage does not appear to correlate to the weather at all. b) its nighttime base load is very high—almost two thirds of its daytime peak. c) Its current year's operating profile has been lowered from the prior year. Checking information from the Expert module indicated that: a) this facility includes a large data processing center with continuous 24-hour operation, b) it is a government facility that uses steam for heating, so electricity usage is not related to outside temperatures in the winter, and c) the result of the lowed "across-the-board" daily consumption is the consequence of a major re-lamping upgrade in the building that resulted in lower wattage being used across the board.

The above are but a few examples of the usefulness of certain example methods disclosed herein. However, certain example embodiments are not limited to the synchronization of weekly graphs alone. Additionally, while the graphs may be synchronized weekly, they may also be synchronized hourly, daily, monthly, etc.—they may be synched based on any desired time period.

Further example aspects of certain example embodiments of the Operations module described herein may include the following four components:

(1) Instant Random Access to Online Synchronized Weekly Graphs of Operations Data: Certain example methods may utilize Microsoft Excel modules to manually synchronize streams of daily and weekly operations data—from any source—into useful graphs, in certain examples. The only requirement is that the source data be provided in tabular format online from any "SQL" source. This tabular format can then be copied and pasted into standardized MS Excel modules based on 15-minute, 30-minute, and/or hourly, etc., data. These modules will automatically synchronize the weekly and daily consumption data into useful graphs and records. A visual snapshot of each Weekly (as an example time period) Excel Module is then taken which will display it automatically online in a manner that also provides instant random access to other independent Weekly (as an example time period) Excel Modules.

(2) Interactive Comments: This feature provides for an online capability that enables users to discuss each e.g., Weekly, Excel Module and comment on it interactively (similar to an interactive log). This would allow facility operators, managers, and other users of the system to explain and document unusual patterns in energy consumption for future reference. The implementation of this feature can be achieved through the use of common web design tools such as Adobe "Dreamweaver".

(3) Visual and Tabular Display of the Daily Energy and Weather Data: This feature includes linking each visual snapshot of the Weekly Excel Modules into the source modules for instant download to the user's desktop over the Internet. Each Excel module will provide visual and tabular display of the daily energy and weather data for each week in the calendar year in comparison to the same period of the prior year—along with the daily difference between the current year's data and the prior year's data, and the various percentages that these differences represent. The implementation of this feature can be achieved through the use of common web design tools such as Adobe "Dreamweaver".

(4) Instant Access to Synchronized Daily Graphs of Operations Data: This feature represents another aspect of the functionality of the Weekly Excel Module. It provides for the instant and separate visual representation of each day of the Weekly Excel Module. This allows users to "zoom in" and focus on the daily operations of each day of the week independently of the others.

A more detailed description of certain examples of the four example components of the Operations Module discussed above will now be provided.

Figure 19A:
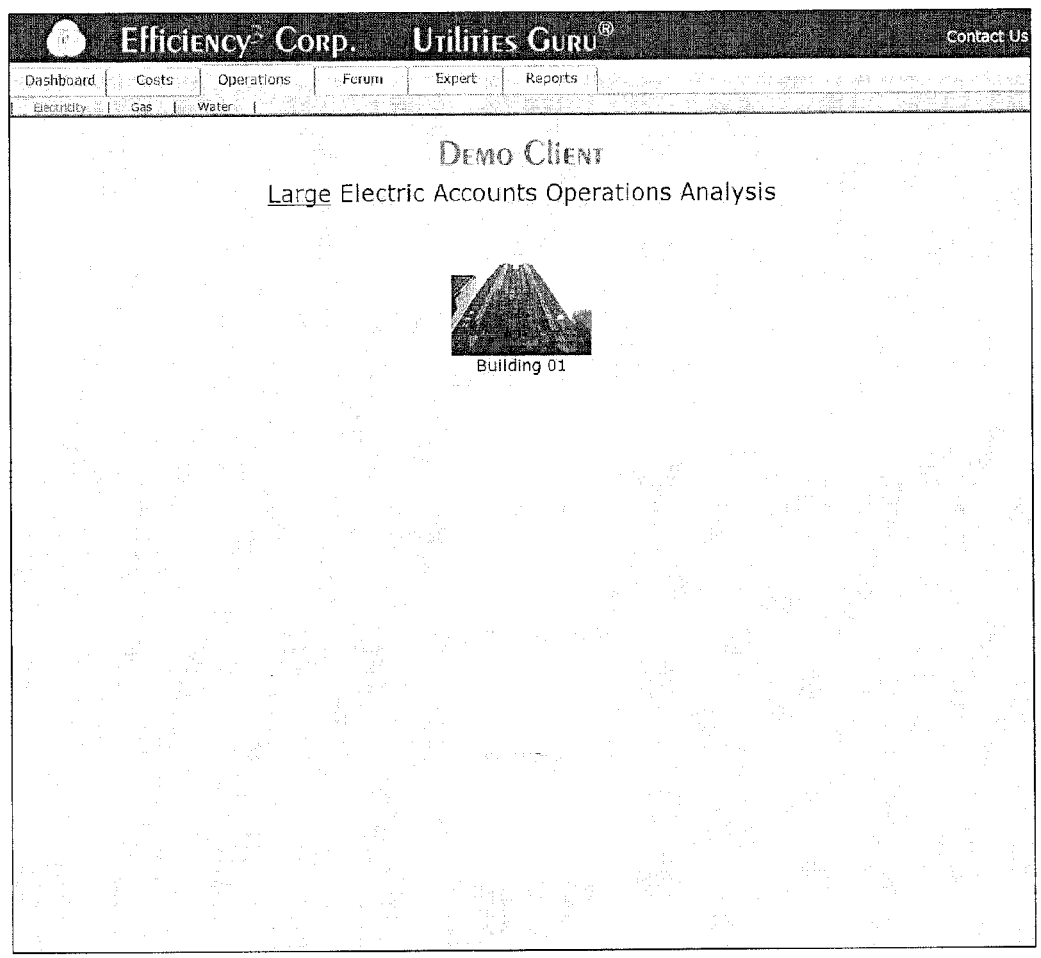
FIGS. 19(a)-(c) shows example interface(s) relating to online access to the Operations Module.

FIG. 19(a) shows an example interface of online access to the Operations Module. Each building may be represented by an actual image of that building.

Figure 19B:
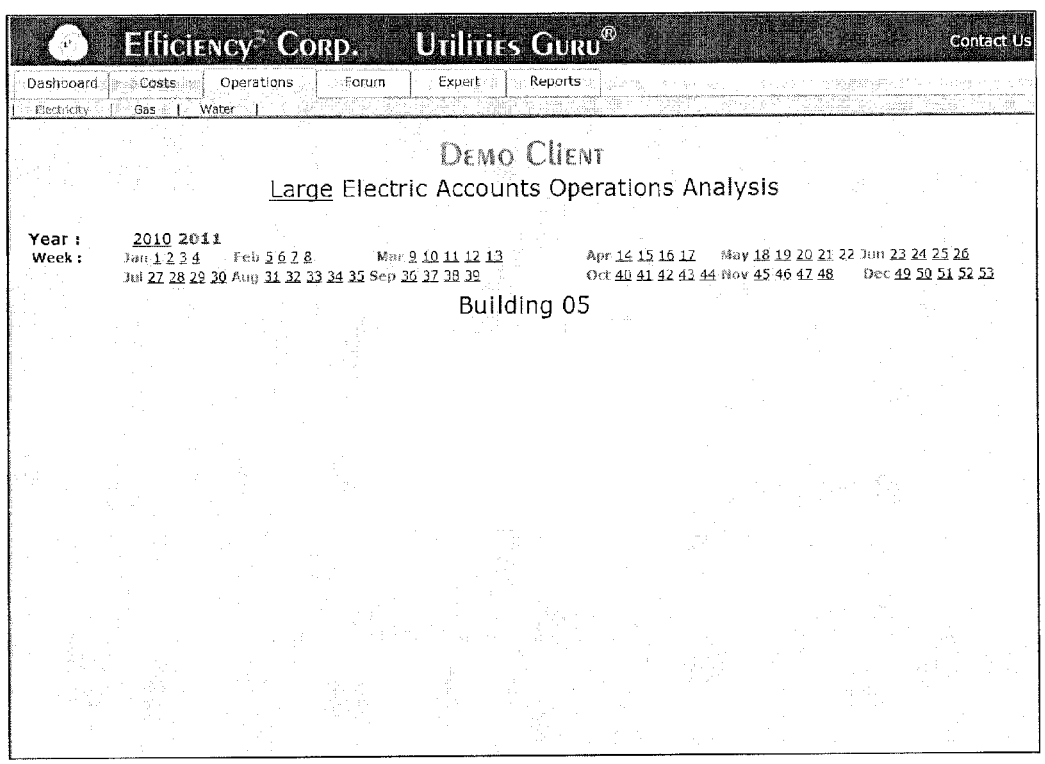

FIG. 19(b) illustrates how clicking on an image of a particular building will provide access to the historical operating records of that building.

Figure 19C:
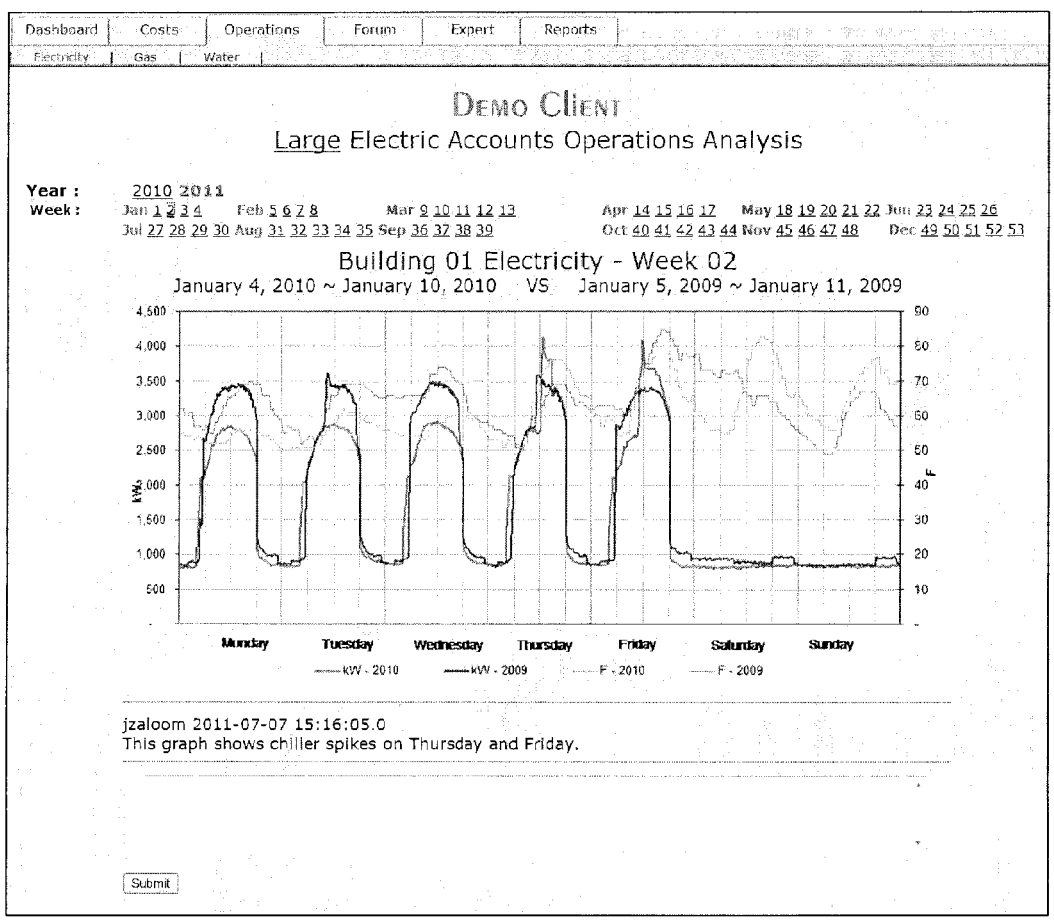

FIG. 19(c) shows how clicking on a particular week for a selected fiscal year will bring an image of the operating records for that week.

Figure 20:
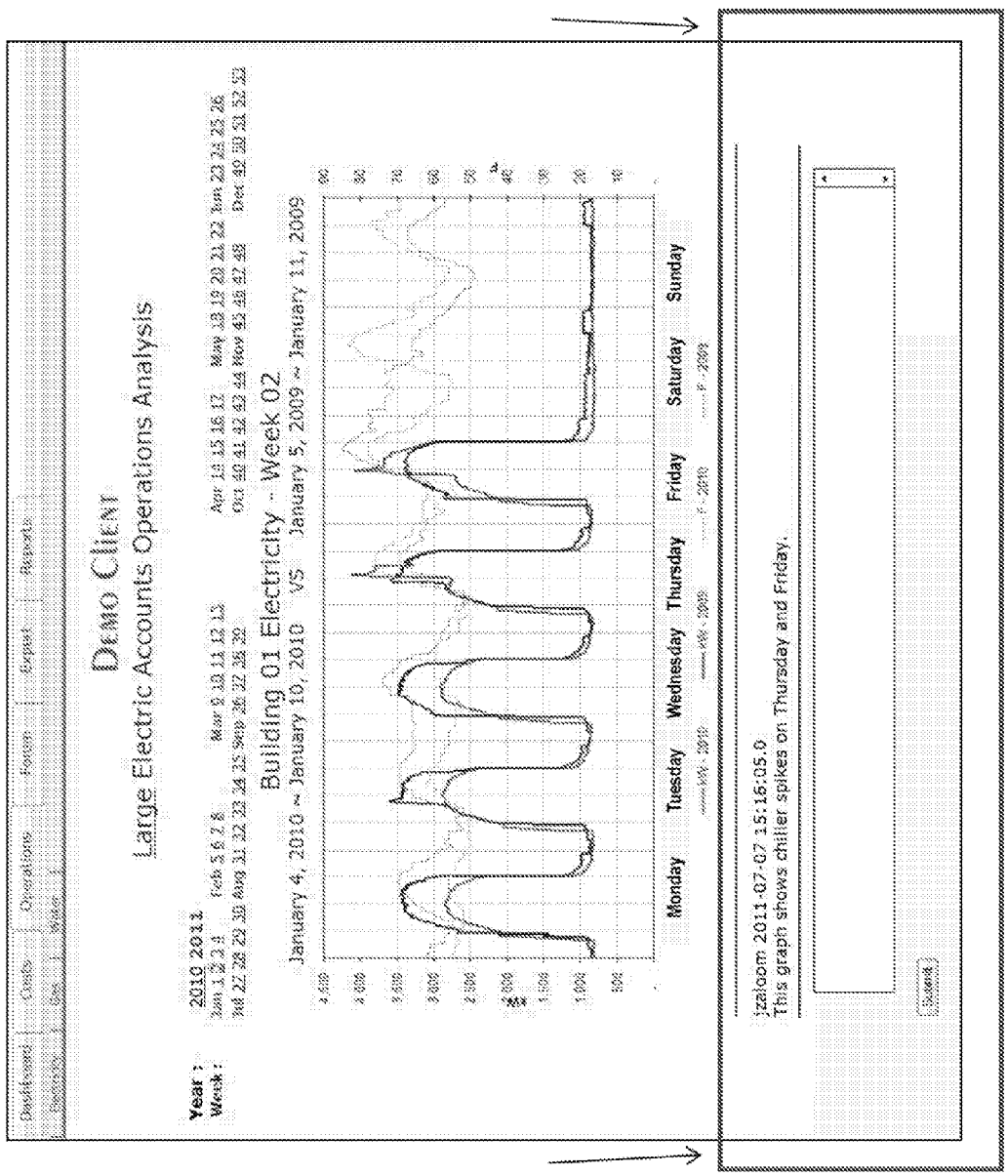
FIG. 20 illustrates an example user interface displaying and/or permitting interactive comment.

FIG. 20 illustrates an example user interface displaying and/or permitting interactive comments. In certain example embodiments, the Interactive Comments feature may provide for an online capability that enables users to discuss each Weekly Excel Module and comment on it interactively (similar to an interactive log). This would allow facility operators, managers, and other users of the system to explain and document unusual patterns in energy consumption for future reference.

Figure 21A:
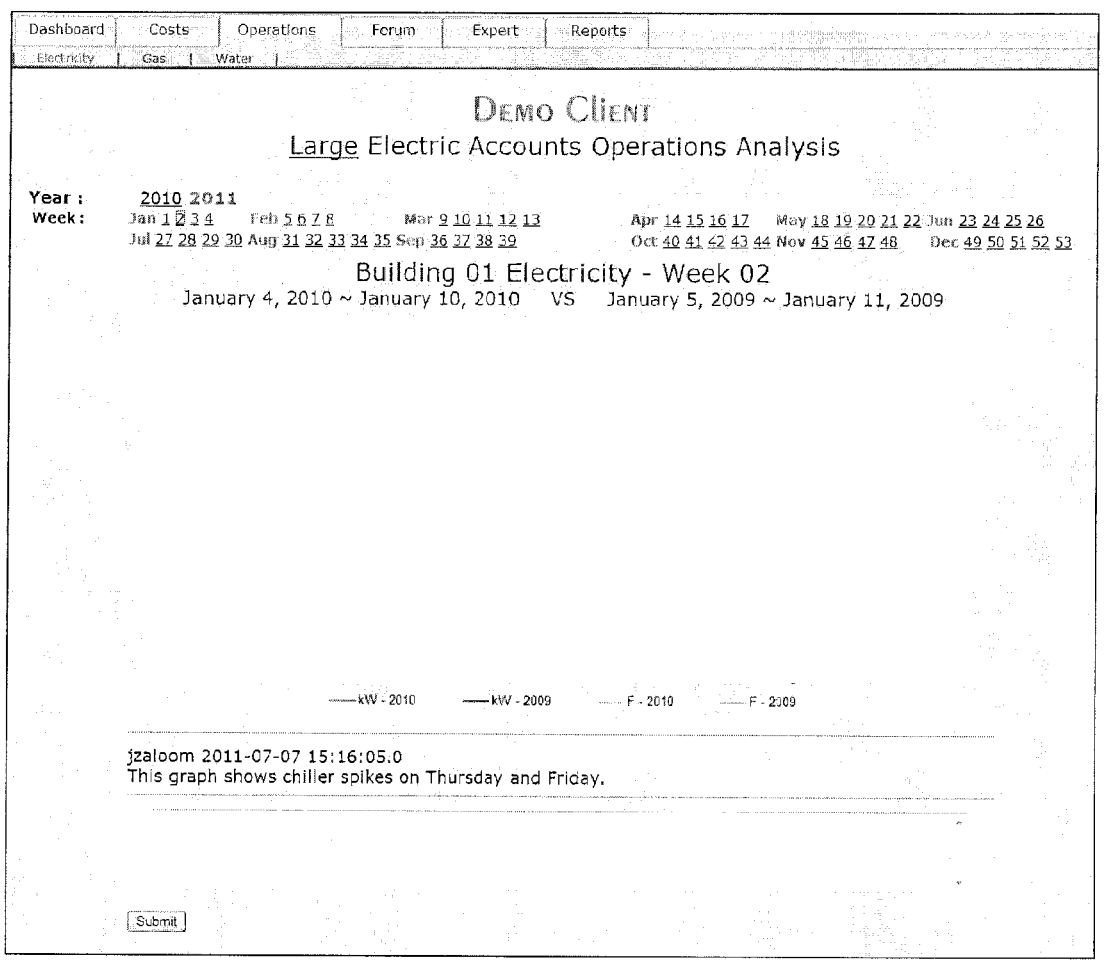
FIGS. 21(a)-(c) illustrates an example embodiment of a visual and tabular display of daily energy and weather data (e.g., snapshots from an example Weekly Module)

FIG. 21(a) illustrates an example embodiment of a visual and tabular display of daily energy and weather data. In certain example embodiments, the visual and tabular display of the daily energy and weather data feature may include linking each visual snapshot of the Excel Weekly Modules into the source modules for instant download to the user's desktop over the Internet (by clicking on the shaded area shown in FIG. 21(a)). Each Excel module will provide visual and tabular display of the daily energy and weather data for each week in the calendar year in comparison to the same period of the prior year—along with the daily difference between the current year's data and the prior year's data, and the various percentages that these differences represent.

Figure 21B:
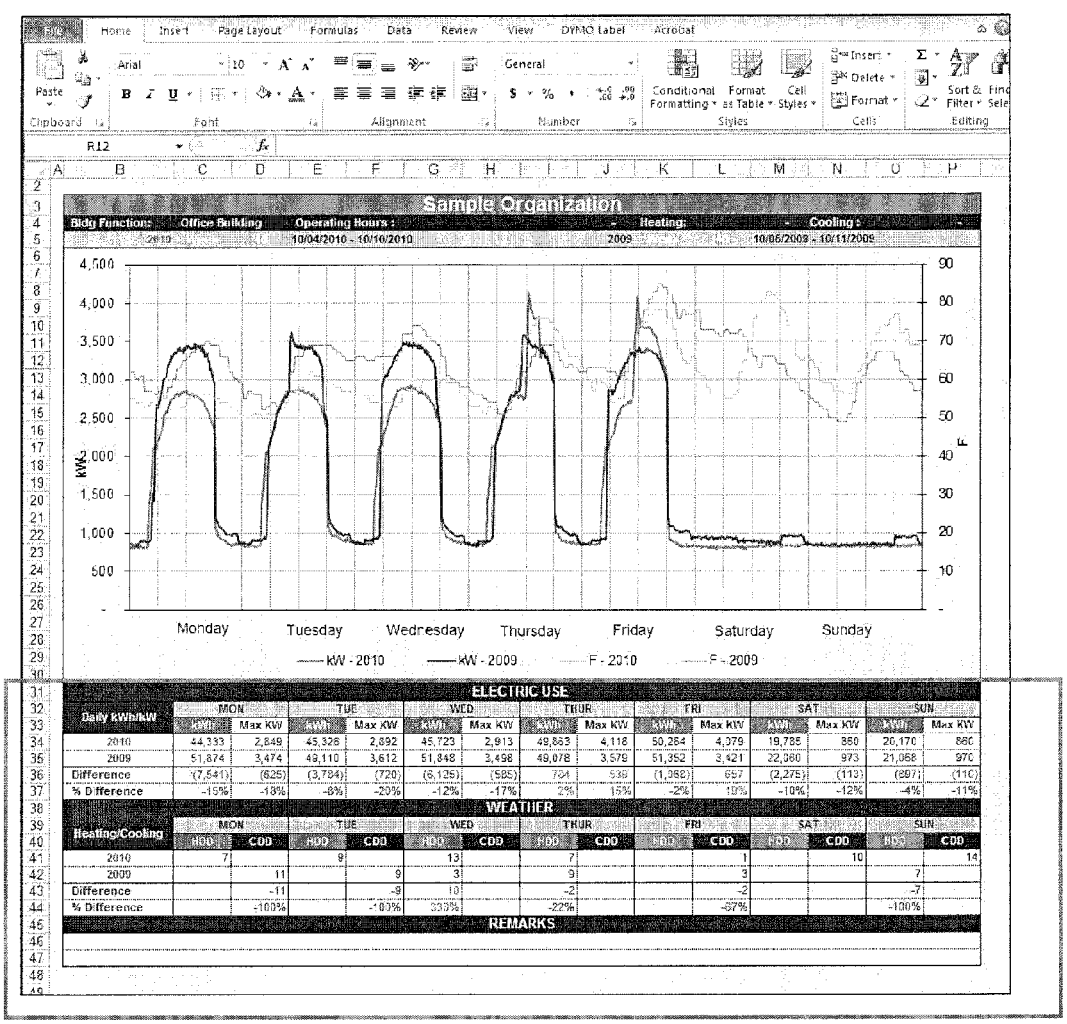

FIG. 21(b) illustrates a snapshot of the front page of the source module of an Excel Weekly Module. As FIG. 21(b) shows, the source module provides visual and tabular display of the daily energy and weather data for each week in the calendar year in comparison to the same period of the prior year—along with the daily difference between the current year's data and the prior year's data, and the various percentages that these differences represent.

Figure 21C:
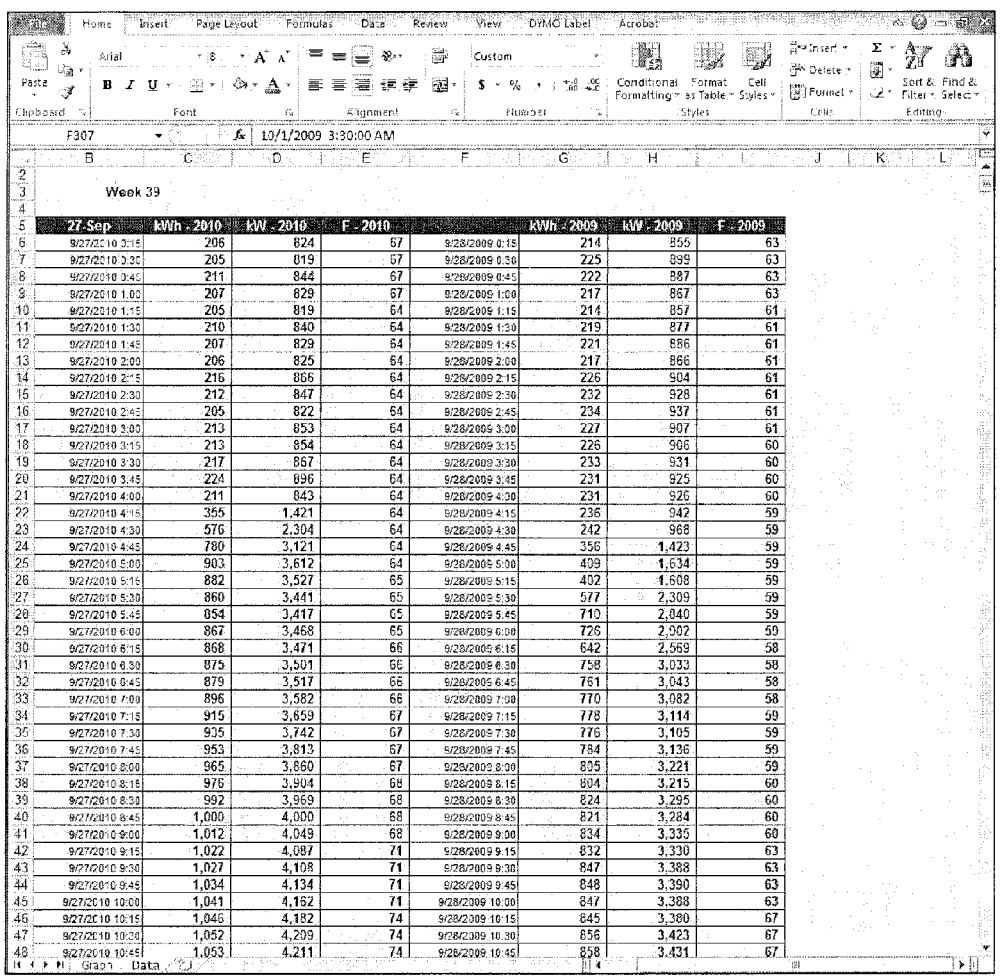

FIG. 21(c) shows an example snapshot of the second page of the source module of an Excel Weekly Module. As FIG. 21(c) illustrates, this part of the example Excel Weekly Module provides the numerical values of the graphs provided in snapshot of the front page of the Excel Weekly Module (e.g., as shown in FIG. 21(b)).

Figure 22A:
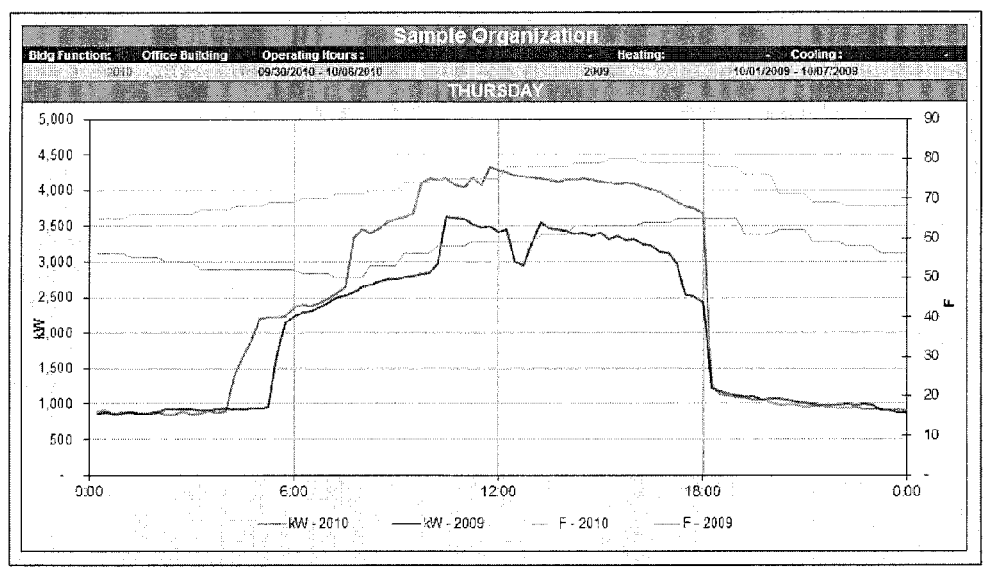
FIGS. 22(a)-(b) illustrate another example aspect of the functionality of the Weekly Module.
Figure 22B:
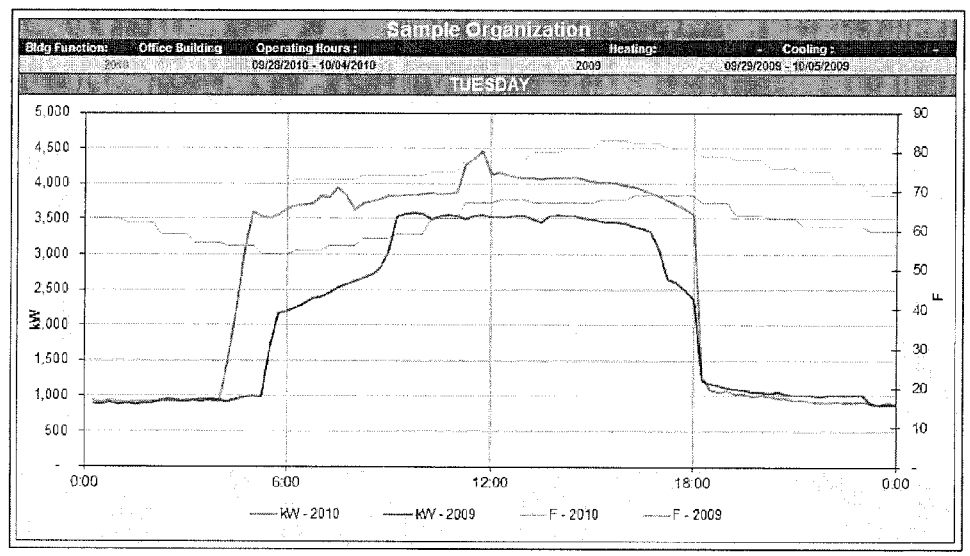

FIGS. 22(a)-(b) illustrate examples of the "Instant Access to Synchronized Daily Graphs of Operations Data," another example aspect of the functionality of the Weekly Excel Module. It provides for the instant and separate VISUAL representation of each day of the Weekly Excel Module in certain example embodiments. This may permit users to "zoom in" and focus on the daily operations of each day of the week independently of the others.

While the design of certain example embodiments relating to the methods and systems disclosed herein may rely on access to electric "interval pulse data" from the local utility company, which typically provides such data electronically online from a few days to a few weeks in arrears, certain example methods may be adapted to use any stream of interval data from any source as long as it can be displayed or downloaded electronically in tabular format. If fact, the source of the interval pulse data can be from any utility system or sub-metering system that can provide electricity and/or gas data, on a 15-minute, 30-minute, or hourly intervals—in "real-time" or through "delayed" (e.g., retroactive) delivery.

Figure 23A:
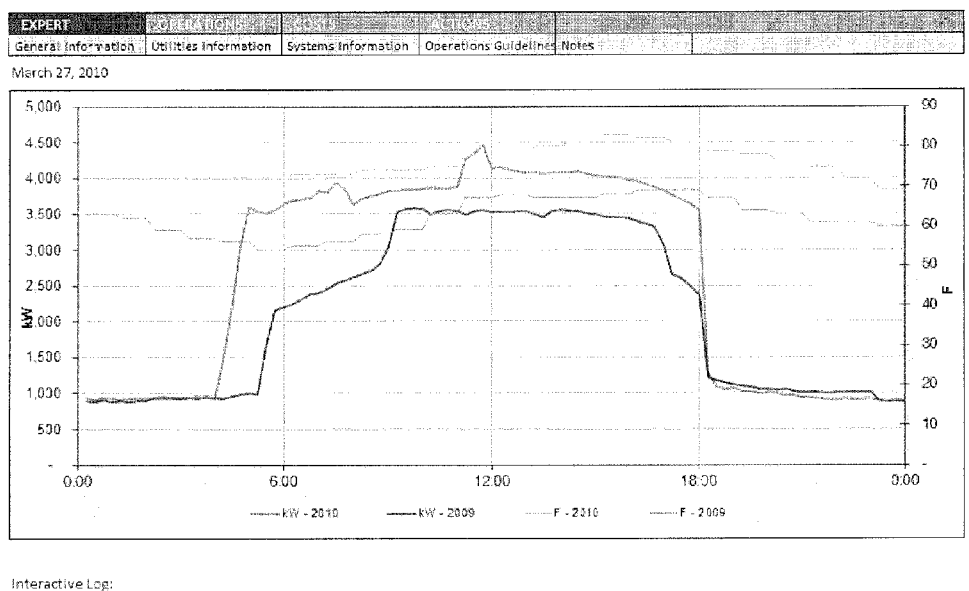
FIGS. 23(a)-(b) illustrate screen shots from an example "delayed" data system/retroactive analysis, and an example "real-time" system, respectively, according to certain example embodiments.
Figure 23B:
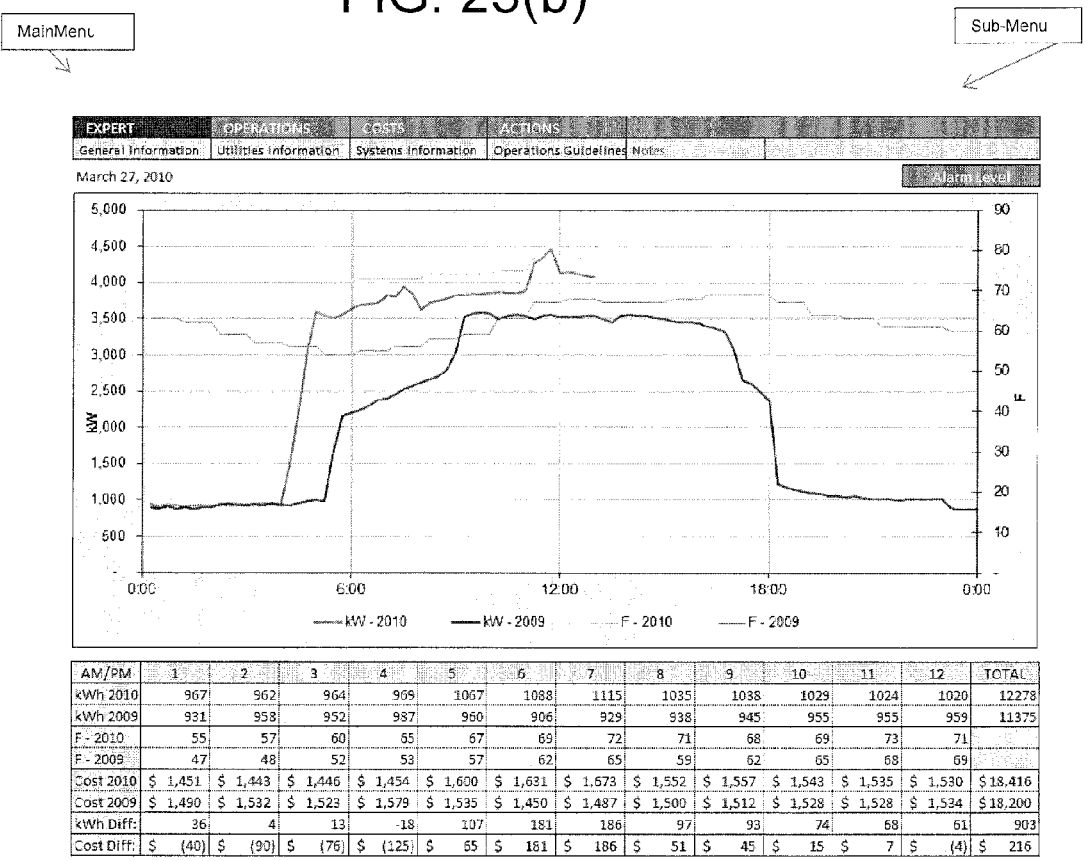

FIGS. 23(a)-(b) illustrate screen shots from an example "delayed" data system/retroactive analysis, and an example "real-time" system, respectively. More specifically, FIG. 23(a) illustrates a possible "screen shot" of the method of the system described above using delayed data streams. This approach is best for analyzing the operating performance of a facility from an overall (macro) performance management point of view. FIG. 23(b), on the other hand, illustrates a possible "screen shot" from the method of the system described above using "live" or real-time data streams. This approach may be operationally (micro) advantageous in certain examples.

Figure 24:
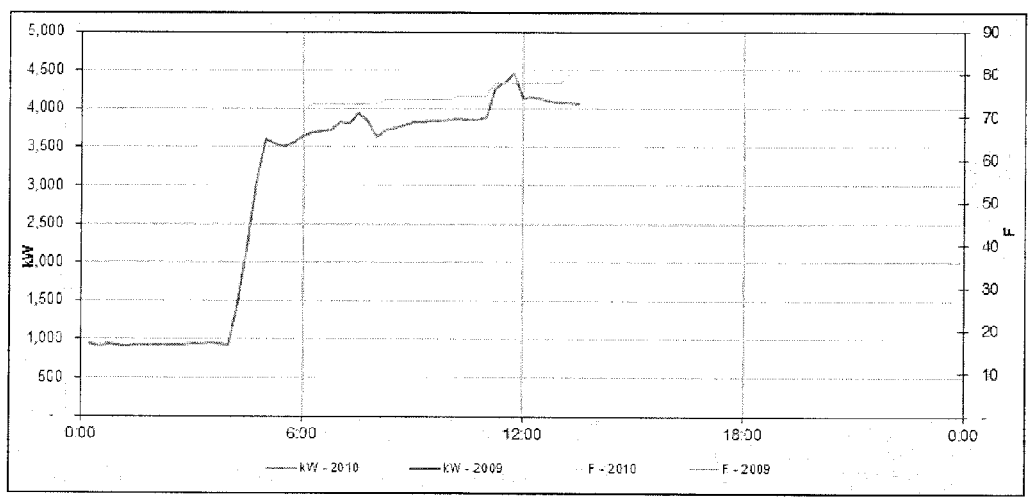
FIG. 24 illustrates an example picture of "real-time" or "live" data stream systems.

However, unfortunately, certain existing systems may only provide limited data available in a real-time stream. An example of such an existing system is shown in FIG. 24. Accordingly, it will be appreciated that it may be desirable to combine certain example methods with example systems that can provide electricity or gas data in 15-minute, 30-minute, or hourly interval data—in real time. In certain example embodiments, the implementation of certain example methods and systems for live data streams described herein may be advantageous, and may represent an improvement over existing real-time/live data streams; as can be seen, for example, from FIG. 23(b). For example, such systems and methods may advantageously provide a great value from an operational stand point.

Figure 25:
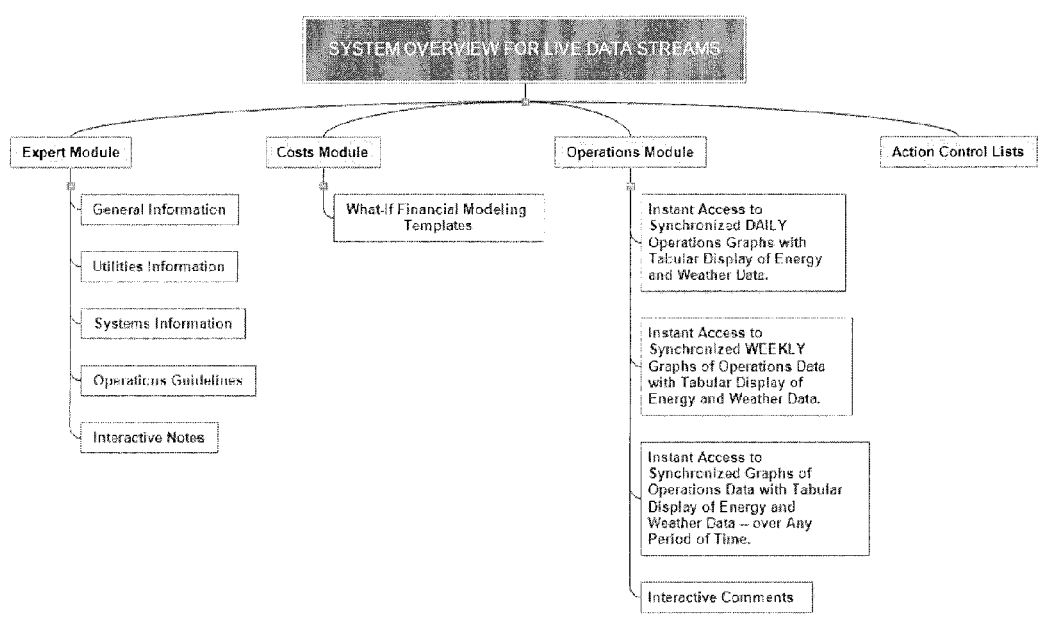
FIG. 25 illustrates that certain example live data stream embodiments may include an Expert module, a Costs module, an Operations module, and Action control lists.

FIG. 25 provides a non-limiting improved system overview and implementation methods for "live" or "real-time" data streams. For example, FIG. 25 illustrates that certain example live data stream embodiments may include an Expert module, a Costs module, an Operations module, and Action control lists.

Certain example embodiments of systems and/or methods relating to improved "real-time" or "live" data streams will now be described. In certain example embodiments, for example as shown in FIG. 25, the implementation of certain example methods for real-time data streams will have four—instead of three—modules. The modules may include, for example, an Expert module, a Costs module, an Operations module, and may additionally include an Action Control Lists module; as illustrated in FIG. 25. Each of these modules will be described in more detail below.

(1) Expert Module: This module may include the same components described above except for the "Action Control List" component. This component now becomes a separate module in certain instances. In certain example embodiments, the Expert module may be similar to that described in connection with the delayed-delivery system above.

(2) Costs Module: For live data streams, this module will include "What-If" Financial Modeling Templates, in certain examples. "What-If" Financial Modeling Templates includes various templates which can be shaped to closely mimic applied, available, or envisioned electricity and/or gas rate structures. These templates can access the energy use data generated by the "real-time" system, multiply that consumption by a user-defined average "distribution" rate, a user-defined average "commodity" rate, plus any other factor which might be necessary, such as a "kW Demand" rate and an overall sales tax rate to derive an approximate cost for the energy used. Different rate templates can be shaped, stored in the system, and applied to the energy data collected by the system.

Figure 26A:
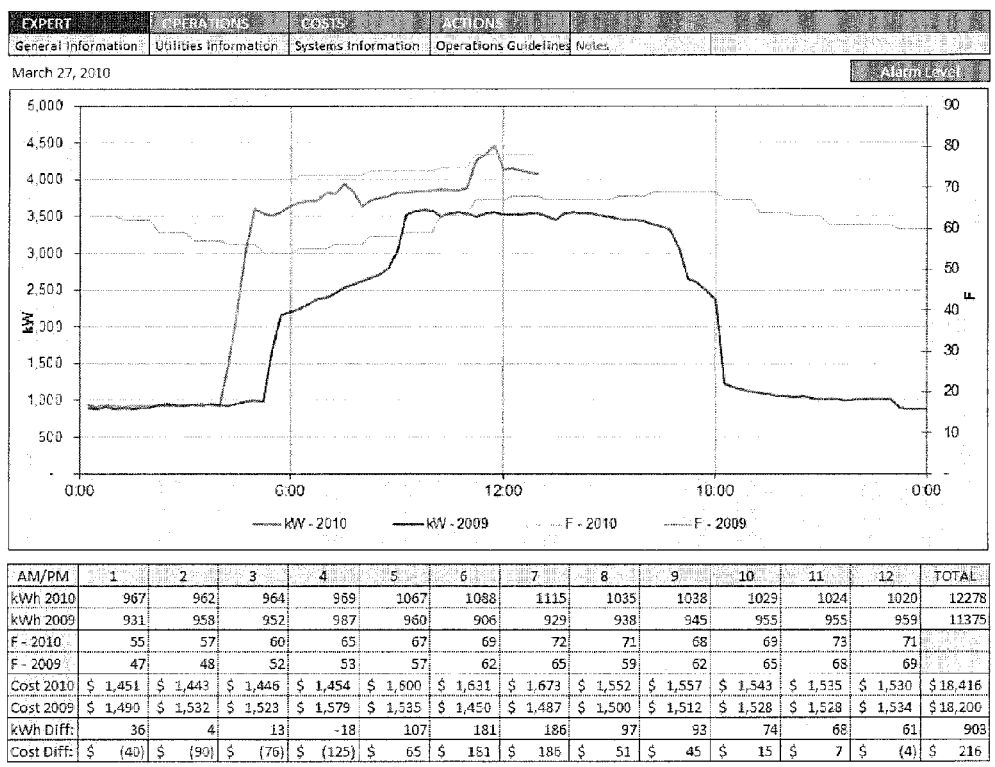

For example, FIG. 26(a) illustrates an example "Costs" template that may be used to provide an ongoing data stream of cost data which would "monetize" the cost of the displayed consumption as well as the savings, or additional costs, incurred from the difference in energy use between the live data stream and the chosen base year.

FIG. 26(a), for illustration purposes only, shows tabular data that is limited to 12 hours only (half a day). For an actual system, in certain example embodiments, most display screens are large enough to easily accommodate data that encompass 24 hours of data (for a full day of analysis).

FIG. 26(b) illustrates an example schematic of a possible Costs Module "What-If" Template. In certain instances, by adding a financial "What If" module, one can monetize the quantity of energy that is varying from one year to the next.

Using the "What-If" financial modeling template illustrated in FIG. 26(b), a "Real-Time" system can compile the energy use and Peak Demand data automatically from the metering stream (based on a 15-minute, 30-minute, or any other parameter). In certain example embodiments, the users would only have to enter the energy prices for Distribution and Commodity, an average peak demand price when applicable, and any additional taxes and surcharges. In certain instances, the system may then be able to compute the resulting costs for the desired time period automatically.

Another "What-If" financial modeling template could be designed to break down the energy prices by time of day (e.g., On-Peak, Off-Peak, etc.), in certain examples. Yet another template could use available "Real-Time" pricing options to determine the price of the same consumption patterns under different pricing options, in other example embodiments. It will be appreciated that certain "What-If" templates described herein may be used to determine many different cost-related issues.

Figure 26C:
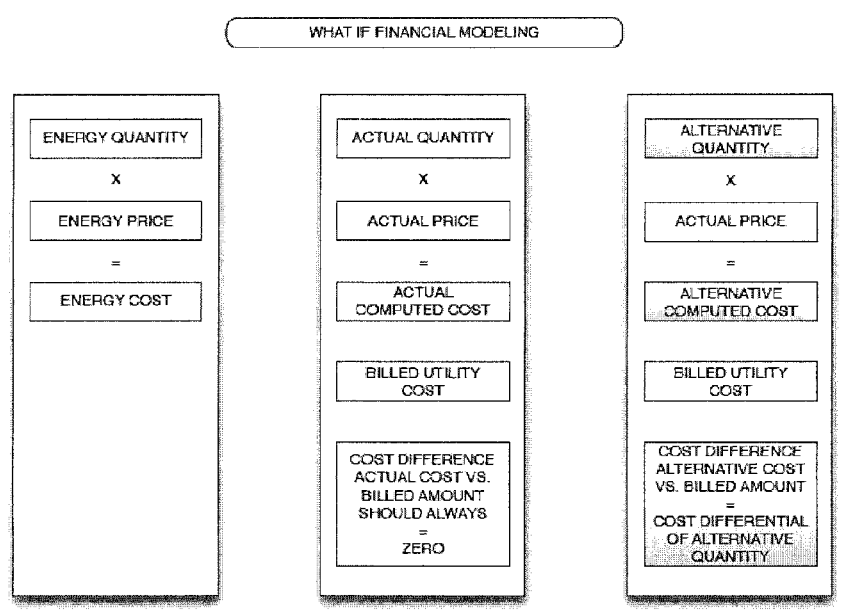

FIG. 26(c) illustrates that the amount of energy used, times the price, is the total energy cost. Furthermore, the actual amount used, times the actual price, will equal the actual computed cost. The difference in cost between the actual cost and the billed amount should always equal zero. This modeling can be used to determine the cost of an alternative quantity of energy. for example, the alternative quantity may be multiplied by the actual price, to arrive at the alternative computed cost. In certain instances, the cost difference between the alternative cost and the billed amount will give the cost differential of the alternative quantity, in certain example embodiments.

(3) Operations Module: In certain example embodiments, the concept of synchronizing current energy consumption with the corresponding period of the prior year, or a preselected base year, as well, is done by certain example methods of synchronization used by the Operations Module. For example, the Operations module may include instant access to synchronized daily and/or weekly operations graphs with tabular displays of energy and weather data. Furthermore, in certain example embodiments, the Operations module may permit instant access to synchronized graphs of operations data with a tabular display of energy and weather data, over any period of time. Finally, the Operations module may also include interactive comments.

(4) Action Control Lists: Another example advantage of certain example methods and systems, when applied to "real-time" systems, is to initiate a sequence of events automatically whenever certain combinations of operating conditions and temperatures have been met.

In certain instances, incorporating certain example methods disclosed herein with "live" or "real-time" data streams could enhance the value of certain example embodiments exponentially. The following is a list of non-limiting example features associated with certain "real-time" aspects of certain example embodiments.

It could add a frame of reference to the data streams.

It could provide "context to the content" of the data streams.

It could enable instant commenting on unusual energy profiles.

It could provide for instant referral and execution of select "Action Scripts" when certain operating and environmental conditions have been encountered.

It could provide "valuation" and meaning to the energy monitoring process.

It could provide an automatic visual and audible alarm—not only when a certain peak consumption (electric demand) condition has been reached—but also when energy consumption has increased beyond a specific, pre-defined, level of energy use from the prior year—or from a pre-selected "benchmark profile".

It could even provide for the automatic implementation of "Action Control" scripts that would automatically shut down, startup, or control certain equipment when specific criteria have been met.

The value of the concept is self-evident; in certain instances it provides a frame of reference against which to compare current energy consumption. In addition, without a frame of reference, one cannot measure (quantify) or monetize the performance difference from one year to another, in certain instances. Certain example methods of synchronization described herein are very simple; including synchronizing each weekday of the year with a corresponding weekday from the prior year. By that we mean that a Monday should be synchronized with a Monday, a Tuesday, with a Tuesday, and so on.

For example, in certain example embodiments, there may be a need for an Expert system to identify, understand and explain usual and unusual operating profiles, in real-time. Certain example methods and systems of synchronization described herein stipulate that in order to achieve such synchronization, the difference between the two days shall be exactly 364 days. It may be advantageous, for example, to have the ability to measure and quantify energy consumption changes (increases/decreases) from the prior year by synchronizing back exactly 364 days (or multiples of that number for going back to a base year up to 4 years in arrears—anything more ancient than that would be meaningless). Synchronizing with 363 or 365 days will result in Mondays being synchronized with Sundays and Fridays being synchronized with Saturdays. Also, synchronizing one month, three months, or six months in arrears will be meaningless as it would straddle seasons where operations are drastically different. This leave the 364 days (exactly 52 weeks) as an example meaningful synchronization method, in certain example embodiments. In other examples, 350, 357, 371, and/or 378 days may also be close enough so as to result in meaningful synchronization. Correlation can be displayed at the level of 1 day, one week, one month, or one year, and anything in between, according to different example embodiments.

For example, Saturday, Dec. 30, 2011 shall be synchronized with Saturday, Dec. 31, 2010, and Saturday Dec. 31, 2010 shall be synchronized with Saturday, Jan. 1, 2010, and Saturday Jan. 1, 2010 shall be synchronized with Saturday, Jan. 2, 2009 and so on. The exact difference between each of these days is exactly 364 days regardless whether year in question is a leap year or a non-leap year. Synchronizing with a period of less or more than 364 days would be meaningless because of the change in seasonal temperatures. For example, synchronizing over a single month, a three-month, or a six-month period would be meaningless because typically there is a vast difference in operating profile from October 15th to November 15th (One month difference), from September 31st to December 31st (three-month difference), and from February 15th to August 15th (six-month difference).

This formula works well from any given date to a date exactly 364 days in arrears. It also works well for up to a four-year period in arrears. For example, if a user wishes to compare the current operating profile of a facility to the same period four years in arrears (i.e. a baseline that is four years in arrears), all that person has to do is select a date that is (4 years×364 days in arrears), for a period that is 3 years in arrears, the formula would be (3 years×364 days in arrears). Synchronizing weekdays over periods in excess of four years begins to introduce a noticeable difference in calendar days (i.e. comparing Sunday, Jan. 1, 2000 to a Sunday five years in arrears would result in the selection of Jan. 7, 1995. Such calendar discrepancies can be avoided by deducting the number (7) from the formula after the first four years (i.e. CURRENT DATE—(364*5)–7), but one can hardly see a reason to compare current consumption to a period 5 years in arrears, or earlier.

The chart illustrated in FIG. 27 shows how synchronizing to a period exactly 364 days in arrears in a given year, in a non-limiting exemplary example embodiment, will result in a match for the same weekday from one year to another.

In other words, FIG. 27 shows the results of daily synchronization with a prior year; weekly synchronization can also be easily achieved by selecting a period 364 days in arrears for the beginning of the week, and adding 6 days to that number to derive the ending period of the week. It is noted that the synchronization described with respect to FIG. 27 and other example embodiments may be applied to both and/or one of the "delayed delivery" and the "real-time" systems described herein.

In addition to providing the ability to quantify and monetize real-time energy performance with a corresponding period from the prior year, certain example advantages of this method may include providing a more meaningful performance management system by providing a visual signal (and perhaps an audible signal as well) whenever a certain combination of energy consumption and temperatures have varied by a pre-determined level from the chosen synchronized "baseline"—at any time of the day or night. For example, if the outside temperature over the course of a given hour is within 5% of the prior year but energy consumption has risen 20% or more, a specific visual indicator may turn a particular color (e.g., red). When consumption and temperatures are within an acceptable range, the color may change (e.g., to green), and when consumption is rising, but has not reached a specific threshold, the color could change to a different color from the previous two colors (e.g., orange). In certain instances, it may be desirable to provide warnings and/or indications indicative of the current consumption level, rather than only providing a warning when energy consumption or the peak electric demand has exceeded a certain threshold.

In addition to providing visual and audible warnings, in certain example embodiments, the system may be made to initiate or suggest the execution of specific "Action Control Scripts" and/or "Action Control Lists" based on predetermined parameters of energy use, weather, or any other parameters that are being tracked (e.g., vacancy rates, number of meal served, etc.).

Figure 28:
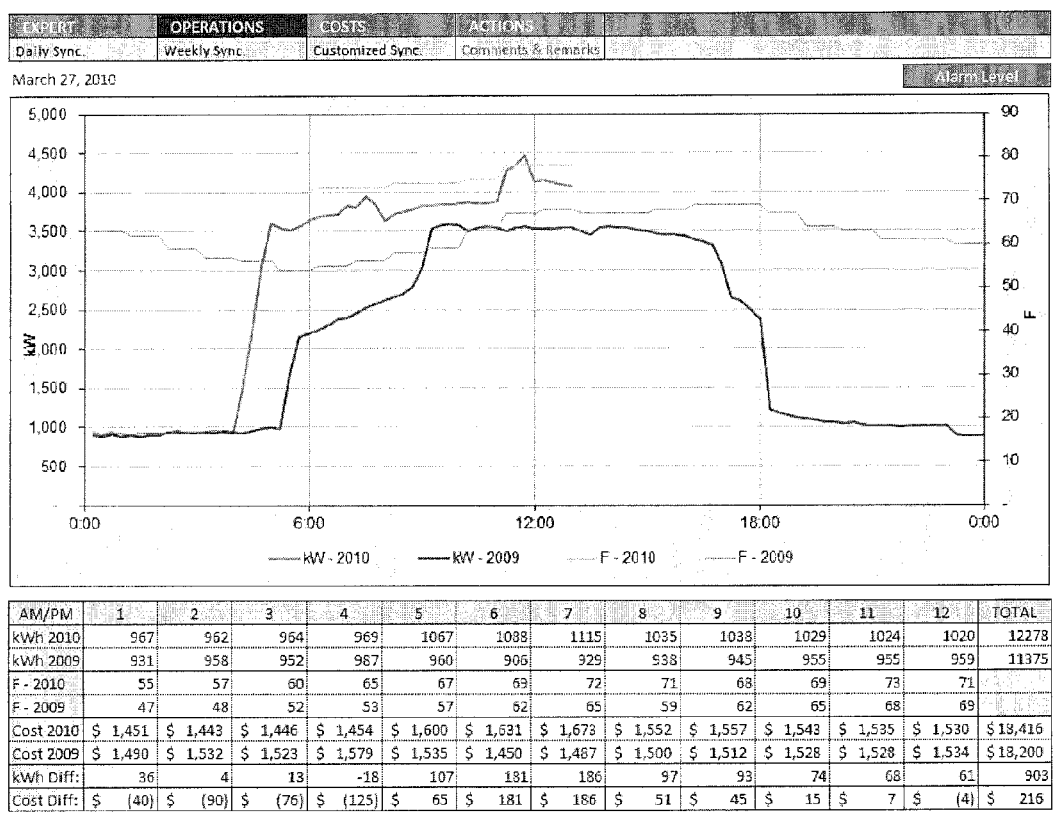
FIG. 28 is a graph illustrating example results of daily synchronization with a prior year in certain example embodiments.

With respect to Action Control Lists, FIG. 28 illustrates how a warning/alarm system could be implemented as part of the described methods and systems. More specifically, as mentioned above, another advantage of these methods and systems when applied to "real-time" systems is to initiate a sequence of events automatically whenever certain combinations of operating conditions and temperatures have been met. In fact, most modern building energy management systems contain a feature that turns equipment on automatically at a predetermined hour in the morning and shuts them down automatically at the end of the working day. What is unique to this method, it that instead of the action control scripts being tied to a specific time or a specific level of peak electric demand, they can be triggered by a combination of events such as difference in outside temperatures being similar to the prior year yet energy consumption is continuing to creep up substantially. Under such circumstances, in addition to providing visual and audible warnings, non-limiting examples could include sending an email or a voice recording to the building manager, or signals could automatically be sent to the facility's chillers or boilers to initiate a modification of their temperatures to predetermined levels. All sorts of scenarios could be envisioned for the use of Action Control Lists tied to a combination of operating factors and temperatures.

In other words, the method and system of this patent application can be used on "real-time" data streams or "delayed-delivery" data streams. The application of this method on real-time data streams will vastly enhance the ability of operating engineers to maximize the operating efficiency of their facilities. On the other hand, the application of the method of this patent application on delayed-delivery data streams would vastly enhance the ability of energy managers and facility managers to interpret and optimize usual and unusual patterns in energy consumption; identify, quantify, and monetize hidden operating and financial waste; and accurately measure the results of implemented energy management solutions—in a reduced amount of time with decreased cost and effort.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A utility management system for tracking performance relating to utility usage, the system comprising:
  at least one storage device configured to store information indicating intervals of utility usage data for a first time period and information indicating intervals of utility usage data for a second time period different from the first time period;
  a computer processor coupled to the storage device, the processor configured to:
  automatically synchronize intervals of utility usage data of the first time period with corresponding intervals of utility usage data of the second time period such that the utility usage data for one or more day(s) in the first time period is synchronized with utility usage data for one or more corresponding respective day(s) in the second time period, where each corresponding respective day in the synchronized second time period is exactly 364 days or an integer multiple thereof after each day in the synchronized first time period, and wherein each corresponding respective day in the synchronized first time period is a same day of the week as the corresponding respective day of the week in the synchronized second time period;
  automatically compute at least one cost comparison associated with utility usage data for the synchronized one or more day(s); and
  automatically provide the calculated at least one cost comparison for presentation or display.

2. The system of claim 1 wherein the computer processor is further configured to automatically provide a graph of first time period utility usage data for each consecutive day of exactly one week superimposed with a graph of second time period utility usage data for each consecutive data of exactly one subsequent week.

3. The system of claim 1 wherein the computer processor is further configured to automatically calculate a cost differential of second period utility usage as compared to first period utility usage.

4. The system of claim 1 wherein the computer processor is further configured to provide an expert system that compares second period utility usage data of different users.

5. A utility management system for tracking performance relating to utility usage, the system comprising:
  at least one storage device configured to store information indicating intervals of utility usage data from a first time period and a second time period, wherein the first and second time periods are related by a multiple of 364 days;
  a computer processor coupled to the storage device, wherein the processor is configured to:
  automatically synchronize the intervals of utility usage data from the first time period with corresponding intervals of utility usage data from the second time period such that the utility usage data for one or more day(s) in the first time period is synchronized with the utility usage data for one or more corresponding respective day(s) in the second time period, wherein each day in the first time period is a same day of the week as the corresponding respective day in the second time period;
  automatically calculate a cost difference between the first time period utility usage data and the second time period utility usage data; and
  provide information for graphically presenting said synchronized usage data and calculated cost difference on a weekly basis.

6. The system of claim 5 wherein the processor is further configured to:
  automatically compute at least one daily and one weekly cost associated with utility usage data for the synchronized one or more day(s); and
  provide the calculated at least one cost for presentation or display.

7. The system of claim 5 wherein the processor is further configured to accept comments and/or analysis from at least one user and associate said accepted comments and/or analysis with displayed synchronized usage data.

8. The system of claim 7 wherein the processor is further configured to place the comments and/or analysis below each weekly graph in order to enable the user to review, discuss, and comment on the usage graphs and data in separate weekly increments.

9. The system of claim 5 wherein the storage device stores said intervals of utility usage data for a plurality of facilities, and the processor is further configured to compute and provide facility use ranking and diagnosis.

10. The system of claim 9 wherein said processor is further configured to compute said diagnosis based on an expert system containing operating and physical characteristics of said plurality of facilities.

11. The system of claim 5 wherein the processor is further configured to present graphs and associated tabular data in discrete weekly increments in a vertical or horizontal fashion such as to allow the user to quickly review one year's energy use and cost data, with associated interactive comments, by displaying individual weekly representations of the synchronized periodic data.

* * * * *